(12) United States Patent
Obermeyer et al.

(10) Patent No.: US 7,474,296 B2
(45) Date of Patent: Jan. 6, 2009

(54) MULTI-AXIS JOYSTICK AND TRANSDUCER MEANS THEREFORE

(76) Inventors: Henry K. Obermeyer, 303 W. County Rd. 74, Wellington, CO (US) 80549; Fritz H. Obermeyer, 303 W. County Rd. 74, Wellington, CO (US) 80549; Leslie R. Obermeyer, 303 W. County Rd., Wellington, CO (US) 80549

( * ) Notice: Subject to any disclaimer, the term of this patent is extended or adjusted under 35 U.S.C. 154(b) by 713 days.

(21) Appl. No.: 10/511,110

(22) PCT Filed: Apr. 14, 2003

(86) PCT No.: PCT/US03/11614

§ 371 (c)(1),
(2), (4) Date: Oct. 12, 2004

(87) PCT Pub. No.: WO03/088204

PCT Pub. Date: Oct. 23, 2003

(65) Prior Publication Data

US 2005/0162389 A1 Jul. 28, 2005

Related U.S. Application Data

(60) Provisional application No. 60/372,216, filed on Apr. 12, 2002.

(51) Int. Cl.
*G09G 5/00* (2006.01)
(52) U.S. Cl. ...................... 345/156; 345/166
(58) Field of Classification Search .......... 345/156–167
See application file for complete search history.

(56) References Cited

U.S. PATENT DOCUMENTS

| | | | | |
|---|---|---|---|---|
| 4,090,092 A | 5/1978 | Serrano | ................. | 307/116 |
| 4,136,291 A | 1/1979 | Waldron | ................. | 307/308 |
| 4,145,748 A | 3/1979 | Eichelberger et al. | ....... | 364/862 |
| 4,158,216 A | 6/1979 | Bigelow | ................. | 361/280 |
| 4,233,522 A | 11/1980 | Grummer et al. | ........... | 307/116 |
| 4,264,903 A | 4/1981 | Bigelow | ................. | 340/365 |
| 4,293,987 A | 10/1981 | Gottbreht et al. | ........... | 29/25.42 |

(Continued)

FOREIGN PATENT DOCUMENTS

EP  0 054 306  12/1981

(Continued)

OTHER PUBLICATIONS

Office Action from parallel Taiwanese Patent Application No. 92128428, mailed Jul. 6, 2006 (Engl. Txlat. Prov'd).

(Continued)

*Primary Examiner*—Ricardo L Osorio
(74) *Attorney, Agent, or Firm*—Santangelo Law Offices P.C.

(57) ABSTRACT

The invention relates to improved multi-axis joysticks and associated multi-axis optical displacement measurement means. The displacement measuring means may include one or more light emitters and one or more light detectors, preferably mounted in a planar hexagonal array. The relative position of an adjacent movable reflector assembly can be measured in six degrees of freedom by variations in detected light amplitude. Various ergonomic configurations of six axis joystick embodiments which may be facilitated by the compact design of the transducer means are disclosed. Means for dynamically adjusting coordinate transformations for construction machinery control are also disclosed.

33 Claims, 65 Drawing Sheets

U.S. PATENT DOCUMENTS

| | | | |
|---|---|---|---|
| 4,304,976 A | 12/1981 | Gottbreht et al. | 219/10.55 B |
| 4,394,643 A | 7/1983 | Williams | 340/365 |
| 4,444,205 A | 4/1984 | Jackson | 128/782 |
| 4,505,049 A | 3/1985 | Kuno et al. | 33/333 |
| 4,533,827 A | 8/1985 | Fincher | |
| 4,536,746 A | 8/1985 | Gobeli | 340/365 |
| 4,550,617 A | 11/1985 | Fraignier et al. | 73/862.04 |
| 4,561,002 A | 12/1985 | Chin | 340/365 |
| 4,589,810 A | 5/1986 | Heindl et al. | 414/5 |
| 4,615,101 A | 10/1986 | Edwards et al. | 29/568 |
| 4,655,673 A | 4/1987 | Hawkes | 414/730 |
| 4,685,678 A | 8/1987 | Fredericksen | 273/148 |
| 4,698,775 A | 10/1987 | Koch et al. | 364/478 |
| 4,748,433 A | 5/1988 | Jackson et al. | 338/6 |
| 4,785,180 A | 11/1988 | Dietrich et al. | 250/231 |
| 4,811,608 A | 3/1989 | Hilton | 73/862.04 |
| 4,853,498 A | 8/1989 | Meadows et al. | 178/19 |
| 4,855,550 A | 8/1989 | Schultz et al. | 200/600 |
| 4,876,524 A | 10/1989 | Jenkins | 338/2 |
| 4,879,556 A | 11/1989 | Duimel | |
| 4,880,348 A | 11/1989 | Baker et al. | 414/783 |
| 4,894,493 A | 1/1990 | Smith et al. | 200/5 A |
| 4,922,061 A | 5/1990 | Meadows et al. | 178/19 |
| 4,949,026 A | 8/1990 | Mead | 318/649 |
| 5,220,261 A | 6/1993 | Kempas | 318/567 |
| 5,222,400 A | 6/1993 | Hilton | 73/862.043 |
| 5,260,629 A | 11/1993 | Ioi et al. | 318/568.19 |
| 5,272,423 A | 12/1993 | Kim | 315/560 |
| 5,276,294 A | 1/1994 | Jalbert | 187/121 |
| 5,280,265 A | 1/1994 | Kramer et al. | 338/210 |
| 5,283,559 A | 2/1994 | Kalendra et al. | 345/168 |
| 5,296,871 A | 3/1994 | Paley | 345/163 |
| 5,298,919 A | 3/1994 | Chang | 345/163 |
| 5,301,566 A | 4/1994 | Tahmasebi et al. | 74/479 |
| 5,329,276 A | 7/1994 | Hirabayashi | 340/870.31 |
| 5,392,658 A | 2/1995 | Okada | 73/862.043 |
| D358,143 S | 5/1995 | Gombert et al. | D14/114 |
| 5,421,213 A | 6/1995 | Okada | 73/862.043 |
| 5,439,919 A | 8/1995 | Miyachi et al. | 514/316 |
| 5,440,326 A | 8/1995 | Quinn | 345/156 |
| 5,446,481 A | 8/1995 | Gillick et al. | 345/163 |
| 5,452,615 A | 9/1995 | Hilton | 73/862.043 |
| 5,453,758 A | 9/1995 | Sato | 345/158 |
| 5,457,289 A | 10/1995 | Huang et al. | 178/20 |
| 5,488,204 A | 1/1996 | Mead et al. | 178/18 |
| 5,506,605 A | 4/1996 | Paley | 345/163 |
| 5,512,919 A | 4/1996 | Araki | 345/156 |
| 5,521,596 A * | 5/1996 | Selker et al. | 341/22 |
| 5,526,294 A | 6/1996 | Ono et al. | 364/709.13 |
| 5,528,264 A | 6/1996 | Kautzer et al. | 345/158 |
| 5,528,265 A | 6/1996 | Harrison | 345/158 |
| 5,537,311 A | 7/1996 | Stevens | 364/167.01 |
| 5,548,306 A | 8/1996 | Yates, IV et al. | 345/174 |
| 5,589,828 A | 12/1996 | Armstrong | 341/20 |
| 5,591,924 A | 1/1997 | Hilton | 73/862.04 |
| 5,625,696 A | 4/1997 | Fosgate | 381/18 |
| 5,639,847 A | 6/1997 | Chiang et al. | 528/71 |
| D381,701 S | 7/1997 | Salinas | D21/48 |
| 5,650,597 A | 7/1997 | Redmayne | 178/19 |
| 5,687,080 A | 11/1997 | Hoyt et al. | 364/190 |
| 5,706,027 A | 1/1998 | Hilton et al. | 345/156 |
| 5,729,249 A | 3/1998 | Yasutake | 345/173 |
| 5,749,577 A | 5/1998 | Couch et al. | 273/148 |
| 5,767,839 A | 6/1998 | Rosenberg | 345/161 |
| 5,767,840 A | 6/1998 | Selker | 345/161 |
| 5,786,997 A | 7/1998 | Hoyt et al. | 364/190 |
| 5,790,107 A | 8/1998 | Kasser et al. | 345/174 |
| 5,798,748 A | 8/1998 | Hilton et al. | 345/156 |
| 5,805,140 A | 9/1998 | Rosenberg et al. | 345/161 |
| 5,821,920 A | 10/1998 | Rosenberg et al. | 345/156 |
| 5,828,813 A | 10/1998 | Ohm | 395/95 |
| 5,835,077 A | 11/1998 | Dao et al. | 345/157 |
| 5,838,308 A | 11/1998 | Knapp et al. | 345/173 |
| 5,847,528 A | 12/1998 | Hui et al. | 318/568.1 |
| 5,858,291 A | 1/1999 | Li et al. | 264/105 |
| 5,880,718 A | 3/1999 | Frindle et al. | 345/174 |
| 5,889,505 A | 3/1999 | Toyama et al. | 345/156 |
| 5,898,057 A | 4/1999 | Chiang et al. | 528/71 |
| 5,912,736 A | 6/1999 | Marcuse et al. | 356/355 |
| 5,920,309 A | 7/1999 | Bisset et al. | 345/173 |
| 5,923,318 A | 7/1999 | Zhai et al. | 345/157 |
| 5,959,863 A | 9/1999 | Hoyt et al. | 364/190 |
| 6,033,309 A | 3/2000 | Couch et al. | 463/38 |
| 6,063,499 A | 5/2000 | Chiang et al. | 428/425.8 |
| 6,094,491 A | 7/2000 | Frindle et al. | 381/119 |
| 6,111,051 A | 8/2000 | Chiang et al. | 528/71 |
| 6,121,955 A | 9/2000 | Lui | |
| 6,131,056 A | 10/2000 | Bailey et al. | 701/13 |
| 6,154,198 A | 11/2000 | Rosenberg | 345/161 |
| 6,157,368 A * | 12/2000 | Fager | 345/156 |
| 6,184,331 B1 | 2/2001 | Chiang et al. | 528/71 |
| D440,971 S | 4/2001 | Gombert | D14/402 |
| 6,236,301 B1 | 5/2001 | Langford et al. | 338/6 |
| 6,271,828 B1 | 8/2001 | Rosenburg et al. | 345/156 |
| 6,329,812 B1 | 12/2001 | Sundin | 324/207.16 |
| 6,333,733 B1 * | 12/2001 | Andersson et al. | 345/157 |
| 6,343,242 B1 | 1/2002 | Nomura et al. | 700/245 |
| 6,373,466 B2 | 4/2002 | Salcuden et al. | 345/161 |
| 6,474,915 B1 | 11/2002 | Wildenberg | 409/201 |
| 6,545,662 B1 * | 4/2003 | Noll et al. | 345/158 |
| 6,597,347 B1 * | 7/2003 | Yasutake | 345/173 |
| 6,738,043 B2 | 5/2004 | Endo | 345/158 |
| 6,844,871 B1 * | 1/2005 | Hinckley et al. | 345/163 |
| 6,853,366 B2 * | 2/2005 | Bowen | 345/163 |
| 2001/0002098 A1 * | 5/2001 | Haanpaa et al. | 318/568.11 |
| 2001/0038380 A1 | 11/2001 | Salcudean et al. | 345/161 |
| 2001/0055002 A1 | 12/2001 | Endo | 345/156 |
| 2002/0117017 A1 | 8/2002 | Bernhardt et al. | 74/471 |
| 2004/0233159 A1 * | 11/2004 | Badarneh | 345/156 |

FOREIGN PATENT DOCUMENTS

| | | |
|---|---|---|
| EP | 0 125 895 A1 | 5/1984 |
| EP | 0 466 800 B1 | 4/1990 |
| EP | 0 464 649 B1 | 6/1991 |
| EP | 0 516 862 A1 | 12/1991 |
| EP | 0 567 364 B1 | 4/1993 |
| EP | 0 744 0312 | 2/1995 |
| EP | 0 706 838 B1 | 10/1995 |
| EP | 0 720 293 A1 | 12/1995 |
| EP | 0 727 875 B1 | 1/1996 |
| EP | 0 917 291 A2 | 1/1996 |
| EP | 0 745 928 A2 | 12/1996 |
| EP | 0 509 589 B1 | 1/1997 |
| TW | 392123 | 6/2000 |
| TW | 417054 | 1/2001 |
| TW | 426167 | 3/2001 |
| TW | 481284 | 3/2002 |
| WO | 9609918 | 4/1996 |
| WO | WO 00/02701 | 1/2000 |
| WO | WO 00/24053 | 4/2000 |
| WO | WO 01/33540 | 5/2001 |
| WO | 0141053 A1 | 6/2001 |
| WO | WO 02/37410 A1 | 5/2002 |
| WO | WO 02/37411 A1 | 5/2002 |
| WO | WO 03/088204 A1 | 10/2003 |

OTHER PUBLICATIONS

Office Action from parallel Taiwanese Patent Application No. 92128428, mailed Dec. 14, 2006 (Engl. Txlat. Prov'd).

"3503: Ratiometric Linear hall-Effect Sensors", http://www.allegromicro.com/sf/3503/index.htm, printed Feb. 8, 2002, 2 pages.

"3503: RatioMetric, Linear, Hall-Effect Sensors", Allegro Microsystems, Inc., 1999, 12 pages.

"3D Controller Shootout", http://www.joy-stick.net/articles/3dshootout.htm, printed Feb. 22, 2002, 2 pages.

"6-axis joystick", http://www.multimania.com/tigereye/unreal/6axisjoystick.jpg, printed Feb. 22, 2002, 1 page.

"Accurate Economical Optical Distance and Systems for Industry and Re", http://www.aculux.com, printed Mar. 1, 2002, 1 page.

"Birdman's Lair", http://www.planethardware.com/spaceorb/main.html, printed Feb. 22, 2002, 3 pages.

"Conventions Used in Presenting Technical Data", Vishay Telefunken, pp. 1-45, "no date".

"Curriculum Vitae", http://engine.chungbuk.ac.kr/~kwjeong/pube.html, printed Feb. 22, 2002, 5 pages.

"David Petchkins Custom Space Orb", http://www.planethardware.com/spaceorb/petchkins.html, printed Feb. 22, 2002, 7 pages.

Design for Automated Construction:, Howe, A. Scott, University of Michigan Doctoral Program in Architecture, "no date".

"Design of a six-axis input device for a robotic manipulation aid", http://guide.stanford.edu/People/vdl/publications/VIDOF/vidof.html, printed Feb. 22, 2002, 6 pages.

Development of Next-Generation Underwater Construction Machinery, Adachi, Shigeaki; Jun'ichi Akizono; Kazuhiro Shirai; Taketsugu Hirabayashi, Toshinari Tanaka, Port and Harbour Research Institute, Ministry of Transport Kanagawa, Japan, "no date".

Device class Definition for Physical Interface Devices (PID) Version 1.0 Sep. 8, 1999, 46 pages.

"Dual Force: Play station Analog Controller", Mad Catz, Inc., 1999, 1 page.

"Electric Plastics", http://www.memagazine.org/backissues/april98/features/plastics/plastics.html, printed Dec. 14, 2001, 6 pages.

"Examination of Core Shroud Welds", Larsen, Jens; Hans Kristensen and Leif Jeppesen, http://www.ndt.net/article/ecndt98/nuclear/219/219.htm, May 21, 2002, 4 pages.

"F/T (force/torque) Sensor System", Multi-Axis Sensors, http://www.ati-ia.com/axis.htm, Apr. 7, 2002.

"Fluid Power Research Consortium" Ohio State University, http://www.missouri.edu/~manringn/consortium/research_walking.htm, printed Feb. 22, 2002.

"Forward Displaement Analysis of a Special stewart-Gough Platform" Huang, Y. et al., "no date".

"GU @ Comdex—Damn This is Cool", http://www.porazzo.com/old/About/Media/Media, "no date".

"HS-CE Provides 3-Axis Measurements", http://www.corrsys-datron/hsce.htm, printed Mar. 1, 2002, 2 pages.

"Human-Machine Interface of the Utar System", Žalud, Lud k; Honzík, Bohumil; Šolc, František; 11th DAAAM International Symposium, "Intelligent Manufacturing & Automation: Man—Machine—Nature" Oct. 2000.

"International Seminar on the Technology of the Inherently=Conductive Polymers", http://209.51.194.07, printed Dec. 14, 2001, 11 pages.

"Les robots a mouvements spatiaux/Spatial robots", http://www-sop-inria.fr/copin/equipe/merlet/Archi/node2.html, printed Feb. 22, 2002, 32 pages.

LogiCad, Mouse label, Magellan/Spacemouse, "no date".

"Mearthane Products Corporation—Business Machine Components", http://www.mearthane.com/machcomp..htm, printed Dec. 14, 2001, 1 page.

"Mearthane Products Corporation—Conductive and Antistatic Urethanes", http://www.mearthane.com/antistatic.htm, printed Dec. 14, 2001, 2 page.

"Mearthane Products Corporation—Conductivity—Durethane", http://www.mearthane.com/table.htm, printed Dec. 14, 2001, 1 page.

"Mearthane Products Corporation—Mearthane offers Conductive Urethane", http://www.mearthane.com/news5.htm, printed Dec. 12, 2001, 2 pages.

"Metallic Properties of PAni blends: Thermo power", http://www.zipperling.de/Research/abstract/thermop.html, printed Dec. 14, 2001, 1 page.

"MPLab: IDS v 5.50" disk, Microchip Technology, Inc., 2001, 3 pages.

"Nanotechnology with Organic Metal", http://www.zipperling.de/Content-Start.en.html, printed Dec. 14, 2001, 2 pages.

"Optical Distance Sensor: Seiko Precision, Inc.", http://www.seiko-p.co.jp/opt/opt2e.html, printed Mar. 1, 2002, 2 pages.

"Ormecon—A Conductive Polymer—An Organic Metal", http://www.zipperling.de/Products/PAni/u-sichte.html, printed Dec. 14, 2001, 3 pages.

"Package Outlines: Plastic SIP", Allegro Microsystems, Inc., pp. 29-30, 1999.

"Power on the Prowl—These boots are made for walking and talking", Popular Science, Jan. 2002, 1 page.

"Precise 3-D Navigation of Construction Machine Platforms", Kahmen & Günther Retscher, Department of Applied and Engineering Geodesy, Vienna University of Technology, Austria, 5 pages, "no date".

"Press Release", http://www.3dconnxion.com/press/20011022.html, printed Nov. 26, 2001, 2 pages.

"Product Overview—Space Ball 4000", http://www.3dconnxion.com/products/4000/, printed Nov. 26, 2001, 2 pages.

"Product Overview—Space Mouse Classic", http://www.3dconnxion.com/products/Classic.htm, printed Nov. 26, 2001, 2 pages.

"Product Overview—SpaceMouse Plus", http://www.3dconnxion.com/products/plus.htm, printed Nov. 26, 2001, 2 pages.

"Publications", www.cse.psu.edu, Sep. 28, 2002, 2 pp.

Redundancy Resolutionof a Cartesian Space Operated Heavy IndustrialManipulator, Homegger, M.; A. Codourey, Institute of Robotics, Zürich, Switzerland, May 1998, 5 pages.

"Search, Identify, and Destroy; A robotic Solution to Urban Warfare", Dupuis, Captain Ray and Tremblay, Captain Dean, Land Forces Technical Staff Programme V, Royal Military College, Kingston, Jun. 15, 2000.

"The ServoRam", 21 pp., "no date".

"The Stewart-Gough Platform on General Geometry Can have 40 Real Postures", P. Dietmailer; Institut für Mechanik, Technische Universität Graz, Austria, 1990 Kluwer Academic Publishers.

"Tools Used in Excavation", Tools of the trade, http://www.ufpo.org/excavation_studd/tools_of_trade.htm, May 21, 2002, 6 pages.

"Toward Next-Generation Construction Machines", Bostelman, Roger; James Albus, Bill Stone, American Nuclear Society 9th International Topical Meeting on Robotics and Remote Systems, Seattle, WA, Mar. 4-8, 2001, 12 pages.

"Treillis articules/Truss", http://www-sop.inria.fr/coprin/equipe/merlet/Archi/node3.html, printed Feb. 22, 2002, 2 pages.

"Turn on the Media Management Team", http://www.turnonmedia.com/turnon/about/who.cfm, printed Feb. 22, 2002, 2 pages.

"Varatouch Technology Center: R2 Technology", http://www.varatouch.com/peitech.html, printed Feb. 22, 2002, 6 pages.

"Vishay Brands—Vishay Telefunken—Photo Darlington Transistors, Photo Schmitt Trigger", http://www.vishay.com/brands/telefunken/IRDother.html, printed Mar. 1, 2002.

"Vishay Brands—Vishay Telefunken—Photo Detectors", http://www.vishay.com/brands/telefunken/detectors.html, printed Mar. 1, 2002.

"Ziba Design Wins Unprecedented Four Gold Design Excellence Awards", http://www.ziba.com/pr/21.htm, printed Feb. 23, 2002, 2 pages.

"Ziba Design, Inc.—Strategic Design Consultancy", http://www.ziba.com/home.htm, printed Feb. 23, 2002, 1 page.

2000 Japan—USA Flexible Automation Conference, "Kinematic Calibration of a Hexapod Machine Tool by Using Circular Test", Jul. 23-26, 2000, 4 pp.

500,000 Bobcat Skid-Steer Loaders and Counting—Worksaver Spring 2001 Brochure.

Autolev Sample Problem: Stewart Platform (Hexapod), "Stewart Platform Analysis", Sep. 20, 2002, www.autolev.com, 4 pp.

Bachrach, B., "Diagonalizing Controller for a Superconducting six-axis Accelerator", Proceedings of the 28th Conference on Decision and Control Dec. 1990, pp. 2785-2793.

Bernstein, Jonathan, "An Overview of MEMS Inertial Sensing Technology", Sensors Feb. 2003, pp. 14-21.

Bobcat, "Attachments for Loaders/Excavators", 8 pp., "no date".

Bobcat, "Auger Attachments", 4 pp., "no date".

Bobcat, "Brushcat Rotary Cutter Attachment", 2 pp., "no date".

Bobcat, "Soil Conditioner Attachment", 2 pp., "no date".

Bobcat, "Tiller Attachment", 2 pp., "no date".

Bobcat, "Trencher Attachments", 2 pp., "no date".
Bobcat, "V518-V623 VersaHandler, Telescopic Tool Carrier", 6 pp., "no date".
Bobcat, "Worksaver catalog", 2002, 40 pp.
Bobcat, Melroe & Ingersoll-Rand, "Industrial Grapple Attachments", 2 pp., "no date".
Bookmarks on Parallel Manipulators, "Web Sites Related to Parallel Robots", Sep. 20, 2002, wwwrobot.gmc.ulaval.ca, 3 pp.
Bruynunckx, Herman, et al., "Comments on 'Closed Form Forward Kinematics Solution to a Class of Hexapod Robots'", Copyright 1999, 3 pp.
Bush Hog Front End Loaders M346, M446, M546, M626 Operator's Manual 50030231, "no date".
Bush Hog Mounting Instructions for 24H49871 Grapple Attachment, Feb. 1998 1 page.
Case, "Skid Steer Loaders", May 20, 2002, www.casece.com, 2 pp.
Description of Sourcefiles, "EMC Source Code Documentation", Sep. 20, 2002, www.linuxcnc.org, 17 pp.
Enumerative Real Algebraic Geometry: The Stewart-Gough platform; http://www.maths.univ-renns1.fr/~raag01/surveys/ERAG/S3/3.html, Sep. 28, 2002 3 pages.
Erickson, B, "Mayo Graduate School", http://www.mayo.edu/faculty/erickson.htm, printed Mar 1, 2002, 1 page.
Gloess, R., "Hexapod Parallel Kinematics with Sub-Micrometer Accuracy", Actuator 2000, pp. 293-295.
Harris, M., "The Space Orb Controller", http://alpha2.bmc.uu.se/markh/notes/joy/spaceorb.html, printed Feb. 22, 2002, 2 pages.
http://static.howstuffworks.com/gif/skid-steer-coupler.jpg May. 20, 2002.
Hydraulic Hammer, http://static.howstuffworks.com/gif/skid-steer-hydraulic-hammer.gif, May 20, 2002.
Industrial Grapple Bucket, http://static.howstuffworks.com/gif/skid-steer-industrial-grapple-bucket.gif, May 20, 2002.
Ingersoll Rand, "VR-530 Telescopic Material Handler", 2001, 4 pp.
Ingersoll Rand, "VR-623 Telescopic Tool Carrier", 2001, 4 pp.
Ingersoll-Rand, "VR-10044/VR-1056 Telescopic Material Handler", 2001, 4 pp.
Ingersoll-Rand, "VR-843 Telescopic Material Handlers", 1999, 8 pp.
Innovation & Technology Transfer, Innovation Programme News, Jan. 1997, A Boost for European Heavy Industry, http://www.cordis.lu/itt/itt-en-97-1/ip-news.htm, May 21, 2002, 5 pages.
Jackson, A., "The Further Step Touch Control For Your Vibroplex EK-1", Say you saw it in CQ, Jan. 1986, pp. 13-19.
Ji, Ping, et al., "A Closed-Form Forward Kinematics Solution for the 6-6$^P$ Stewart Platform", IEEE Transactions On Robotics and Automation, vol. 17, No. 4, Aug. 2001, pp. 522-526.
John Deere, "548G-111, 648G-111, 748G-111 Grapple Skidders", 2001-2006, 18 pp.
John Deere, "644 H—Log Loader", 2000-2004, 6 pp.
John Deere, "853 G—Feller-Bunchers", 2000-2010, 8 pp.
Journal of Research of the National Institute of Standards and Technology, "News Briefs", vol. 102, No. 4, Jul.-Aug. 1997, pp. 499-522.
JRSJ, "Special issue—The Theory of Telerobotics", Sep. 20, 2002, www.sanbi.co.jp/rsj/Conts/Vol_11/Vol11_6e.html, 3 pp.
Kennedy, Kevin & Associates, "Your Experts in Machining and Machine Tools and T . . . ", Sep. 20, 2002, www.kkai.com, 20 pp.
Kost, et al., "Effects of Axial Stretching on the Resistively of Carbon Black Filled Silicone Rubber", Polymer Engineering and Science, 1983, pp. 567-571.
Landscape Tiller, http://static.howstuffworks.com/gif/skid-steer-landscape-tiller.gif, May 20, 2002.
Material Handling Arm, http://static.howstuffworks.com/gif/skid-steer-material-arm.gif, May 20, 2002.
Mingus, L., "Space Orb 360 Review", http://www.makeitsimple.com/reviews/space_orb/, printed Feb. 22, 2002, 2 pages.
MMS Online http://www.geekfaction.net/pro/nph-pro.p1/010110A/http/www.mmsonline.com/columns/0..., Sep. 28, 2002.
MTS Temposonics Position Sensors, MTS Sensors Group, 2000 Brochure.
Neue Seite 1, "IWF Hexaglide", Sep. 20, 2002, www.iwf.bepr.ethz.ch/web/en/forschung/wzm/hexa1.shtml, 9 pp.
New Holland Series LM Telehanders http://www.newholland.com/nh/teleh.htm, May 20, 2002, 2 pages.

New Holland, "Attachment Adapter Plates", 1996, 2 pp.
New Holland, "Skid Steers", 2000, 12 pp.
New Holland, "Skid-Steer Loader Attachments", May 20, 2002, 1 page.
New Holland, "Skid-Steer Loader Attachments", May 20, 2002, 2 pp.
New Holland, "Skid-Steer Loader", May 20, 2002, 3 pp.
NRL-Materials Science and Technology Division, "Six Dimensional Loader", Sep. 20, 2002, http://mstd.nrl.navy.mil, 2 pp.
Pike, G., "Electrical properties of Conducting Elastomers", NASA: Center for Aerospace Information, "no date".
Predko, M., "PicMicro Microcontroller Pocket Reference", McGraw-Hill, 2000.
Predko, M., "Programming and Customizing PicMicro Microcontrollers", McGraw Hill, 2001.
Retro Tech Search & Tech Track Summary; http://asp.nerac.com/cust_access_asp/SearchRequest/retro_tech_track_confirm.asp; Sep. 20, 2002, 2 pages.
Richfield, P., "Integrated avionics suites showcase new pilot interface concepts", Professional Pilot, Jan. 2002, pp. 56-60.
Robinson, David, et al., NASA Goddard Space Flight Center, "DCATT Peer Review", Aug. 17, 1998, 77 pp.
Sabin, Malcolm home page, www.damtp.cam.ac.uk, Sep. 28, 2002, 2 pp.
Sau, K.P. "The Effect of Compressive Strain and Stress on Electrical Conductivity of Conductive Rubber Composites", Rubber Technology Centre, Indian Institute of Technology, pp. 310-324, "no date".
Serkey, JM, "Handwashing Compliance: What Works?", Cleveland Clinical Journal of Medicine Apr. 2001; 68(4):325-9, 333-4, 336.
Sharir, R., et al., "High-Level Handwashing Compliance in a Community Teaching Hospital: A Challenge That Can Be Met!", Journal of Hospital Infection Sep. 2001; 49(1):55-8.
Spacetech, "This isn't your fathers Joystick", http://www.gamedemo.com/ezine/jan97/orb360.htm, printed Feb. 22, 2002, 2 pages.
Stevens, B., "Birth Place of the SpaceOrb 360: Engineering Technology Transfer Begets New Low-Cost Consumer "6D" Gaming Device", http://www.casystems.com/profiles/1997/9711a05.html, printed Feb. 22, 2002, 2 pages.
Storrs, John, "Distribution Notes for Hexapod-1.1", Copyright 1997, www.i-way.co.uk, 4 pp.
Storrs, John, "Hexapod Software Model", Sep. 28, 2002, www.i-way.co.uk., 3 pp.
Storrs, John, "LME Hexapod Machine", Sep. 28, 2002, www.i-way.co.uk, 2 pp.
Stump Grinder, http://static.howstuffworks.com/gif/skid-steer-stump-grinder.gif, May 20, 2002.
Techno park, Know how Navigator: Firmenansicht Sundin GmbH, http://www.navigator.technopark.ch/htdocs/firmen/Sundin=95GmbH.html, printed Feb. 24, 2002.
Trencher, http://static.howstuffworks.com/gif/skid-steer-trencher.gif, May 20, 2002.
University of Washington—Control & Robotic Systems Laboratory, "A Look at the Pole/Zero Structure of a Stewart Platform Using Special Coordinate Basis", Jun. 24, 1998, 16 pp.
Utility Grapple Bucket, http://static.howstuffworks.com/gif/skid-steer-utility-grapple-bucket.gif, May 20, 2002.
Viren, B., "How to Use the SpaceOrb under Linux or Unsupported Secrets of the SpaceOrb Protocol", printed Feb. 22, 2002, 5 pages.
VR News, "Notion Simulation", Sep. 20, 2002, www.vrnews.com, 2 pp.
Worksaver, Inc., "Worksaver Grapple for Skid Steer and Front Loader", www.worksaver.com, May 20, 2002, 2 pp.
Yashin, V.V., et al. "A Model for Rubber Degradation Under Ultrasonic Treatment: Part II. Rupture of Rubber Network and Comparison with Experiments", Department of Polymer Engineering, The University of Akron, p. 325, "no date".
Yuzhen, Huang, et al., "Forward Displacement Analysis of a Special Stewart-Gough Platform", 10 pp., "no date".
Zhai, S., PhD "Human Performance in Six Degree of Freedom Input Control", http://vered.rose.utoronto.ca/people/shumin_dir/papers/PhD_Thesis/Chapter1/Chapter11.html, Mar. 25, 2002, 2 pages.

Zhai, S., PhD, "Interaction in 3D Graphics", http://www.siggraph.org/publications/newletter/v32n4/contributions/zhai.html, Mar. 25, 2002, 12 pages.

Zhai, S., PhD, "User Performance in Relation to 3D Input Device Design", http://www.almaden.ibm.com/cs/people/zhai/papers/siggraph/final.html, Mar. 25, 2002, 15 pages.

Parallel Chinese Application No. 038134829; Office action dated Jul. 8, 2007.

International Application No. PCT/US03/11614; International Search Report dated Aug. 9, 2003.

International Application No. PCT/US03/11614; Written Opinion dated Nov. 15, 2004.

International Application No. PCT/US03/11614; Reply to Written Opinion dated Jan. 18, 2005.

International Application No. PCT/US03/11614; International Preliminary Examination Report dated Dec. 27, 2004.

International Application No. PCT/US03/11614; International Preliminary Examination Report dated May 26, 2005.

Parallel Japanese Patent Application No. 2003-585063; Office Action dated Aug. 7, 2008.

* cited by examiner

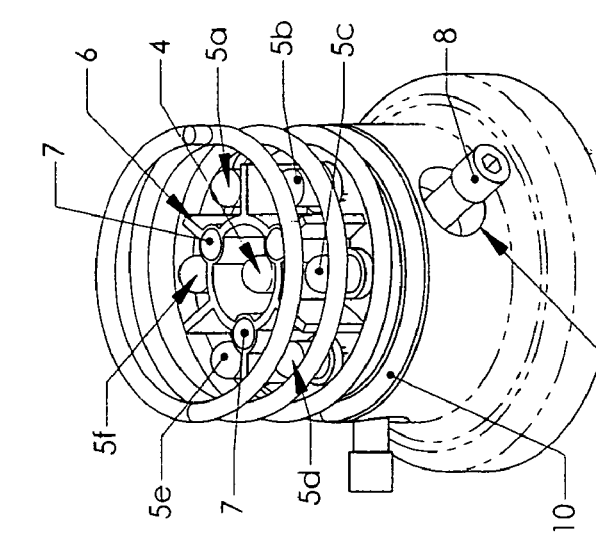
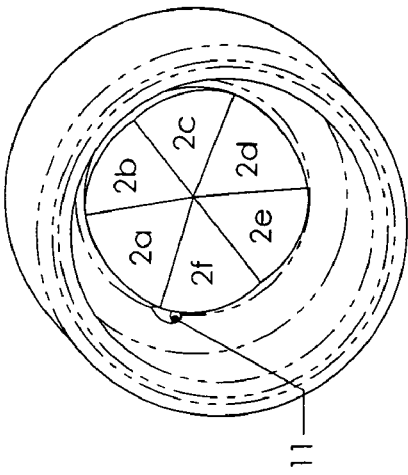
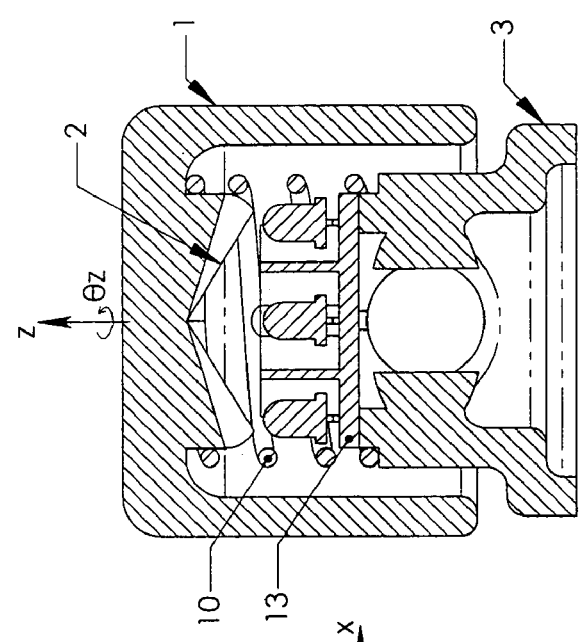
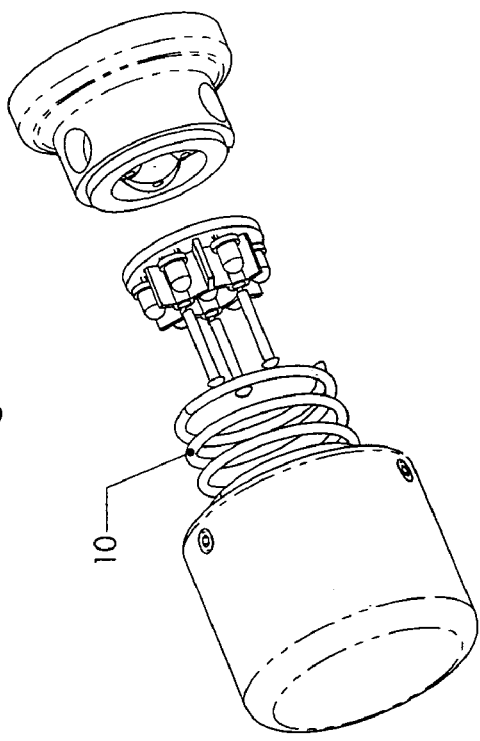
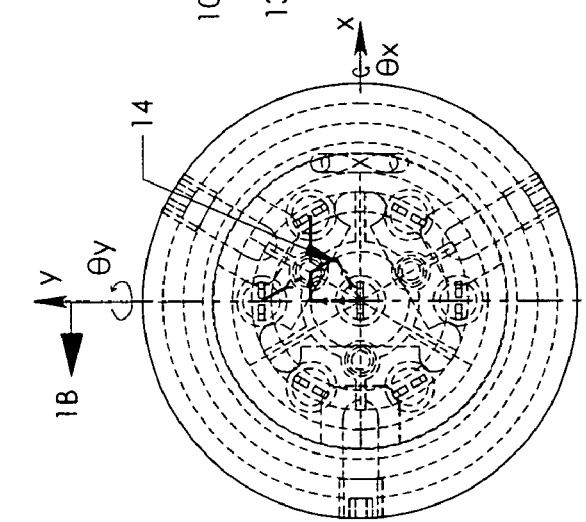
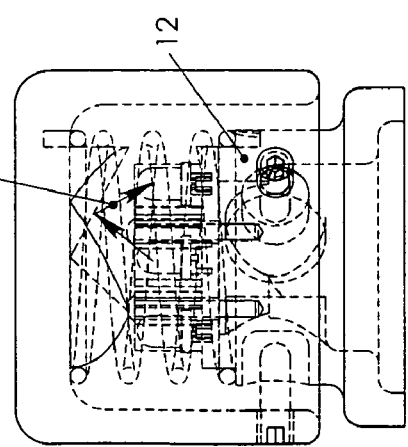

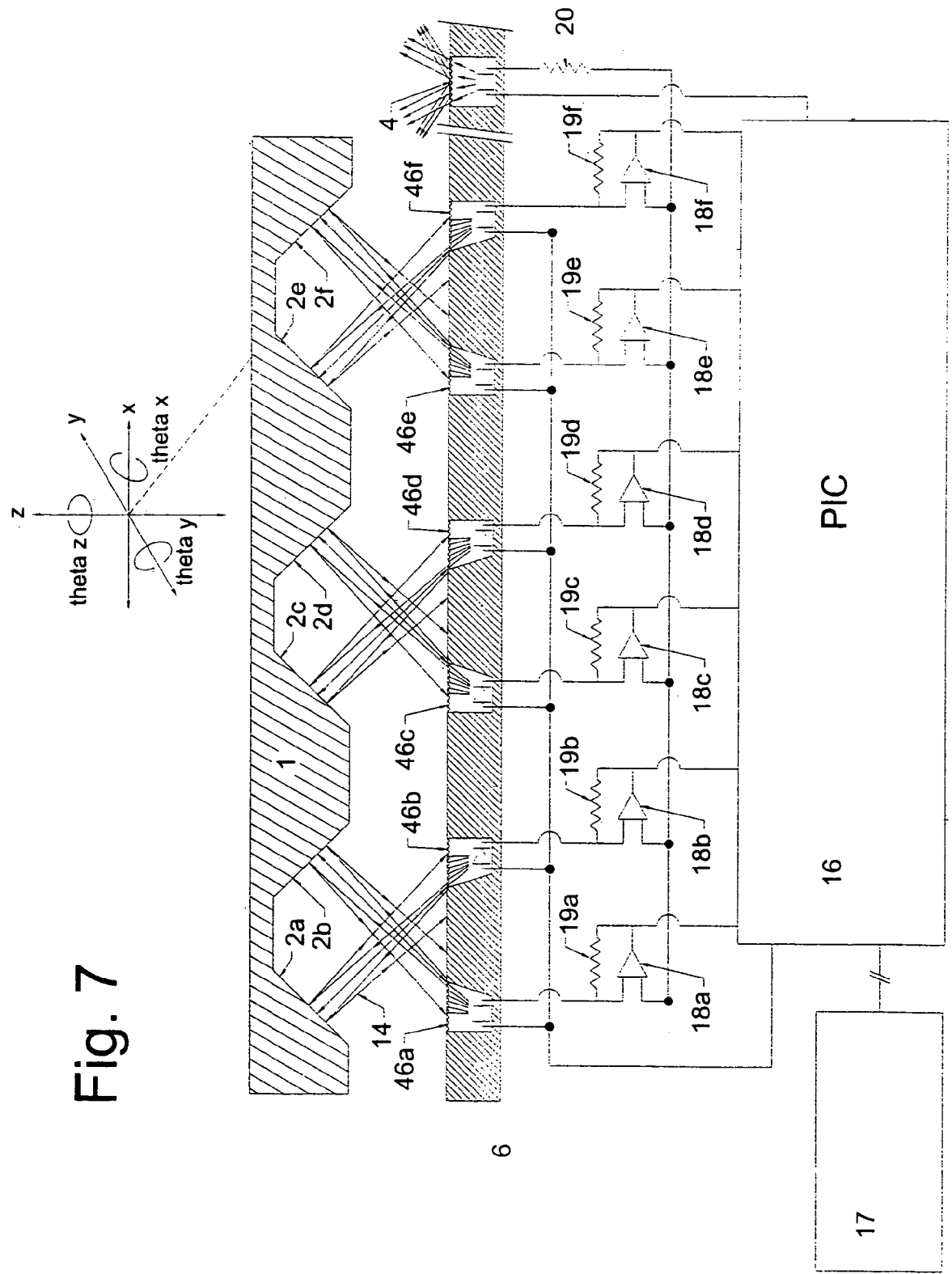

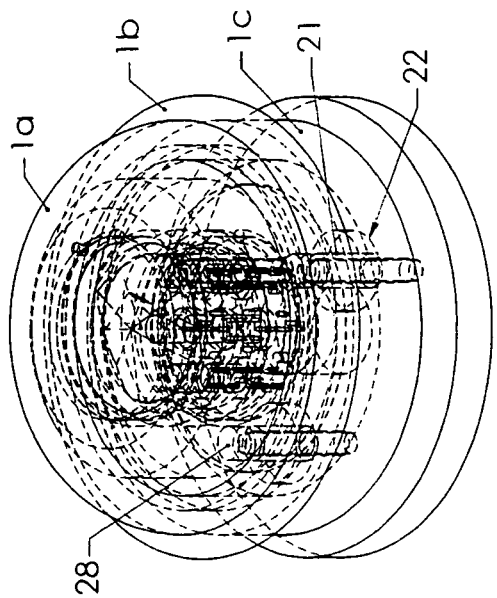
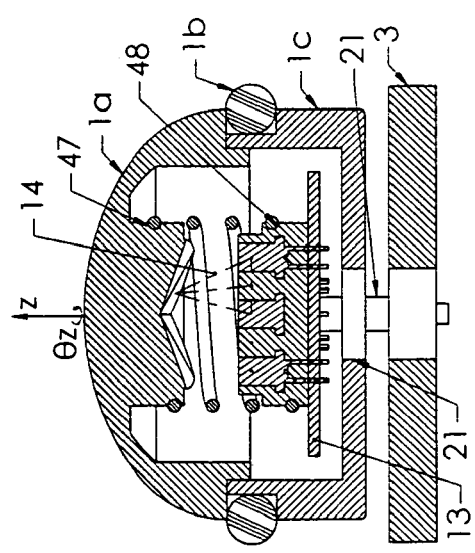
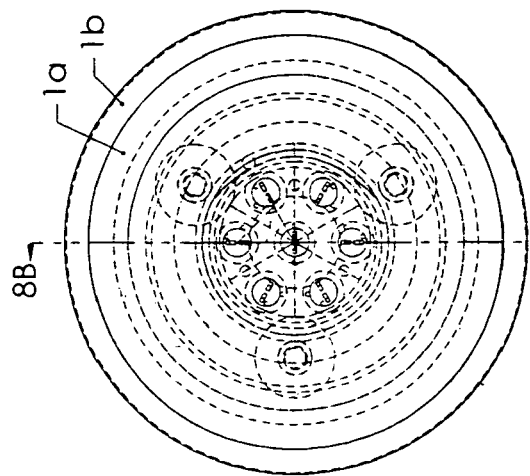
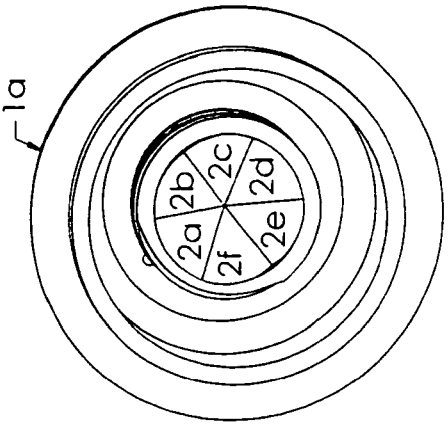
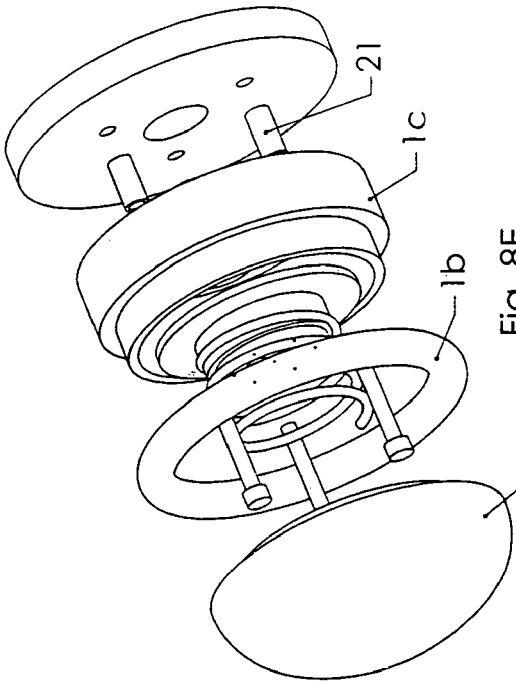
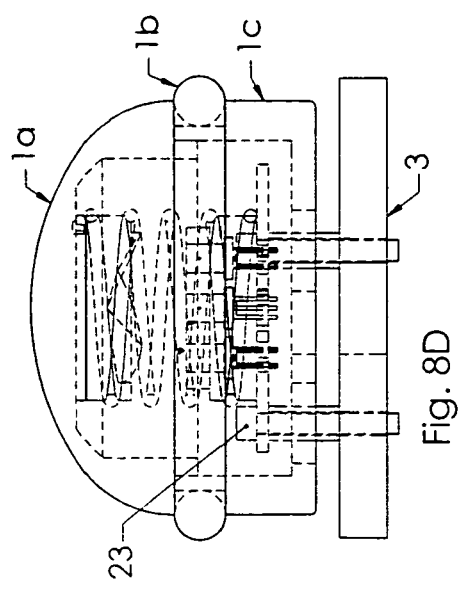

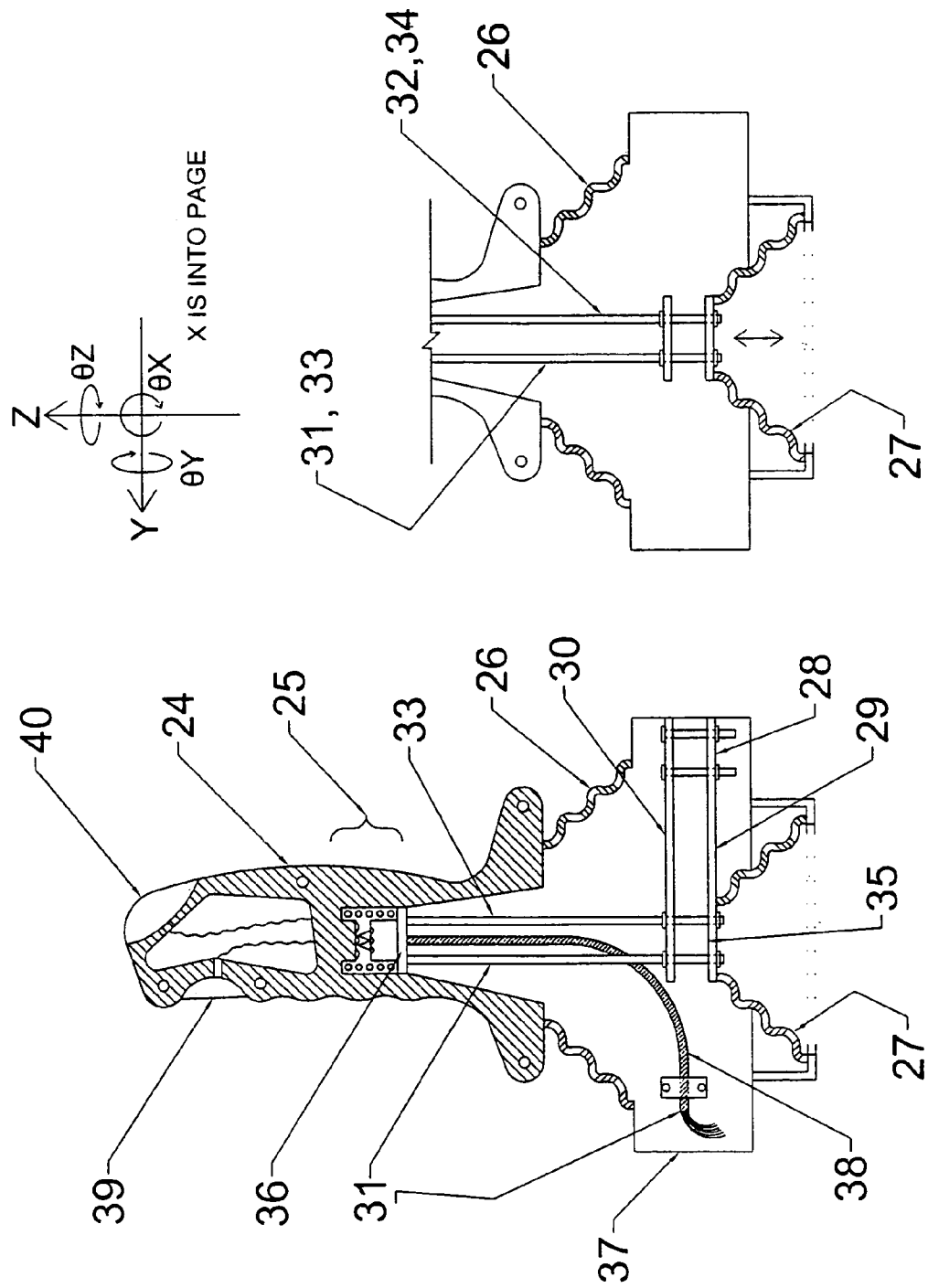

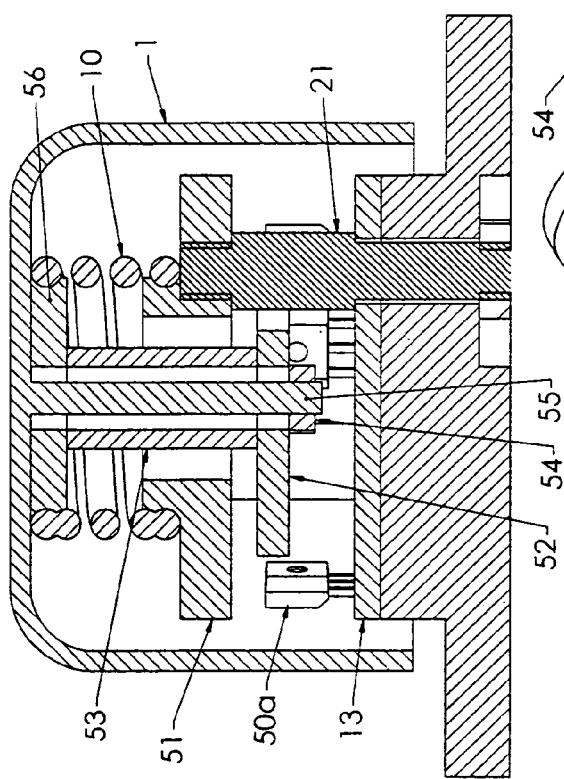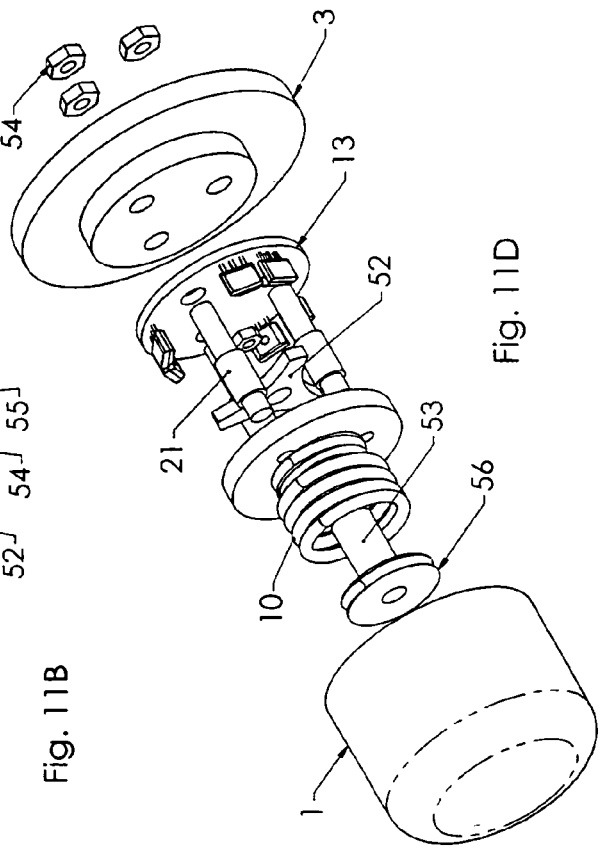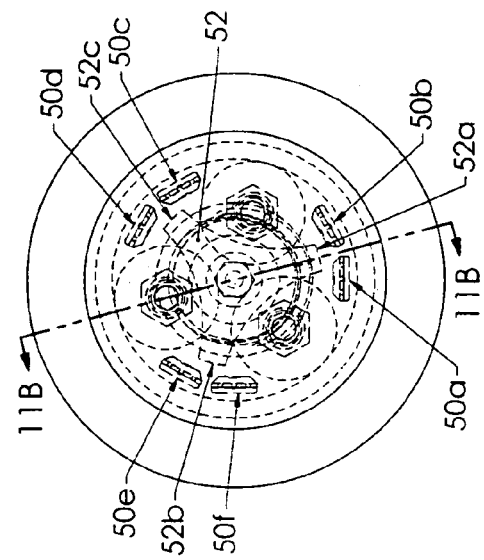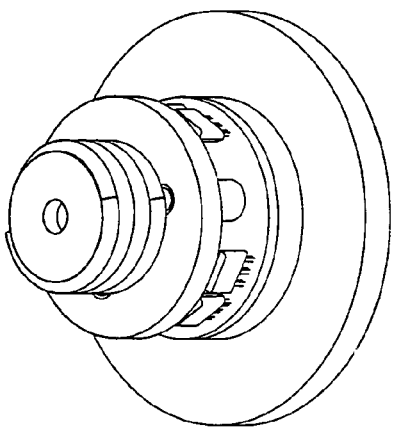

PRINTED CIRCUIT BOARD DETAIL

CIRCUIT DIAGRAM FOR RUBBER PLUG

CIRCUIT DIAGRAM FOR "SPIDER"

CIRCUIT DIAGRAM FOR INDEPENDANT CIRCUIT ELEMENTS

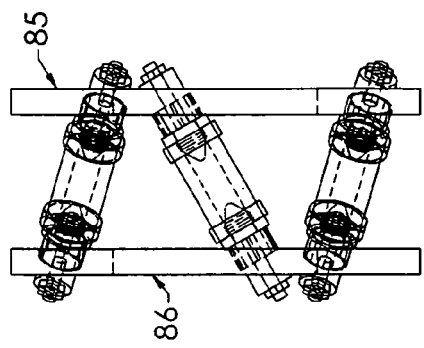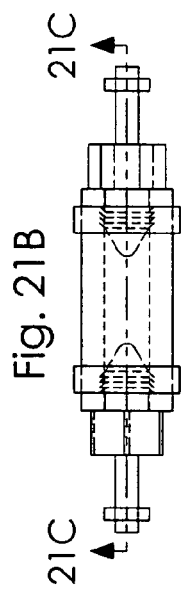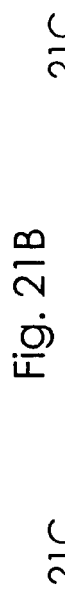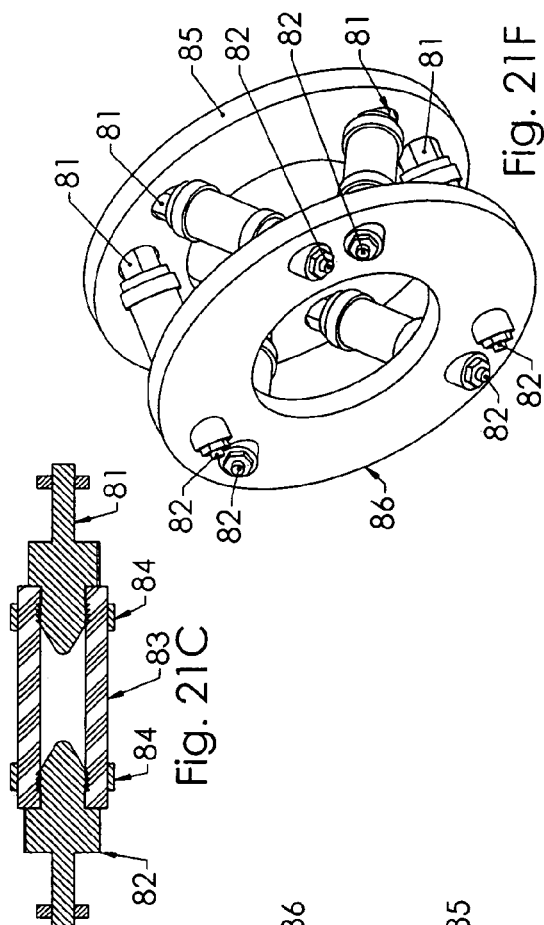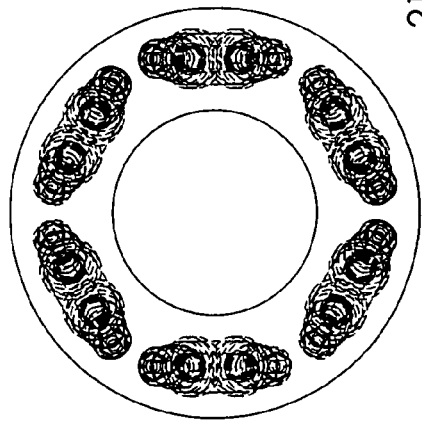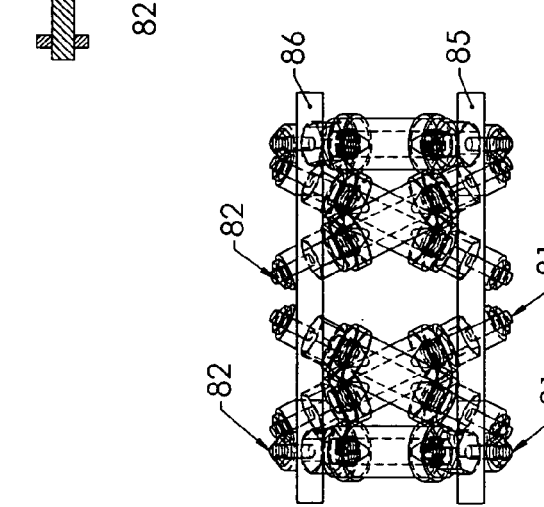

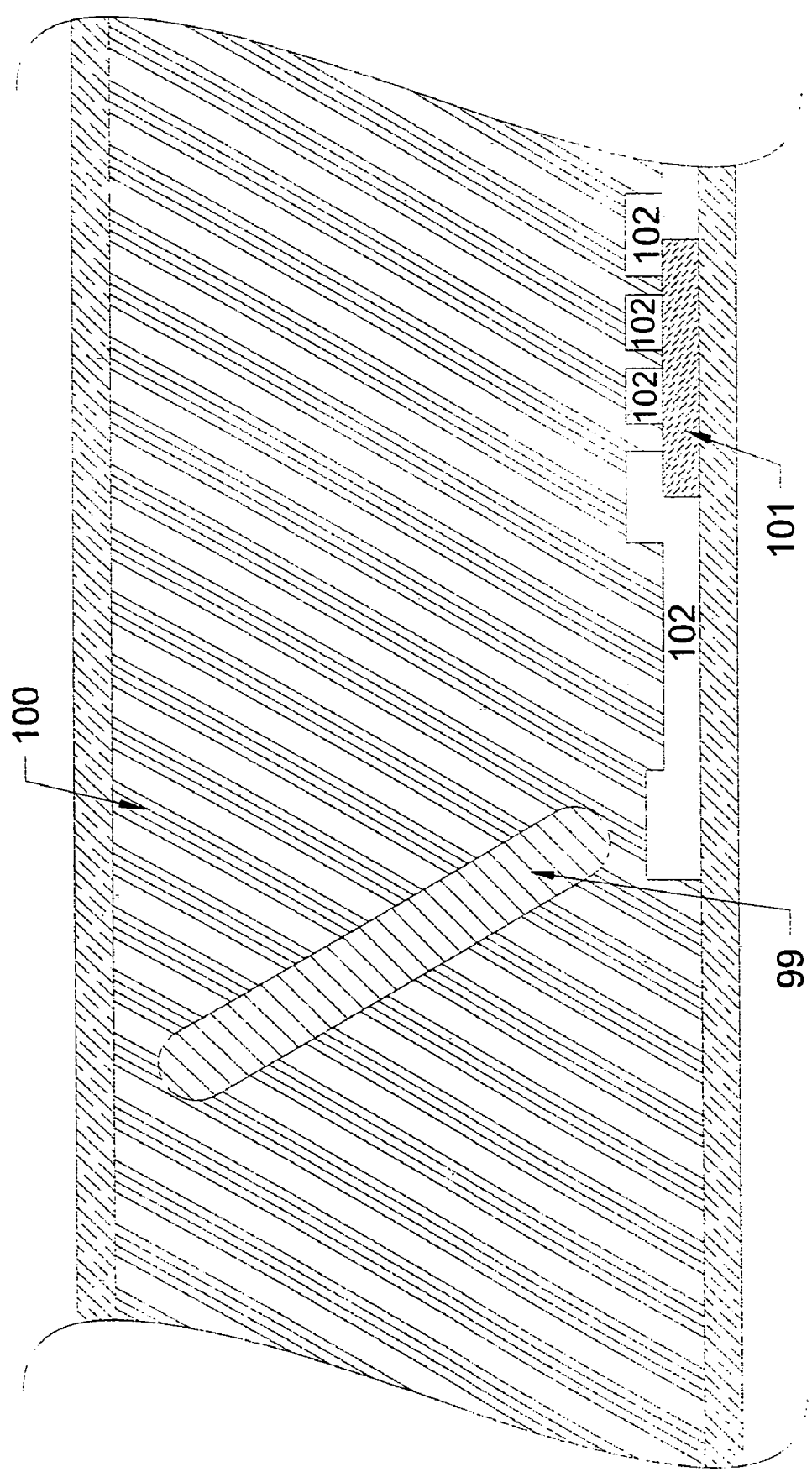

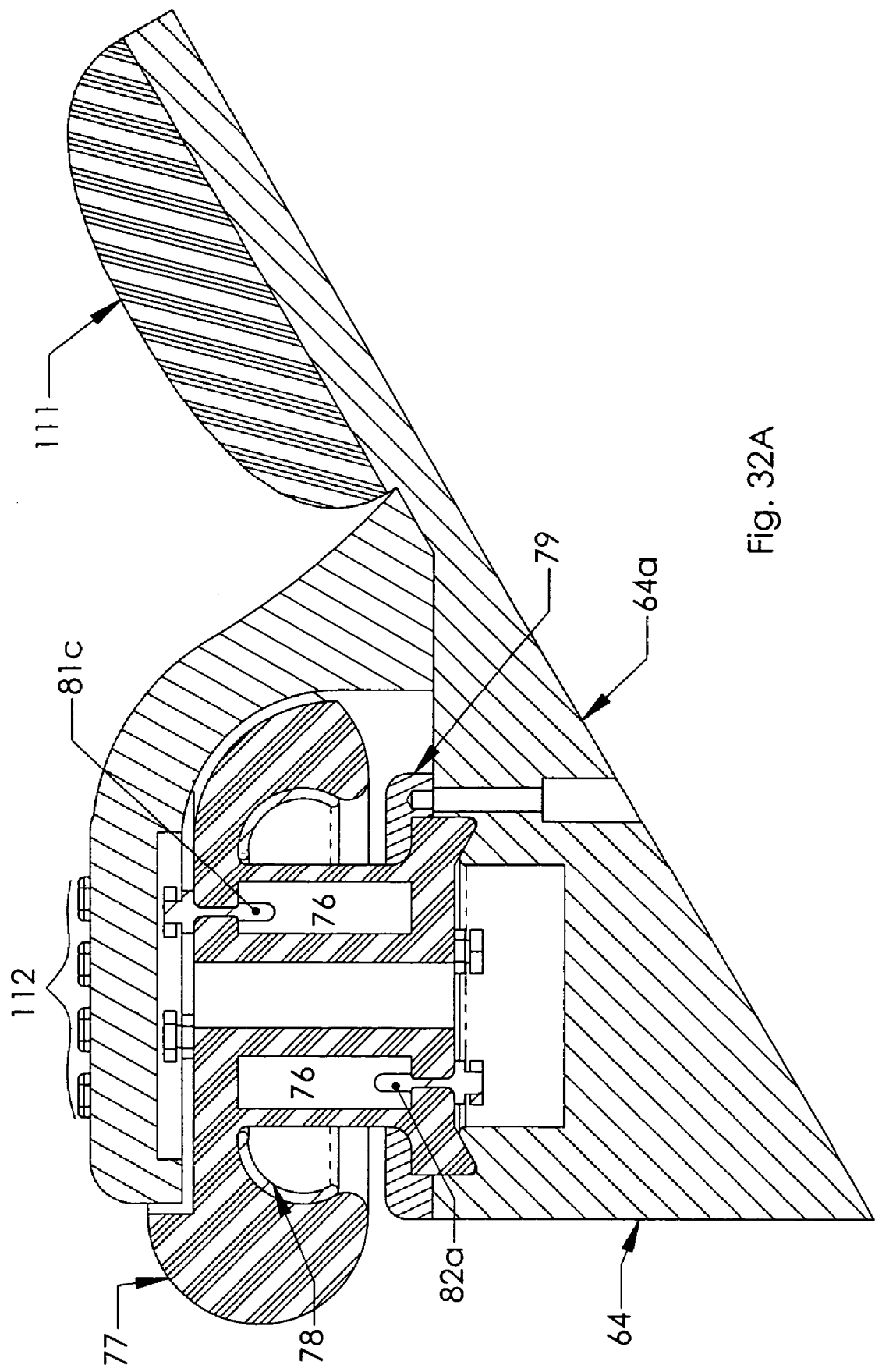

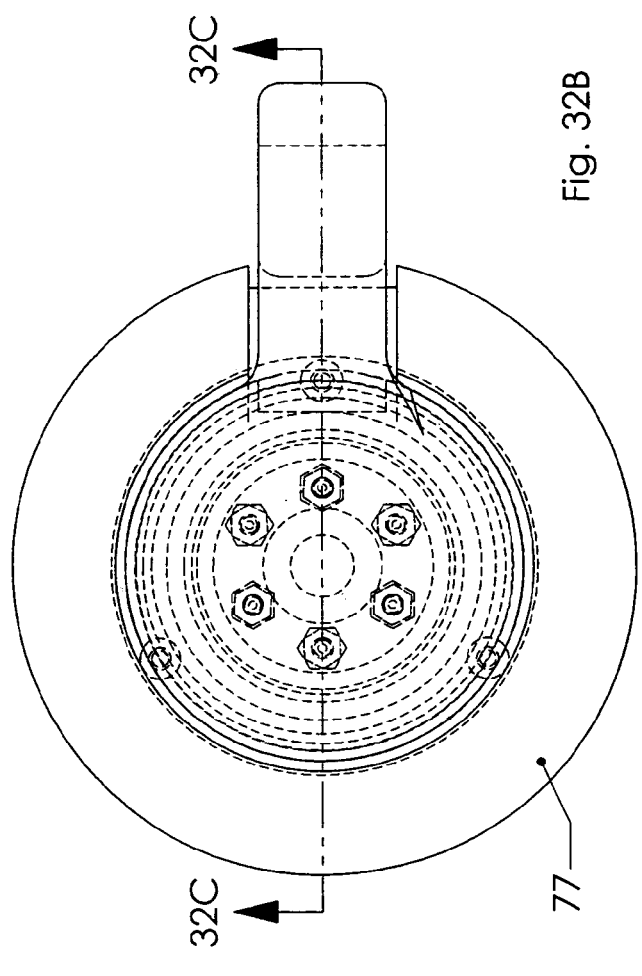
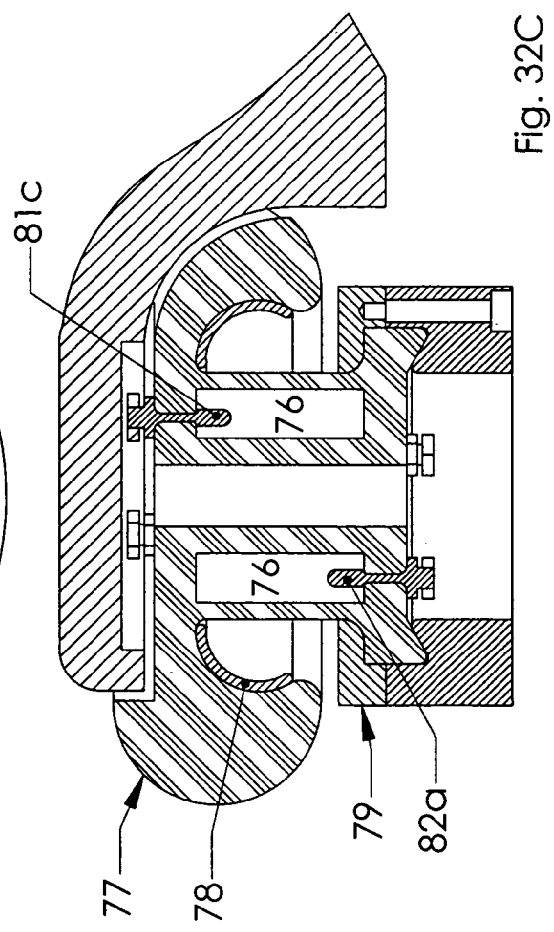

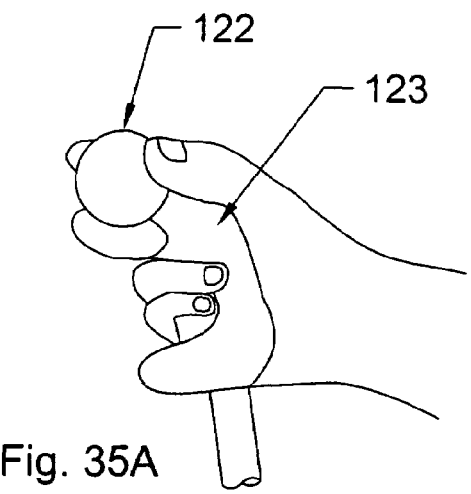
Fig. 35A
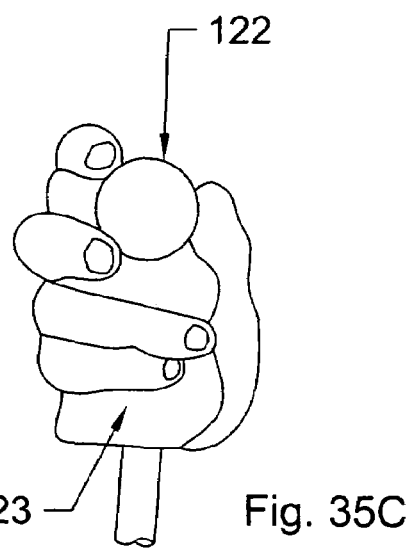
Fig. 35C
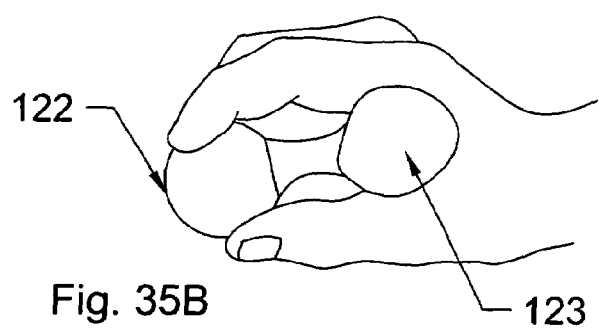
Fig. 35B
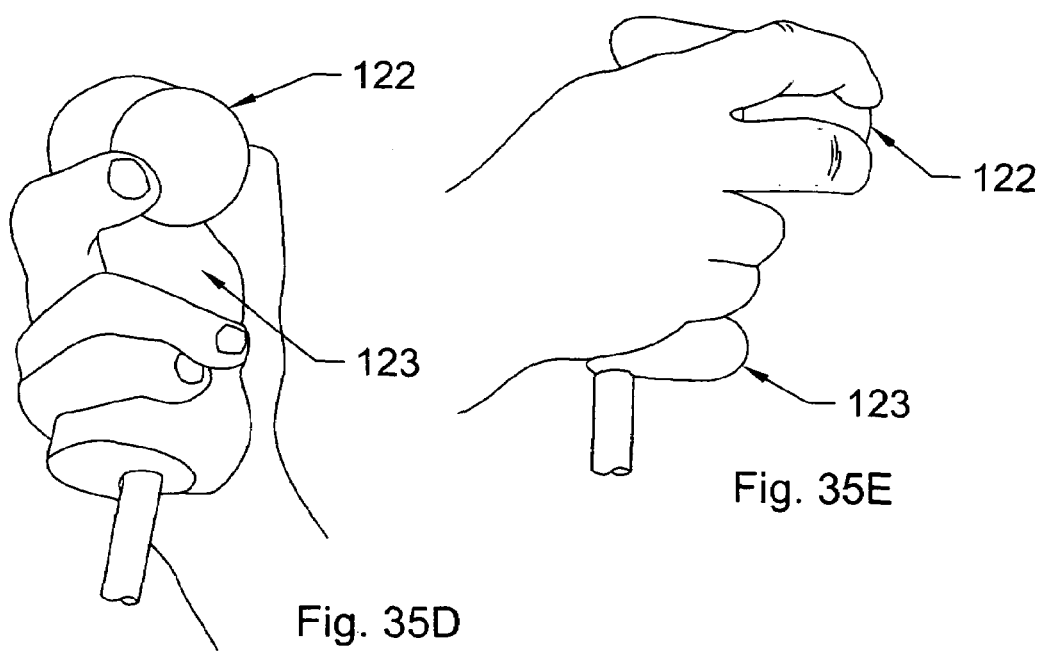
Fig. 35D
Fig. 35E

A, B, C, D, E, F, GND ARE CONNECTED TO A/D CONVERTER CONNECTED TO COMPUTER

ELASTOMERIC SENSING ELEMENT

6-AXIS INPUT DEVICE

CONNECTING PRINTED
CIRCUIT BOARD (TYP)

VOLTAGES AND PHASE ANGLES OF D,
E, AND F ARE A FUNCTION OF BALL
POSITION AND ORIENTATION, 565

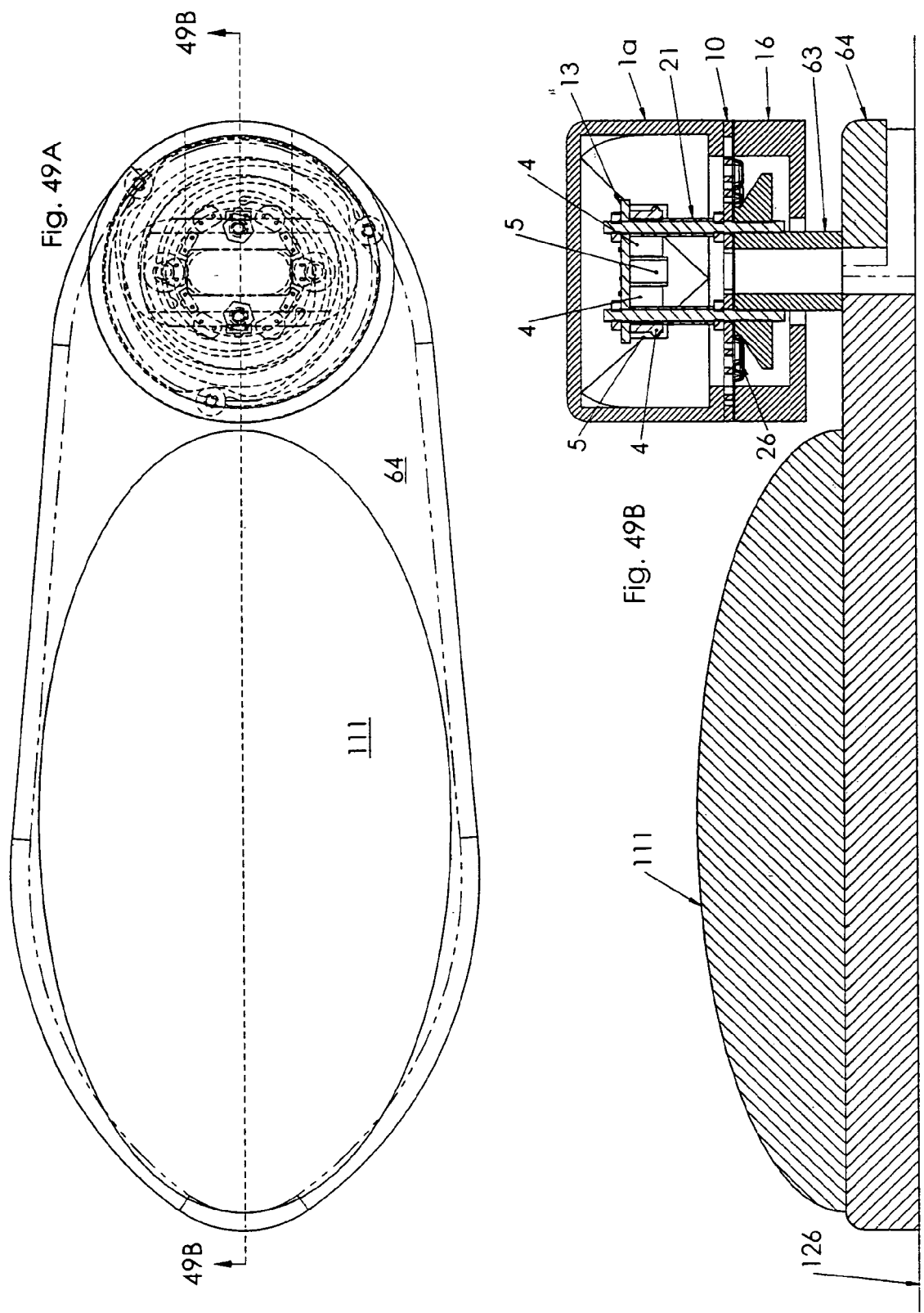

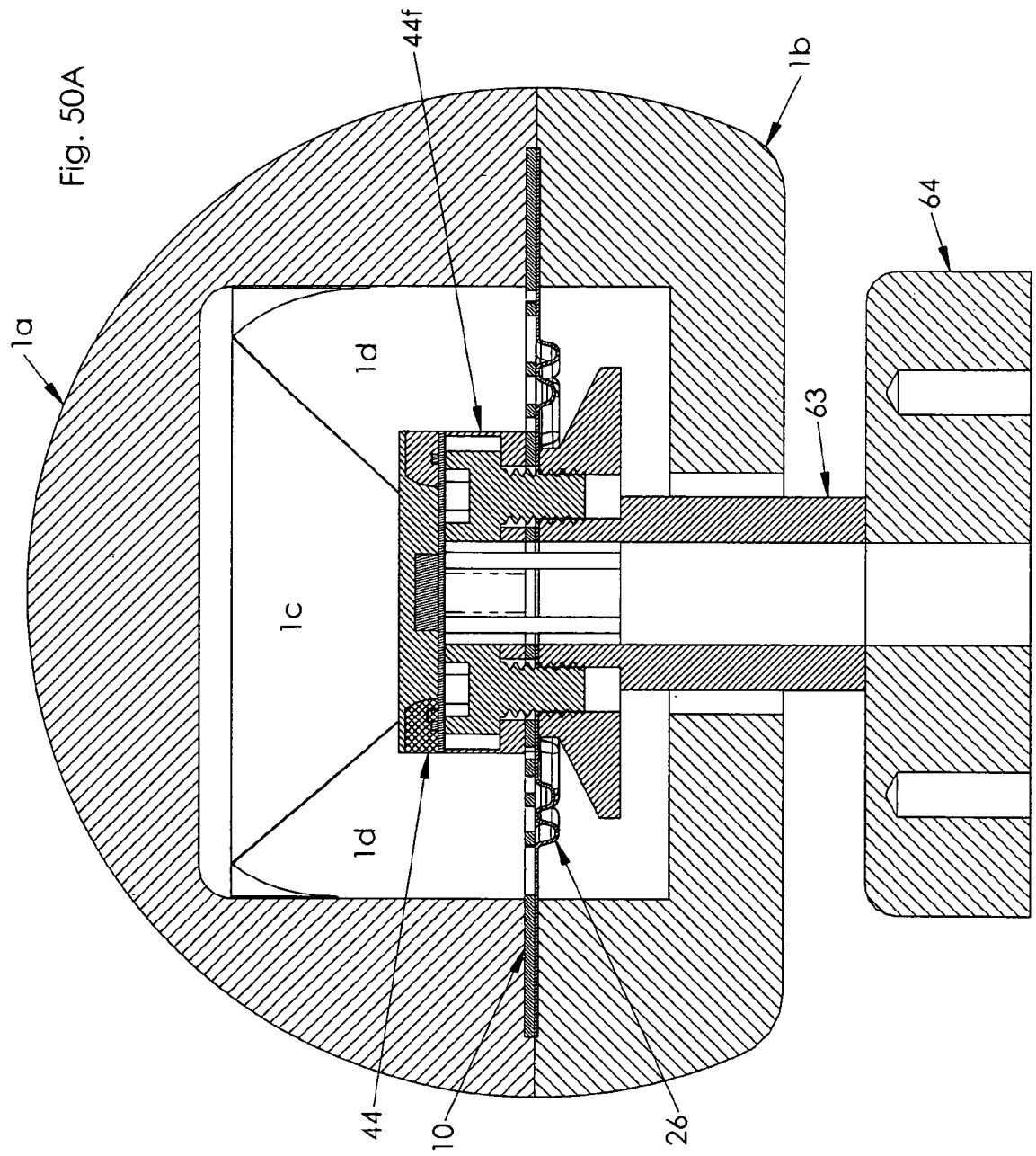

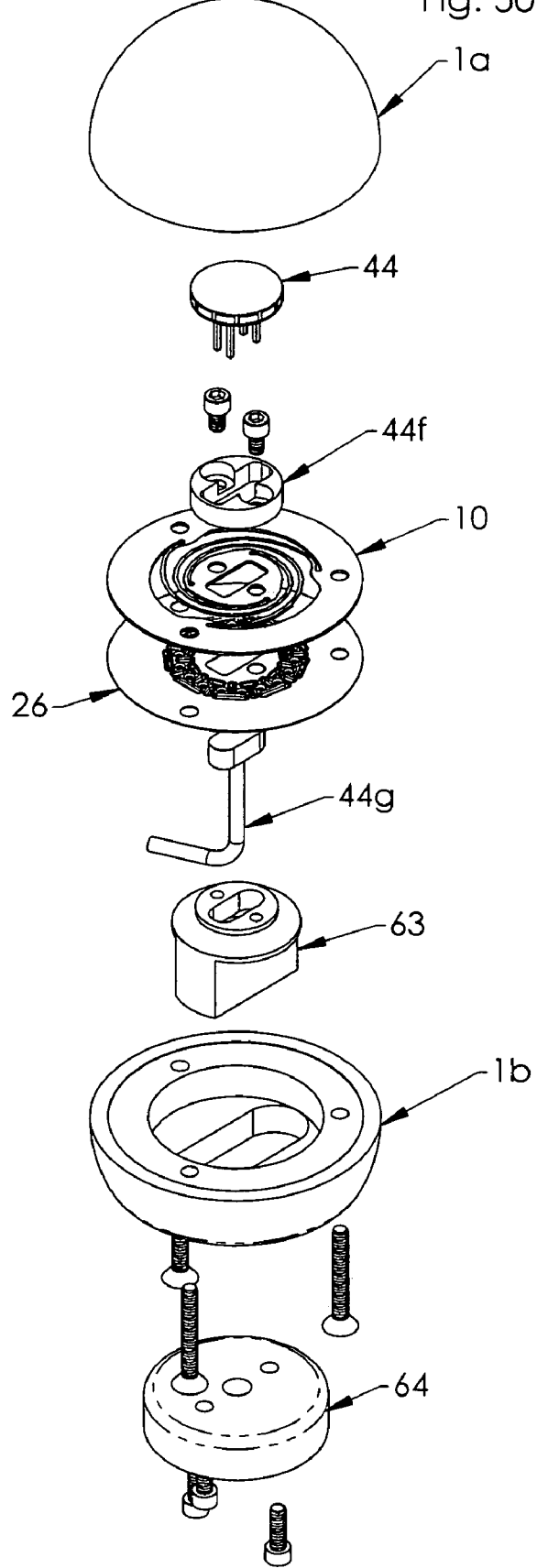

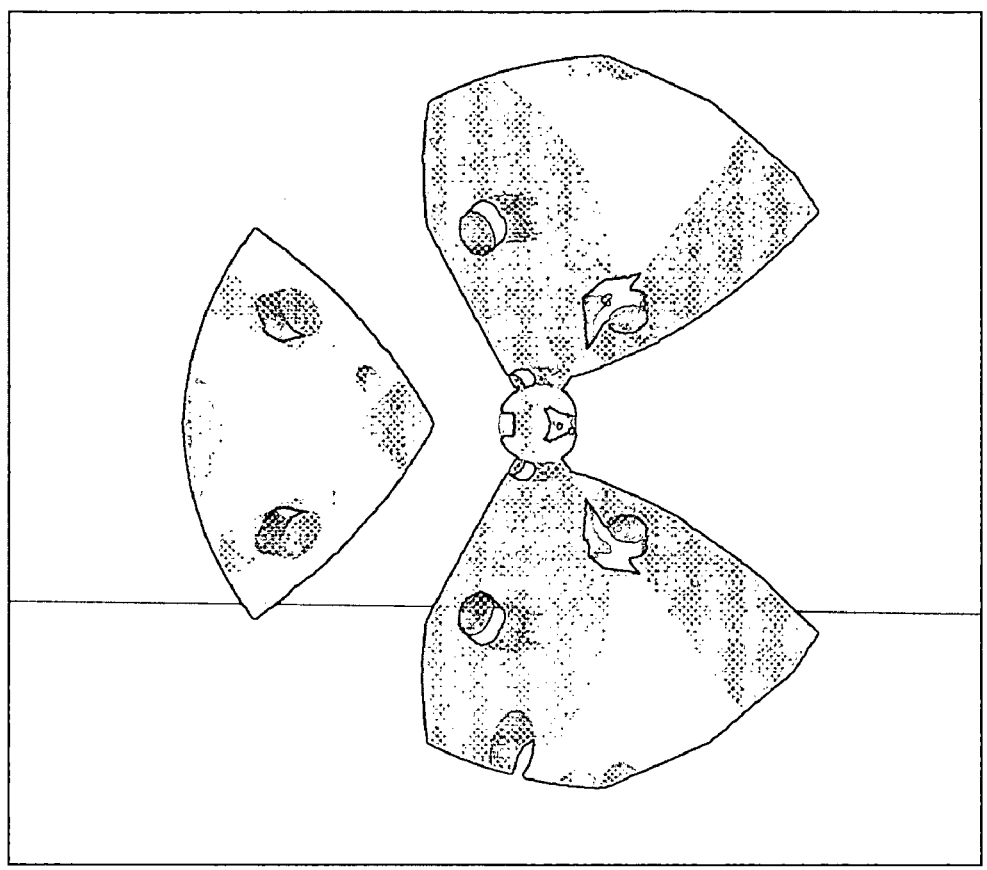
X+  Fig. 61A
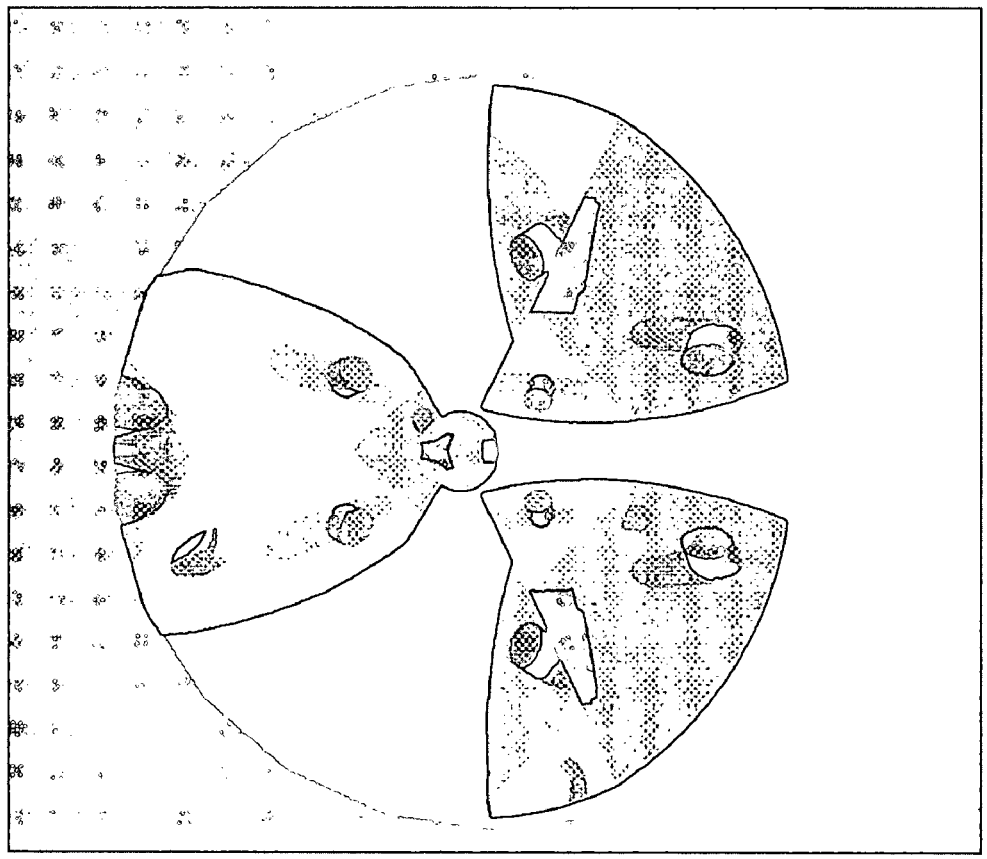
X−  Fig. 61B

MULTI-AXIS JOYSTICK AND TRANSDUCER MEANS THEREFORE

This application is the U.S. National Stage of International Application No. PCT/US03/11614, filed Apr. 14, 2003, and published on Oct. 23, 2003 as WO 03/088204 A1, said international application claiming the benefit of, and filed during the pendency of, U.S. Provisional Application Ser. No. 60/372,216, filed Apr. 12, 2002, each hereby incorporated by reference.

I. TECHNICAL FIELD

The present invention relates to multi-axis input devices such as joysticks for use in, but not limited to, control of computers, control of computer graphics applications in the field of computer-aided design, computer games, and for control of machines such as construction equipment, robotic manipulators, vehicles and the like. The multi-axis optical position transducer herein disclosed may have many other applications, particularly where small size or low cost is important.

II. BACKGROUND

Various attempts have been made to develop commercially viable six axis joysticks. The complexity of the prior art designs has resulted in expensive products which may be only affordable for computer aided design and other high value industrial and commercial applications. The "SpaceOrb®", which was developed by Spacetec IMC Corporation and marketed as a computer gaming peripheral device for several years during the late 1990's, was ultimately discontinued, perhaps due to its complexity and manufacturing cost relative to its roughly $50 to $100 retail price. Patents related to the Spacetec SpaceOrb® which were assigned to Spacetec IMC Corporation as of date of issue include U.S. Pat. No. 5,591,924 to Hilton, U.S. Pat. No. 5,706,027 to Hilton et al, and U.S. Pat. No. 5,798,748 to Hilton et al. Hilton was also granted an earlier patent in the same field, U.S. Pat. No. 4,811,608, assigned as of date of issue to Spatial Systems Pty Limited. The six axis devices currently offered by Logitech (which may have purchased Spacetec IMC Corp) include the Spaceball® and Spacemouse®, the January 2002 retail prices of which were approximately $500 each.

Other attempts have been made to use optical position transducers in a six-axis device. For example, U.S. patent application Ser. No. 20010038380 to Salcudean et al discloses the use of light sources and sensors mounted to both the stationary and movable elements of a joystick. Such a scheme may entail unnecessary complexity of construction and may result in a less reliable and less robust device due to the requirement for movable electrical components requiring flexible connections.

Many other methods have been utilized to achieve six axis or multi-axis control. For example, multi-axis input devices have also been built around conventional metal foil strain gage technology and also using wire strain gages. Such devices may essentially be force input devices and may fail to provide the operator with any useful deflection feedback. The primary signals from such devices may require careful shielding and subsequent amplification to compensate for the inherently low gage factor of the strain gages.

U.S. Pat. No. 4,876,524 to Jenkins and U.S. Pat. No. 5,767,840 to Selker are examples of prior art in which the use of strain gages is disclosed. The use of such strain gages may be complicated by temperature-induced errors and low gage factors, both of which can add to the difficulty of signal processing and signal shielding. Furthermore, the allowable strain may be barely perceptible to the operator, and may result in a lack of useful and desirable deflection feedback to the operator. Furthermore, the low strains may preclude the use of mechanical stops to prevent overloading the strain gages. Strain gages may be sized to include a factor of safety with respect to loads which may decrease their already poor gage factor even further. Even with a factor of safety, the devices using strain gages may be unsuitable for applications such as computer games, which may often be dropped on the floor by children.

Other six axis joystick designs of prior art utilize a plurality of linear variable differential transformers, variable inductors, or other linear discrete mechanical displacement transducers. Some of these six-axis input devices have been based on spring centered LVDT's (linear variable differential transformers) in a Stewart platform configuration. Such devices may be expensive and fragile in comparison to the economical and robust construction of a 6 axis input device built in accordance with the present invention. The multiple mechanical joints of the prior art may result in a trade-off between precision and cost.

An example of a simplified device of the Stewart platform variety is disclosed in U.S. Pat. No. 6, 329,812 B1 to Sundin, wherein the important consideration of cost is addressed. Overall complexity may not be avoided, however, because of the need to shield radio frequency interference and because of interference effects between adjoining inductive springs. A further disadvantage of the Sundin design may be that the multiple springs could result in an assembly that is subject to unacceptable resonant vibrations if used in association with construction equipment or moving vehicles. Such vibration may include resonance of the active grip on its spring(s) or may involve lateral or higher mode vibrations within the springs themselves.

Yet another known six-axis joystick may be comprised of a plurality of magnetic sensing coils and multiple movable magnets. Examples of patents disclosing magnetic position detection include U.S. patent application Ser. No. 20010055002 to Endo and U.S. Pat. No. 5,687,080 to Hoyt et al. These designs may often be much more complex and expensive than the present invention and may not provide any inherent shielding from ambient magnetic flux Yet another method is the coupling of two three-axis controllers to attain six axes control as disclosed in U.S. Pat. No. 5,749,577 and U.S. Pat. No. 6,033,309 to Couch et al. Such a method may be more expensive than the present invention and may lack an intuitive six-axis interface.

The large size of many of the devices built in accordance with prior art may result in unintended and undesirable coupling between the horizontal axis of rotation and the horizontal axis of translation. Such coupling may require subsequent diagonalization by means of signal processing with a corresponding loss in precision and dynamic range of the device. Such undesirable coupling may have been difficult to avoid in the prior art because of the expense and technical obstacles, which the required miniaturization of such prior art designs may entail.

The transducer systems of the six axis joysticks of the prior art may have generally been physically too large or heavy for many applications such as incorporation into keyboards or hand held computers, for positioning as extensions of other control handles or grips, or for enclosing near the center of the user's hand within a conventional joystick such as that disclosed in U.S. Pat. No. Des. 381,701 to Salinas.

The need for hand stabilization during trackball use while operating an aircraft has been recognized. Dassault Aviation has adapted a conventional two-axis track ball to include a palm rest to facilitate reliable (two axis) cockpit display cursor control under turbulent flight conditions (PROFESSIONAL PILOT magazine/January 2002). Six axis devices of the prior art may be too bulky to incorporate within such a palm rest. In fact, many six axis input devices of the prior art may have been so bulky that they no longer resemble sticks and may have therefore not even been referred to as "joysticks".

Various multi-axis input devices or "joysticks" that utilize some form of magnetic field measurement such as Hall effect sensing are known. Examples of patents related to multi-axis input devices or joysticks which disclose Hall Effect sensing include U.S. Pat. No. 5,959,863 to Hoyt et al and U.S. Pat. No. 5,687,080 to Hoyt et al. U.S. patent application Ser. No. 2001/0055002 to Endo also discloses the use of Hall Effect sensing for multi-axial computer input devices.

Several articles on the subject of six axis user interfaces by Shumin Zhai, Ph. D. have been published. These include: Human Performance in Six Degree of Freedom Input Control, Interaction in 3D Graphics, and User Performance in Relation to 3D Input Device Design.

It is an object of this invention to provide a low-cost robust alternative to current multi-axis computer input devices. In particular, an object of this invention may be to provide a device sufficiently low in cost to be attractive for use in conjunction with computer games, and the like, as well as sufficiently simple and robust for use in, but not limited to, industrial applications. Currently available devices may be prohibitively high priced for the computer gaming industry and may be too fragile for a typical construction equipment application. The present invention, in contrast, may require only two moving parts, which can be a simple coil spring and a simple plastic knob with an internal reflective surface, for example. The plastic knob of the present invention may have about the same manufacturing cost as an ordinary flashlight reflector. The overall manufacturing cost of the present invention may be significantly lower than the manufacturing cost of any other prior art six-axis joystick and may be in fact lower than the manufacturing cost of typical two axis joysticks.

A further object of this invention may be to provide a simple easy-to-manufacture 6-axis computer input device, consisting of as few components as possible. The preferred design may incorporate all, 7 for example, transducers onto a single printed circuit board or into a monolithic electro-optical package.

Another object of this invention may be to provide a high quality and high precision signal by optimally locating a high-resolution transducer element with respect to the grip and the user's hand and wrist to yield well conditioned transform equations.

Yet another object of this invention may be to provide a durable, robust multi-axis input device suitable for such applications as control of machinery and construction equipment, and the like.

A further object of this invention may be to allow greater control in industrial and construction equipment applications in general, where multi-axis controls may have been technically deficient and commercially unattractive.

Another object of this invention may be to provide a transducer element of sufficiently small size that it can be centrally located within the handle of a gaming joystick, in line with the parallel-to-the-Ulna-and-Radius-bones axis of wrist rotation instead of below said axis, as may often be the case for prior art designs.

A further object of this invention is to provide a transducer element which may be of sufficiently small size to permit easy finger-tip manipulation of the active grip, while leaving space within the user's hand for a stationary grip element or a palm rest which may be needed to stabilize the user's hand and arm so that the multi-axis joystick functions can be safely used in moving vehicles on land, in water, in air or in space.

III. DISCLOSURE OF INVENTION

Various embodiments designed to meet the forgoing objectives are summarized as follows:

In one embodiment, the present invention may be comprised of a movable "active grip" which incorporates six or so mirror facets fixed thereto and which may be resiliently mounted on a coil spring, for example. A photo transducer array, comprised of one or more photo emitters and one or more photo detectors, may be fixedly mounted a short distance away opposite the movable mirror facet assembly. The lengths of six unique light paths connecting the photo emitter(s) with the photo sensor(s) by way of the mirror facets may define the coordinates in six degrees of freedom of the active grip and its mirror facets relative to the photo transducer array. The brightness as measured by a photo detector at the end of each light path may generally be an inverse square function of the light path length. Any translational or rotational movement about any axis of the active grip may result in an altered pattern of brightness. The brightness pattern may be converted to electronic form for use in a digital computer, for example, or may be transmitted along fiber optic cables as an analog brightness signal.

In general, the following descriptions of the locations of photo emitters and photo detectors may be intended as examples only and are not intended to be limiting with respect to the disclosure of this invention or to the interpretation of any claims. In particular, the relative positions of photo emitters and photo detectors may be, in almost all cases, interchangeable. In certain cases individual discrete devices may be able to function as both emitter and detector. Simple changes in circuitry may facilitate the exchange in position of the emitters and detectors. For example, in the case of six emitters surrounding a single detector, the emitters may be energized one at a time so the signal generated by the detector can be associated with a unique light path and its corresponding emitter. Such an arrangement can be advantageously used to reduce to one the number of analog to digital conversion channels required on a programmable interface controller or other signal conversion device. Such an arrangement can be accomplished using standard components and known electronic engineering principles.

The terms "photo emitter" and "photo detector" are intended to be interpreted broadly and to encompass any means of or element for directing or converting light or any interface through which light is conveyed, whether or not the light originates or terminates within the device contemplated by this invention. For example, sun light could be used to illuminate a target from which point it would reflect to a plurality of movable mirrors from which it would be further reflected to light receptors from which it might be further transmitted as light guided by a fiber optic cable to a remote location beyond some physical boundaries. Examples of photo emitters may include, but not be limited to, light emitting diodes of any wavelength including visible and infrared, laser diodes, gas discharge tubes, incandescent light bulbs, and other equivalent element known or not known at this time. Examples of detectors include photo diodes, phototransistors, Cadmium Sulfide photo resistors, photovoltaic cells, phototubes, and other equivalent means known or not known at this time. The following terms as used in the specification can be used in their traditional sense and can have the following additional indicated meanings. The term "Stewart platform" may include a "hexapod" or octahedral parallel linkage of the type commonly used as the motion platform for flight simulators.

The term "slave platform" may include a platform the position of which is controlled by a plurality of remotely controlled actuators or its virtual equivalent in the case of manipulation of a computer model.

The term "sensing assembly" may include the assembly of one or more discrete sensors or a single multi-axis sensing element.

The term "sensor base" may include the relatively stationary object to which the sensing assembly is attached.

The term "sensor platform" may include the portion of the device, which is moved by the operator including the "active grip".

The term "active grip" may include the movable portion of the device the position of which is moved by the operator and the movement of which results in a change in output signal.

The term "restoring element" may include a device such as a spring or elastomeric structure that contributes to restoring the moving platform to a minimum energy position after the removal of deflecting forces.

The term "restoring system" may include the system comprised of one or more "restoring elements" which restore the moving platform to a minimum energy position after the removal of deflecting forces.

The term "structured light" may include light projected in a fixed, preferably high contrast, pattern which may be used to measure as an image taken from another vantage point the position in space of an otherwise featureless surface.

The term "MEMS" refers to a class of miniature mechanical devices manufactured and packaged in a manner similar to that used for electronic integrated circuit chips.

The term "CCD array" refers to an optical image sensing device based on charge coupled devices, as are commonly used in video cameras and electronic still cameras.

The term "side looking" as it applies to photo emitters and photo detectors refers to devices which are oriented in a circuit board mountable package in a manner which results in emission of or sensitivity to light generally parallel to the plane of the circuit board.

The term "joystick" may broadly include any handle, knob or other device which may be physically grasped, engaged, or physically moved to in a manner which generates an electrical, optical, electromagnetic, or other signal representation of movement of or application of forces to said device.

The term "spatially varying reflectivity" may include the marginal edges of a reflecting surface, varying specularity of surfaces, varying reflectivity of surfaces, varying color of surfaces, transparent features, opaque features, grey scale features, bar code features, printed features, prismatic elements, refractive elements, etc.

In accordance with one aspect of the invention, the active grip may incorporate a system of optical elements such as mirrors or prisms, which control the light paths between one or more light sources and one or more light detectors.

In accordance with a further aspect of the invention, a single photo detector may be used in conjunction with multiple switched light sources in order to reduce analog to digital conversion requirements to a single channel.

In accordance with a further aspect of the invention, in conjunction with multiple switched light sources, multiple photo detectors may be connected in parallel to a fewer number, such as one, of analog input channels, thus reducing the required number of analog to digital conversion channels.

In accordance with another aspect of the invention, a single monolithic photo transducer package, which may be similar in construction to a seven segment LED package, may function as either one of or both of both photo emitter and photo detection elements.

In accordance with a further object of this invention, six infrared light emitting diodes and one or more photo diodes may be mounted to a printed circuit board to which transparent waveguides are subsequently molded and over which an opaque material may be molded, thus creating a compact and robust electro-optical package.

In accordance with a further object of this invention, the infrared light emitting diodes and photo diodes may be coplanarly mounted to the printed circuit board and the waveguides may incorporate internal reflective surfaces which project the light in a generally radial direction from the transducer axis of symmetry.

In accordance with a further aspect of the invention, a signal processing chip, such as an Analog Device's PIC, may be embedded along with the optical transducers within the transducer package. By this means, any required sequencing of photo emitters, scaling and normalization of data, as well as efficient digital transmission of the output signal may be accomplished within an ergonomically adaptable and compact device.

In accordance with a further aspect of the invention, an image detector such as a CCD array may be used to measure the position of an image controlled by the multi-axis position of a movable grip.

In accordance with a further aspect of this invention, a very wide angle lens such the type used to preview visitors through doors may be used to project the position sensitive image of an interior surface of a movable grip onto an image transducer such as a conventional CCD array.

In accordance with a further aspect of this invention, the interior of a movable grip may feature a pattern of reflective areas and non-reflective areas in a generally three lobed form.

In accordance with a further aspect of the invention, a CCD array attached to a first movable portion of a joystick, the base for example, may be used to measure the spherical angles to three points, for example on a second movable portion of said joystick, the interior of the grip, for example. The two spherical angles for each of three relatively movable points constitute 6 data signals which may be relatively easily processed by the general method disclosed herein, for example. In accordance with a further aspect of this invention, illumination of a first movable portion may be by means of a photo emitter fixed to a second movable portion located coaxially with a lens means used to focus a position sensitive image onto a CCD array.

In accordance with a further aspect of this invention, the interior of a movable grip may feature a pattern of reflective areas and non-reflective areas in a generally multi-lobed form.

In accordance with a further aspect of the invention, structured patterns of light may be projected from a first element onto a second element, movable in multiple axes relative to the first element. The resulting patterns of illumination may be used to determine the relative multi-axial positions of said first and second elements by means of detectors or imaging apparatus attached to the first element, for example. Such an arrangement may be used to determine the relative position of a reflective second element without the requirement for a second element surface of spatially varying reflectivity.

In accordance with a further aspect of the invention, a monolithic photo transducer package as herein described may include an element to secure one or more springs.

In accordance with a further aspect of the invention, photo emitters and photo detectors, which may be more cheaply available with integral collimating lenses, may be embedded in an opaque insulating compound while held in position, by being fixed to a printed circuit board for example, then may be subsequently machined or sanded as an assembly to create a suitable optical surface.

In accordance with a further aspect of the invention, alternating side looking emitters and side looking photo diodes may be located facing outward around the periphery of a printed circuit board, said circuit board being mounted to the first of at least two movable elements (preferably the base). The second element (preferably the grip), movable in multiple axes relative to the first element, includes reflecting means which generally surrounds the first element at a distance sufficient to allow necessary radial movements. The reflecting means may be a patterned surface of cylindrical, spherical, or toroidal form for example.

In accordance with a further aspect of the invention, the photo detectors may be connected in parallel.

In accordance with a further aspect of the invention, the reflecting means may be a generally cylindrical mirror with spatially varying reflectivity.

In accordance with a further aspect of the invention, the reflecting means may be a generally toroidal mirror with spatially varying reflectivity.

In accordance with a further aspect of the invention, the reflecting means may be retroreflective, e.g., a plurality of conical reflecting surfaces.

In accordance with a further aspect of the invention, the reflecting means may be polygonal.

In accordance with a further aspect of the invention, the reflective means may be generally spherical.

In accordance with a further aspect of this invention, a single generally planar spring may be used to provide a restoring force to the movable grip.

In accordance with a further aspect of this invention, said generally planar spring may be provided with positive locating features such as holes to control the alignment between the grip and the base during assembly.

In accordance with a further aspect of this invention, a generally planar bellows means may be provided in conjunction with said generally planar spring.

In accordance with a further aspect of this invention, a non-circular hole in the grip may engage a non-circular transducer supporting pedestal in order to limit the extent of movement of the grip relative to the base.

In accordance with a further aspect of this invention, said non-circular hole is a slot with generally parallel sides and the pedestal is of similar but smaller cross section.

In accordance with a further aspect of the invention, a suitable reflector element may be provided to facilitate the use of a standard LED display package, such as a 7 segment LED numeric display for light emission and/or light detection means.

In accordance with another aspect of the invention, optical guides may be used to alter the effective geometric locations of a standard multi-segment LED to a more optimum motion transducer configuration such as a six-sided isometric array.

In accordance with another aspect of the invention, refractive element or lens means such as inclined surfaces or Fresnel lenses may be integral with or disposed above the light transducer array.

In accordance with another aspect of the invention, the movable reflective element may be comprised of non-flat reflecting segments such as concave mirrored surfaces, for example, in order to obtain the desired response characteristics from the device.

In accordance with another aspect of the invention, the movable reflector means may be comprised of one or more retro-reflectors, the movement of which may alter the degree of coupling between one or more photo emitters and one or more photo detectors.

In accordance with a further aspect of the invention, the degree of coupling of emitter/detector pairs may increase with distance to a corresponding retro-reflector due to an increase in the degree of overlap of the respective cones of brightness and sensitivity with increased distance.

In accordance with another aspect of the invention, the degree of coupling of adjacent emitter/detector pairs may decrease with distance to a corresponding retro-reflector due to inverse-square distance principles.

In accordance with a further aspect of the invention, surfaces, which may be retro-reflective along one axis, but conventionally reflective along another axis, may be mounted to a movable active grip in order to produce position measurements in conjunction with a seven-transducer hexagonal array, for example.

According to a further aspect of the invention, the active grip may be fitted with grooved mirror segments, analogous to a Fresnel lens, and may be used to control the various light paths.

In accordance with another aspect of the invention, gain calibration of the various photo emitters and photo detectors may be achieved by interposing between said transducers and reflecting elements a calibration mask element, the optical transmissivity of which may be mapped and scaled to provide a desirable balance of signals over the intended range of displacement and to compensate for the manufacturing induced variations in the characteristics of each of the discrete devices.

In accordance with yet another aspect of the invention, a lens element and calibration mask means may be combined functions of a single component.

In accordance with another aspect of the invention, an extra light path may be provided in order to calibrate brightness, which may change due to voltage fluctuations, temperature changes, etc.

In accordance with another aspect of the invention, a light baffle may be provided which may also serve to precisely locate and orient the optical components on a printed circuit board, for example.

In accordance with yet another aspect of the invention, fiber optic guides may be used to convey light from a single source to multiple, six for example, projection points.

In accordance with another aspect of the invention fiber optic guides may be used to convey light from multiple detection points to a single photo detector.

In accordance with another aspect of the invention, fiber optic guides may be used to convey light from a single photo emitter to multiple emission points.

In accordance with a further aspect of this invention, time-of-flight criteria may be used to measure the varying optical distances between the various optical emitters and detectors of this invention. Such time-of-flight measurements may be made with known optical distance measuring circuitry and optical transducers.

In accordance with a further aspect of this invention, a unique optical delay line may be provided in series with each of, six, for example, light (distance measuring) paths for the purpose of time multiplexing optical time-of-flight signals. This scheme may facilitate the use of a single photo-detector channel and may also simultaneously facilitate the use of a single photo-emitter.

In accordance with a further aspect of this invention, a multi-axis interferometric position measurement device may be utilized for the purpose of obtaining simultaneous precise multi-axis measurements. Such a device may be constructed by the addition of a direct (not affected by sensor platform deflections) reference light path from a common, preferably coherent, light source to each of six, for example, photo-sensors.

In accordance with a further aspect of the invention, a photo-emitter, reference light paths, and photo-detectors may be all contained within a monolithic optic/electronic package.

In accordance with a further aspect of the invention, an embodiment of this invention may be constructed wherein light passes through a liquid or gel in its path from photo-emitter to mirror to photo-sensor. Such a scheme could be used, for example to minimize undesirable reflections or to exclude water or dirt from the optical paths.

In accordance with a further aspect of this invention, said liquid or gel may have a controlled opacity so as to enhance or change a signal with a change in optical path length.

A further aspect of the invention may be the addition of a tare switch function to sense whether the device is being operated or not. Such a tare switch function can be used to provide a null output and an optional control lock signal whenever the device is not being used. This scheme may serve to compensate for null point drift due to factors such as temperature change or a change in the orientation of the device with respect to gravity. This scheme may also render harmless any tendency of the active grip assembly to vibrate in response to ambient mechanical excitation in the absence of the damping effect of the user's hand.

According to a further aspect of the invention, a tare switch function may be accomplished by a capacitive touch sensor element, a mechanical switch element, or by means of software algorithms designed to detect the absence of hand initiated signals. Tare switches may be mounted, for example to a palm rest, a wrist rest, or to the active grip of the device.

According to a further aspect of the invention, electrical connection to a tare switch element may be through one or more resilient elements as, for example, through a spring supporting the active grip.

According to a further aspect of this invention, a tare switch function may serve to measure the applied force due to the weight the operator's hand and forearm on a joystick, for example. In this embodiment, an initial signal may represent forces due to weight, while a subsequent signal could represent said weight plus intended operator inputs. A tare function element, which could be implemented by either hardware or software, may cause the weight component to be ignored or "tared out". The aforementioned scheme may then allow an operator to comfortably rest the weight of his or her hand and forearm on said joystick prior to the transmission or utilization of the output signal of said joystick. In this manner the joystick might first function to measure the weight effects of the user's hand and forearm, then subsequently function to transduce the intended inputs of the operator. The transition from weighing function to transducer function could be accomplished purely by software using appropriate time delays, or could be activated by various forms of physical tare switches. For example, a general whole-grip capacitive touch sensor could be used in conjunction with a timer function to allow one second, for example, for weighing of the user's hand, after which any further change in signals may be machine interpreted as an intended operator instruction. As another example, a finger operated switch could be pressed at will by the operator to reset the tare function to zero at any time.

Various schemes may be used to maximize the usefulness of the signals generated by the device of this invention. For purposes of controlling computer graphics, it may be very advantageous to use software to interpret the intent of the operator, rather than simply transform displacement generated signals to velocity of the object such as a solid model or camera view-point being manipulated. According to one embodiment of this invention, the virtual object being controlled may be assigned a virtual mass, center of gravity location and moments of inertia about each axis. The output signals from the device of this invention may then be translated to effective forces acting on said virtual mass. In this manner, smooth and predictable movements may be easily obtained. According to a further aspect of this invention, proportional/integral/derivative control schemes may be used with coefficients selected so as to most closely meet the operator's intent.

In accordance with another aspect of the invention, the origin of the x, y, and z-axis may be offset with software to be located at the natural pivot point of the user's wrist even though the physical device may remain at a location where it can be gripped by the user's hand or fingers.

In accordance with a further aspect of the invention, the orientations of the x, y, and z axis may be rotated to suit the user.

In accordance with a further aspect of the invention, software may be used to override operator generated signals to prevent buckling, collisions, or other undesirable positions of a slave platform or a device mounted to such a platform.

In accordance with another aspect of the invention, the coordinates of the device may be transformed to correspond with a dynamically changing coordinate system or alternative coordinate systems. Changes in coordinate transformation may be made in real time as in following a moving machine, for example.

In accordance with another aspect of the invention, the coordinates of the multi-axis joystick may be transformed to control construction or logging machinery or attachments such as blades, loader buckets, lifting forks, augers, pavement breakers, manipulators, and the like.

In accordance with a further aspect of the invention, sensors such as MEMS accelerometers and angular rate sensors may be attached to various portions of machinery to be controlled in order to accomplish real time coordinate transformations. In such an application, the possibly higher accuracy of customary absolute angle and position measuring devices may not be required and may be expensive. Such a control scheme in accordance with this invention may be particularly attractive for construction equipment not originally equipped with position sensors and for hexapod (Stewart Platform) implementations for which the total cost of six absolute position sensors may be significant.

In accordance with a further aspect of this invention, a hexapod may be equipped with accelerometers or rate sensors at several locations (three for example) on each of the base platform and the slave platform, as well as near end of each actuator, strut, or link. With such a configuration sufficient information may be available to, instantaneously and without the need for integrating, measure position, velocity and acceleration.

In accordance with a further aspect of the invention, a hexapod may be used as a manipulation stage in conjunction with conventional construction equipment.

In accordance with a further aspect of the invention, a hexapod may be configured as an extension of a standard implement adaptor, using male and female adaptors at its respective base and slave platforms.

In accordance with a further aspect of the invention, a multi-axis, hexapod for example, equipment adaptor may be fitted with a motion control module powered by a conventional single circuit hydraulic supply or other power source. The motion control module may incorporate a hydraulically driven generator for powering servo valves, electric actuators, or other associated electronic devices. Control signals are preferably transmitted wirelessly between a joystick such as herein disclosed, to the adaptor, possibly through computers located at either or both ends of the signal transmission path. In accordance with a further aspect of the invention, the required sensors, which may be MEMS acceleration or angular rate sensors, are connected wirelessly, by a wireless network for example.

In accordance with a further aspect of this invention, sensors at discrete points, such as MEMS acceleration and angular rate sensors, may be supplemented by angular position sensors, linear position sensors, and the like.

In accordance with a further aspect of the invention, machine vision based sensing may be used separately or in conjunction with the aforementioned sensors at discrete points. Such a configuration may permit high accuracy while eliminating the need for highly precise mechanisms and expensive absolute positions encoders. Machine vision control of motion may utilize high resolution optics with limited fields of view within portions of the motion envelope where high local accuracy is required, in combination with lower accuracy wide angle vision equipment for coordinate transformation. Geometry for coordinate transformation purposes may be provided by or supplemented by, the aforementioned MEMS accelerometers and angular rate sensors at discrete points, or conventional angle and displacement sensors.

In accordance with a further aspect of the invention, machine vision may be used to determine the posture of a controlled machine for the purpose of aligning in real time the coordinate systems of a joystick with the coordinate system of the device being controlled.

According to a further aspect of the invention, machine vision systems may be used to simultaneously to provide images to the operator for remote control while also providing machine interpreted information for real time adaptation of coordinate transformations between the joystick and controlled device. One or more machine vision systems may be used to simultaneously provide video information to both a human operator and a coordinate transformation controller.

In accordance with another aspect of the invention, coordinate transforms may allow control to be relative to any particular desired point within the slave moving platform coordinate system or other coordinate system such as that of a fixed work piece or an element of a construction project. Examples of specific points that would make useful temporary slave platform coordinate origins may include; the tip of an auger or drill, center point between fork tips, a bolt hole pattern at the end of a steel beam, an object being tracked or observed by a camera, an object of interest such as an area of interest within CAT scan data set or computer model, and the like. Slave platform motion may be controlled relative to any one of various "fixed" coordinate systems such as the portion of the equipment such as a loader or forklift to which the multi-axis or hexapod manipulator may be attached, the operator of the equipment, or even the fixed frame or ground on which the equipment is supported.

In accordance with a further aspect of the invention, machine vision detection of the operators eye(s) may be used to allow the operator to designate from time to time new coordinate origins, coordinate orientations, or motion constraints. Such an eye designation scheme might allow the operator of a multi-axis manipulator to designate that one end of a structural girder, for example, remain constrained while the other end is aligned for bolting under joystick control. This may allow an operator to concentrate on bolt hole alignment without concern for doing damage with the other end of the girder.

In accordance with another aspect of the invention, movement of the slave platform along selected axis may be selectively constrained. By temporarily constraining movement from 6 to fewer degrees of freedom using application-specific constraints, greater accuracy and utility can be achieved. This may be important in industrial applications such as drilling where the alignment (tip location and drill orientation) is chosen with 5-axis or 6-axis control, after which the drill axis is fixed during drilling, or forklift operation where the fork position and alignment might be best accomplished with 6-axis control, but a direct-forward followed by a direct-upward movement is desired for lifting a load.

In accordance with a further aspect of the invention, a touch screen graphic representation of the controlled equipment or payload may be used by the operator to graphically select the origin and/or orientation of the coordinate system.

In accordance with another aspect of the invention, an operator of a robotic manipulator may be able to designate the end of a structural beam, for example, as an axis origin by three times placing said end of said beam at the same location but with three different beam axis orientations.

According to another aspect of the invention, an operator may select the origins of the x, y, and z axis in any of the input device coordinate systems, the slave platform coordinate system, or computer model coordinate system to be offset by specified distances, i.e., to be non-intersecting and to be inclined by specified angles, i.e., not normal.

In accordance with a further aspect of the invention, in order to accurately calculate fixed-frame coordinates, a slave platform mounted tilt sensor may be used to directly measure 2 axes of rotation between the tool and gravitational coordinates. Alternatively, slave platform mounted sensors such as laser distances gauges may be used to determine the orientation of a flat surface for the purpose, for example, of orienting a drill bit normal to said surface.

In accordance with a further aspect of this invention, software code may be used to compensate for any unintended coupling, due to coil spring asymmetry, of the translational axis and rotational axis, which are coaxial with a coil spring type restoring element.

Various additional embodiments of this invention that may enhance its usefulness or contribute to its ease of use are described as follows:

One embodiment of the present invention may provide for a multi-axis joystick, the base of which may be gripped within the palm of the operator's hand and held by the ring finger and little finger, while the active grip of which may be manipulated by the operator's thumb, forefinger and middle finger. Such a configuration may allow freedom of wrist and arm movements while walking, presenting information to others, or performing construction tasks, for example.

In accordance with a further aspect of the present invention, a conventional computer mouse may serve as the base to which a six axis input device of this invention may be mounted. In such a configuration, the base portion may be controlled by the user's hand or palm and may serve as a conventional computer mouse providing, for example, two degrees of freedom, while an appended multi-axis input device provides an additional six degree of freedom and may be independently controlled, for example, by means of the user's thumb, forefinger and middle finger. Such a configuration may, for example, provide 8 degrees of freedom.

In accordance with a further aspect of this invention, a computer mouse may be equipped with an additional, optical for example, transducer located at a point offset from the location of the conventional x and y axis mouse movement transducers, thus providing an additional mouse axis sensitive to differential movements between the offset transducers or rotational movements about a vertical axis of the mouse as a whole. In this manner twist movements may be used to generate an additional, or third for example, output axis. Such a configuration may, for example, provide nine degrees of freedom. A twisting motion about a vertical axis may be more ergonomically accomplished with a mouse with a "pistol" or "gaming joystick" grip, the use of which vertically aligns the wrist end of the user's Radius and Ulna bones. The user's wrist may be rotated approximately 90 degrees in such an orientation compared to perhaps 30 degrees when the users hand grips a conventional mouse. The "pistol" or "gaming joystick" grip has the further advantage in this embodiment that it may also be secured against the user's palm with the little finger and ring finger, leaving the users thumb, index finger, and middle finger free to actuate buttons and/or an appended (small) joystick. Such a grip may be optimized for comfortable and secure gripping using only the little finger and ring finger against the user's palm. The several transducer means of this invention may be more suitable than those of the prior art for construction a joystick sufficiently small for operation using the index finger, middle finger, and thumb only and sufficiently small for attachment to a first joystick or mouse. Some of the prior art joystick designs which might allow a desirably large range of motion may be particularly difficult to miniaturize in robust form.

In accordance with a further aspect of this invention, the thumb operated transducers as described in U.S. Patent Application Publication No. US2002/0104957 A1 may be provided at several locations offset from each other in order to provide additional degrees of freedom.

In accordance with a further aspect of this invention the three degrees of freedom associated with a three axis mouse, such as the one herein described or one with a scroll wheel, might be used to provide 3 degrees of freedom for picking elements within a solid computer aided design model, while the attached multi-axis device might then provide an additional 6 degrees of freedom which might be used to manipulate the elements selected by means of the first three axis.

In accordance with a further aspect of the invention, a finger and thumb operated six degree of freedom device may be mounted to a palm held six degree of freedom input device to provide simultaneous 12 axis control with only one hand. Such a combination might be used for example to control a supporting vehicle while also controlling a manipulator arm. Using such devices with both hands could provide simultaneous 24 axis control.

In accordance with a further aspect of the invention, a finger operated six degree of freedom input device may be appended to any number of otherwise conventional control means such as flight control sticks, flight control yokes, steering wheels, rudder wheels, joysticks. control levers, control pendants, and the like.

Such schemes may be useful for controlling a multi-axis manipulators or tools which may be attached to bases or vehicles which may require or benefit from concurrent multi-axis control.

Yet another embodiment of the present invention may be in the form of a mouth, jaw, or head operated controller for use by quadriplegics, an application for which the prior art designs may be too bulky.

In accordance with another aspect of the invention, the entire device may be hand held and portable and the active grip may be manipulated with respect to a base portion which may remain fixed relative to the user's grasped hand or fingers, thus allowing the device to be held and used with only one hand. Alternatively, a portion of the base may be secured to the user's wrist or palm such as by strap or glove means. Signal transmission for such hand held configurations may even be preferably by wireless means. The coordinate system for such a hand held configuration may be relative to the fixed portion of the device within the user's hand or relative to external coordinates determined by some combination of criteria such as radio signals, laser signals, gyro signals, magnetic orientation and gravitational orientation. Such portable embodiments may incorporate other devices such as orientation sensors, accelerometers, gyroscopes, etc.

In accordance with a further aspect of the invention, wrist or forearm mounting of the above described "hand held" configuration may allow for the incorporation of a hinge for temporarily swinging the active grip out of the way of the operator's hand.

In accordance with yet another aspect of the invention, a six-axis sensor assembly may be situated between two handles, such that the relative motion of the two handles may generate a corresponding signal. The handles may, for example, be the two halves of a two handed game console similar to those used in conjunction with the Sony Playstation® or the Microsoft X-box®.

In accordance with another aspect of the invention, the device may be of sufficiently small size to be incorporated into a computer keyboard, into a hand held computer, or into another control handle or device, and the like.

A joystick for operation of construction equipment could be able to be operated with large deliberate hand motions while wearing insulated winter gloves, for example. In such circumstances, a finger operated fine-range-of-motion joystick may not be practical due to overwhelming vibrations and machinery movements as well as lack of fine finger tip tactile feedback. Accordingly, several aspects and embodiments of this invention may address a need for a larger range of motion as follows:

In accordance with one aspect of the invention, the active grip may be provided with an enhanced range of movement by means of one or more flexible elements to which the sensor base may be attached.

In accordance with a further aspect of the invention, flexible elements may be configured to minimize any unintended coupling between axes. This may be accomplished for example by fixing the base of a limited range of motion multi-axis joystick (of either this invention, prior art or future art) to a first mounting block to which the upper ends of 3 or more flexible and generally parallel rods are fixed. The lower end of the flexible rods may be fixed to a second mounting block. The first and second mounting blocks will tend to remain parallel despite deflections in a horizontal plane. In other words, horizontal translational flexibility is thus provided without unintended and undesirable coupling to the horizontal rotational axes. The second mounting block may be mounted on a pair of offset but generally parallel leaf springs. The other end of the generally parallel leaf springs may be fixed relative to the operator. The leaf spring assembly provides torsional stiffness in all three axes while permitting significant z-axis motion of the joystick grip.

In accordance with a further aspect of the invention, a transducer means and other moving parts may be protected from damage and contamination by a flexible bellows.

In accordance with a further aspect of the invention the bellows may be designed to exhibit significant torsional compliance about the bellows axis of symmetry, which is generally not the case with conventional bellows. Such torsional compliance may be provided by convolutions of alternating orthogonal orientation, for example.

In accordance with a further aspect of this invention, a second bellows may be provided, either connected or not connected to the moving mechanism, for the purpose of equalizing pressure within a bellows protected cavity. This aspect may be particularly important for facilitating Z-axis movement without causing pressure differences or contamination due to otherwise required ventilation.

In accordance with another aspect of the invention, a wrist rest may be provided which is movable with and associated with the active grip but which may support gravity and acceleration loads of the user's arm separately from the active grip. In this manner, the user's arm may be desirably supported to reduce fatigue, while allowing large range joystick movements, which may be desirable in high vibration environments such as operation of construction equipment. Measurement of the instantaneous weight of the user's arm may be accomplished by means of separate load cell(s) associated with the wrist rest, for example.

Various additional modifications and improvements which may increase the usefulness of this invention are described as follows:

In accordance with a further aspect of the invention, a multi-axis transducer in accordance with the present invention may be affixed to an otherwise conventional Stewart platform or equivalent such that said multi-axis transducer may generate an operator originated force/displacement signal while the underlying Stewart Platform or equivalent supplies force and position feedback to the operator. Such an arrangement may also be used to provide increased displacements compared to those provided by the multi-axis transducer itself.

In accordance with another aspect of this invention, fiber optic guides may be used to emit and receive light within the transducer assembly, for example, which may eliminate electrical power components from the transducer vicinity for uses such as controlling a bucket truck boom or robotic arm used to service high voltage power lines, and the like. A fiber optic connected version of the present invention could also be useful for construction of an extremely small multi-axis position transducer which could be applicable to miniature robotics, the manufacturing of small scale electrical and mechanical devices, as well as to micro biology and medical applications and the like.

In accordance with another aspect of the invention, the transducer element of this invention may be used as a six-axis accelerometer or motion sensor by attaching a reference mass to the movable mirror assembly.

In accordance with another aspect of the invention, the displacement transducer element of this invention may be used as a general-purpose multi-axis displacement measuring means.

In accordance with a further aspect of the invention, a noise-canceling element may be provided to reduce noise from ambient vibrations. For example, accelerometers mounted to the base of the device may be used to cancel out spurious signals such as those caused by vehicle vibrations.

Various aspects of this invention may be utilized in order to reduce in cost and make more compact embodiments of the prior art. For example, the use of mirror elements of this invention in conjunction with the light transducer circuitry and shading means of Hilton et al. may facilitate the use of a single circuit board or monolithic photo transducer. In this example, the mirrors could be stationary and the shading means may be movable or the shading means could be movable and the mirrors stationary. Alternatively, fiber optic or light guide element(s) could be used instead of mirrors in order to reverse the direction of the light paths or to distribute the light from a single source to light paths of suitable orientation and geometry.

A further embodiment may incorporate a plurality (six, for example) of magnetic flux sensors such as Hall Effect transducers or Giant Magnetic Effect (GME) transducers onto a single printed circuit board which may be movable in multiple degrees of freedom, six for example, relative to a magnetic flux structure which may be established by a single magnet for example. Said embodiment may shield the magnetic flux sensors from ambient magnetic fields by means of a flux conducting magnetic grip or portion thereof, which may provide a flux path (for externally imposed magnetic fields) around the magnetic flux sensors along any required direction. A ferromagnetic pole piece, for example, may be used to direct magnetic flux in a manner which establishes easily measured magnetic flux gradients at the magnetic flux sensors, thus rendering detectable displacement of the flux paths relative to the detectors. The flux may, for example, be directed along three paths with each magnetic flux path intercepting two magnetic flux detectors. The magnetic flux sensors may be located and oriented relative to the flux paths such that the motion sensitive axis, i.e., the direction in which the derivative of the cross products of magnetic flux and the axis of maximum magnetic flux detector sensitivity with respect to displacement are maximum.

Alternatively, magnetic flux gradient detectors, such as MEMS devices incorporating microscopic magnets on force transducers may be used in a similar manner wherein the second derivative of flux density would be oriented and optimized relative to sensor sensitive axis orientation.

According to yet another aspect of the invention, line frequency noise could be electronically filtered from the output signal.

According to a further aspect of the invention, additional looped circuit paths with or without separate resistors could be provided in the circuit board to provide magnetic damping of the spring suspended assembly. Such damping may be helpful in a vibration prone environment such as in construction equipment control applications.

A further embodiment may utilize an elastomeric or elastic structure to measure deflections of an active grip, for example. In a simpler form, such an embodiment may be comprised of a single conductive elastomeric structure and associated electrical terminals attached thereto. The conductive elastomer may preferably be ionically conductive, which property results in a smooth and useful strain-resistance curve in contrast to conductive particle filled elastomers which may exhibit less useful strain-resistance characteristics.

According to a further aspect of the invention, a single piece of conductive elastomer may be configured in the shape of a Stewart Platform or its functional equivalent.

According to a further aspect of the invention, multiple segments of conductive elastomer may be configured in the general shape of a Stewart Platform or its functional equivalent.

Alternatively, a deformable structure of conventional (likely non-conductive) elastomer may be used to contain a dielectric fluid or conductive fluid such as an electrolyte solution. Said dielectric fluid or conductive fluid may cause the electrical relationship between a plurality of electrodes immersed therein to vary as the shape of the cavity or cavities in which said fluid is contained changes shape with deformation of said deformable structure. In the case of either of the aforementioned elastomeric structures, the gauge factor may be much higher than for conventional strain gauges due to the generally higher elongation of elastomers compared to metal or semiconductor strain gauge materials.

According to a further aspect of the invention a single cavity within an elastomeric structure containing a conductive or dielectric fluid may be configured in the shape of a Stewart Platform or its functional equivalent. The walls of such a cavity are preferably convoluted along several orthogonal directions to allow deformation in six degrees of freedom and relatively uniform stiffness among the various axes.

According to a further aspect of the invention, multiple cavities containing conductive or dielectric fluid may be configured in the shape of a Stewart Platform or its functional equivalent.

According to a further aspect of the invention, a deformable elastomeric structure may be provided that may be configured for attachment of a plurality of single axis displacement transducers. Such a structure may be very inexpensive and may facilitate simple zero-backlash mounting of inexpensive displacement transducers.

According to a further aspect of the invention, a plurality of cavities may be provided in the configuration of a Stewart Platform or its functional equivalent, wherein said cavities may be connected to pressure transducer means.

According to a further aspect of the invention, a plurality of stiffeners are provided within an elastomeric structure, wherein said stiffeners transmit strains to transducer means such as MEMS devices or strain gages. Said stiffeners may be configured in the general configuration of a Stewart Platform or it functional equivalent.

According to a further aspect of the invention, various ergonomic arrangements of the present invention may be utilized in conjunction with video or other non-contact position sensing means instead of by way of the sensor means disclosed herein. For example, the 12 axis joystick of FIGS. 35$a$ through 35$g$ could be used to provide a consistent interface for the operator(s), while measurement of the active grip positions and/or hand positions may be accomplished by one or more video cameras, for example. Such an arrangement may be superior for some applications to schemes for interpreting completely free form hand gestures by way of video measurement.

According to a further aspect of the invention, multiple actuatable sensor stages such as those comprised of multiple inflatable cavities or actuators may be mounted in series to create a snake-like robotic device with many degrees of freedom.

Many of the above multi-axis joysticks produce, for example, six analog signals which may need to be nonlinearly transformed to position and rotation deflections with respect to the x, y, and z axes. Many alternative methods and algorithms may be used to derive from the transducers of a multi-axis joystick a signal of desired usefulness. The following is but one example of a general method of deriving a useful signal.

The transformation may be multi-stage, and may consist primarily of a linear diagonalization and a nonlinear scaling and correction. A cubic polynomial transformation may be used to model the nonlinear mapping from signals to outputs. A full cubic polynomial with six input variables has $6*4^6=24576$ coefficients, and may be too computationally costly to be useful. A better transformation may consist of an approximate linear transformation to achieve nearly diagonal outputs followed by a polynomial transformation with all terms up to total 3rd order (e.g., (1, x, y, $x^2$, $x*y$, $y^2$, $x^3$, $x^2*y$, $x*y^2$, $y^3$) for 2 variables). This requires $6*6=36$ coefficients for the linear diagonalization transform and 504 coefficients for the nonlinear cubic part, which may be computationally feasible. An initial pre-transform using 6 coefficients might be done on each production unit to account for manufacturing variations in the individual sensors. A final post-transformation which rescales the translation, rescales the rotation, and centers the output (tares) requires $1+1+6=8$ coefficients, might be specified per user preference.

For any particular prototype design, the 36 pre-transform coefficients and 504 nonlinear transform coefficients might be calculated as follows: Each axis may be sampled at positive, zero, and negative locations in a 6-cube grid, yielding $3^6=729$ sample points (e.g., center, forward, forward and up, forward and left-twist and nose-down-twist, etc.) at center and extreme positions. The 36 linear transform coefficients may be fit with a least-squares solution to best diagonalize the output. Using these coefficients, the sample data may be linearly transformed to produce an approximately linear data set. Then the 504 nonlinear transformation coefficients may be fit, again using, for example, a linear least squares solution.

Once a design prototype has been calibrated, each production unit might use the same 36 linear transform coefficients and the same 504 nonlinear transform coefficients, but a one-time calibration of the 6 sensor scaling coefficients might be done at first use, or possibly before sale. Each user might specify, for example, a single translation sensitivity coefficient and a single rotation sensitivity coefficient to suit preference. At the time of initial use and possibly throughout each use of the device, the output might be centered (tared) using 6 coefficients to account for minor variations in temperature, orientation, or the user's hand weight, etc.

IV. BRIEF DESCRIPTION OF THE DRAWINGS

FIGS. 1$a$ through 1$e$ all depict various views generated from a SolidWorks© solid model of one of the preferred embodiments of a six axis joystick constructed according to this invention.

FIG. 1$a$ is a plan view looking down the Z-axis of said six-axis joystick with example light paths depicted.

FIG. 1$b$ is a sectional cutaway elevation view showing the major components of said joystick.

FIG. 1$c$ is a cutaway perspective view showing the major components of said joystick.

FIG. 1$d$ is an elevation view of said joystick.

FIG. 1$e$ is an exploded view depicting the salient components of said joystick.

FIG. 2 is a perspective view of the active grip of said joystick depicting the internal reflective facets.

FIG. 7 is a schematic of a cylindrical projection of another embodiment of a six-axis joystick in conjunction with a corresponding electrical schematic.

FIGS. 8a through 8e all depict various views generated from a SolidWorks® solid model of another of the preferred embodiments of a six axis joystick constructed according to this invention.

FIG. 8a is a plan view looking down the Z-axis of said six-axis joystick with example light paths depicted.

FIG. 8b is a sectional elevation view showing the major components of said joystick.

FIG. 8c is a cutaway perspective view of said joystick.

FIG. 8d is an elevation view of said joystick.

FIG. 8e is an exploded view depicting some salient components of said joystick.

FIG. 9 is a perspective view of the active grip of said joystick depicting the internal reflective facets.

FIG. 10a is a cross section view of an embodiment of the present invention featuring a traditional "joystick" style active grip, an enhanced range of motion, and protective and pressure compensating bellows.

FIG. 10b is an additional cross section view of the embodiment of FIG. 10a.

FIGS. 11a, 11b, 11c and 11d are plan, cross-sectional, perspective, and exploded views respectively of an example magnetic flux sensor embodiment of the present invention.

Figure 12:
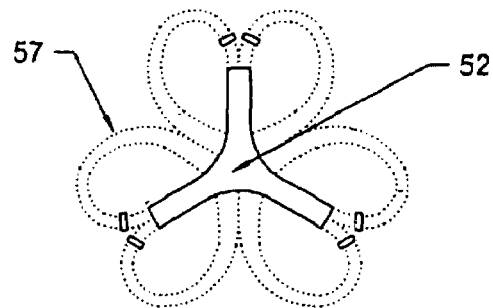

FIG. 12 is a plan view of a magnetic element of an embodiment of the present invention.

Figure 13:
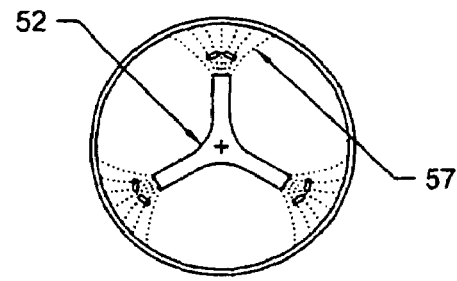

FIG. 13 is a plan view of an assembled magnetic element of an embodiment of the present invention.

Figure 13A:
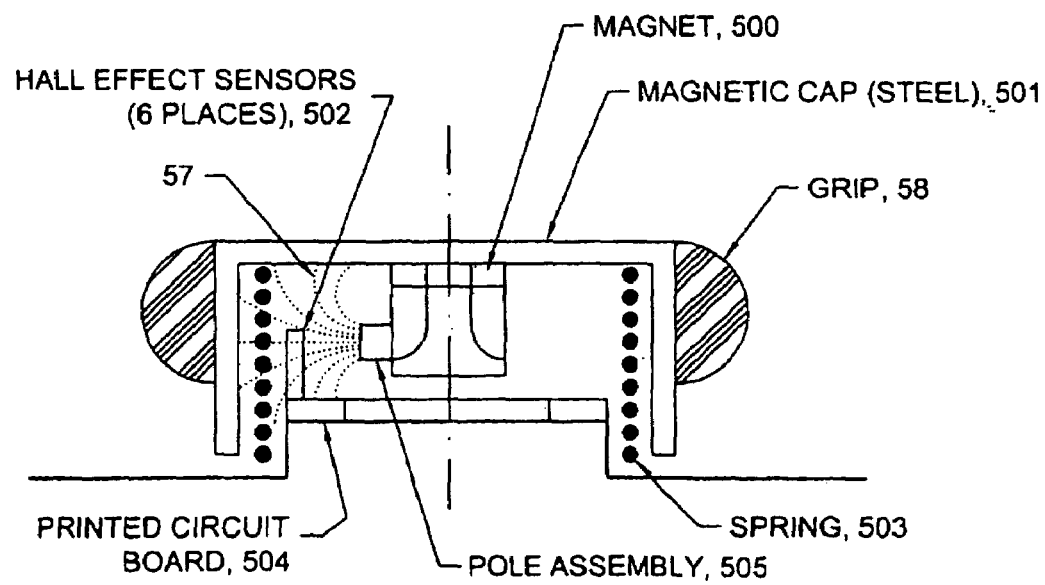

FIG. 13a is a cross-sectional elevation view of a magnetic embodiment of the present invention.

Figure 14:
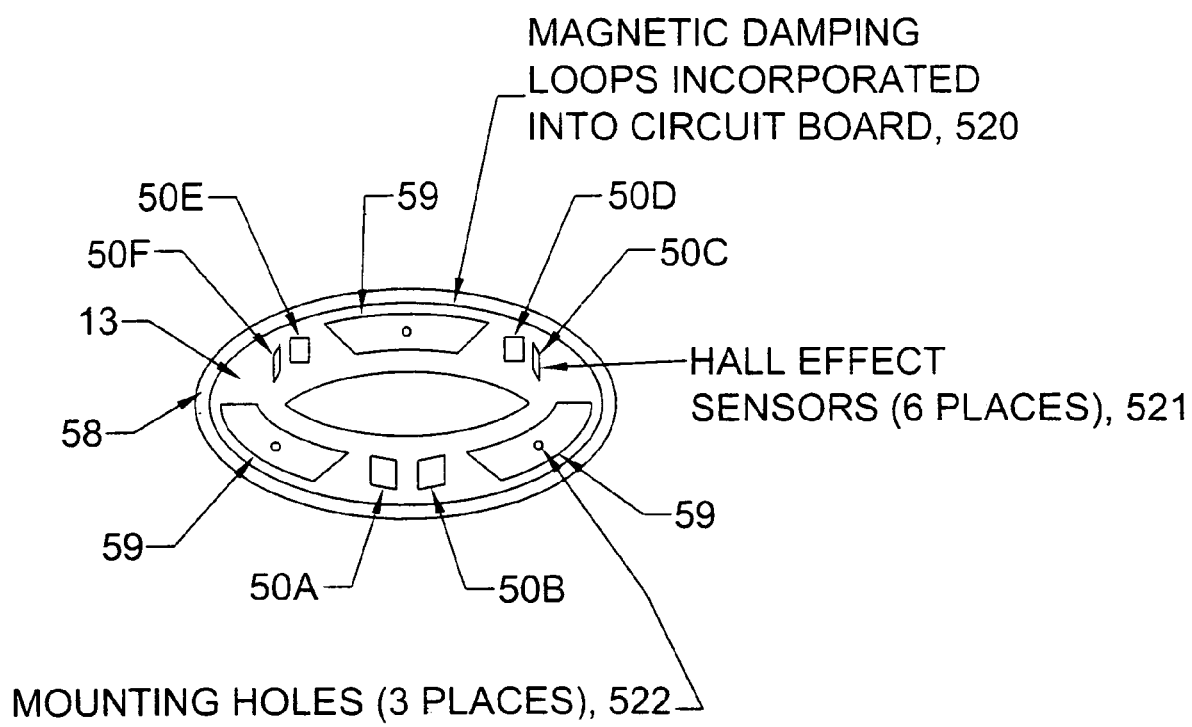

FIG. 14 is a printed circuit board detail of an embodiment of the present invention.

Figure 15A:
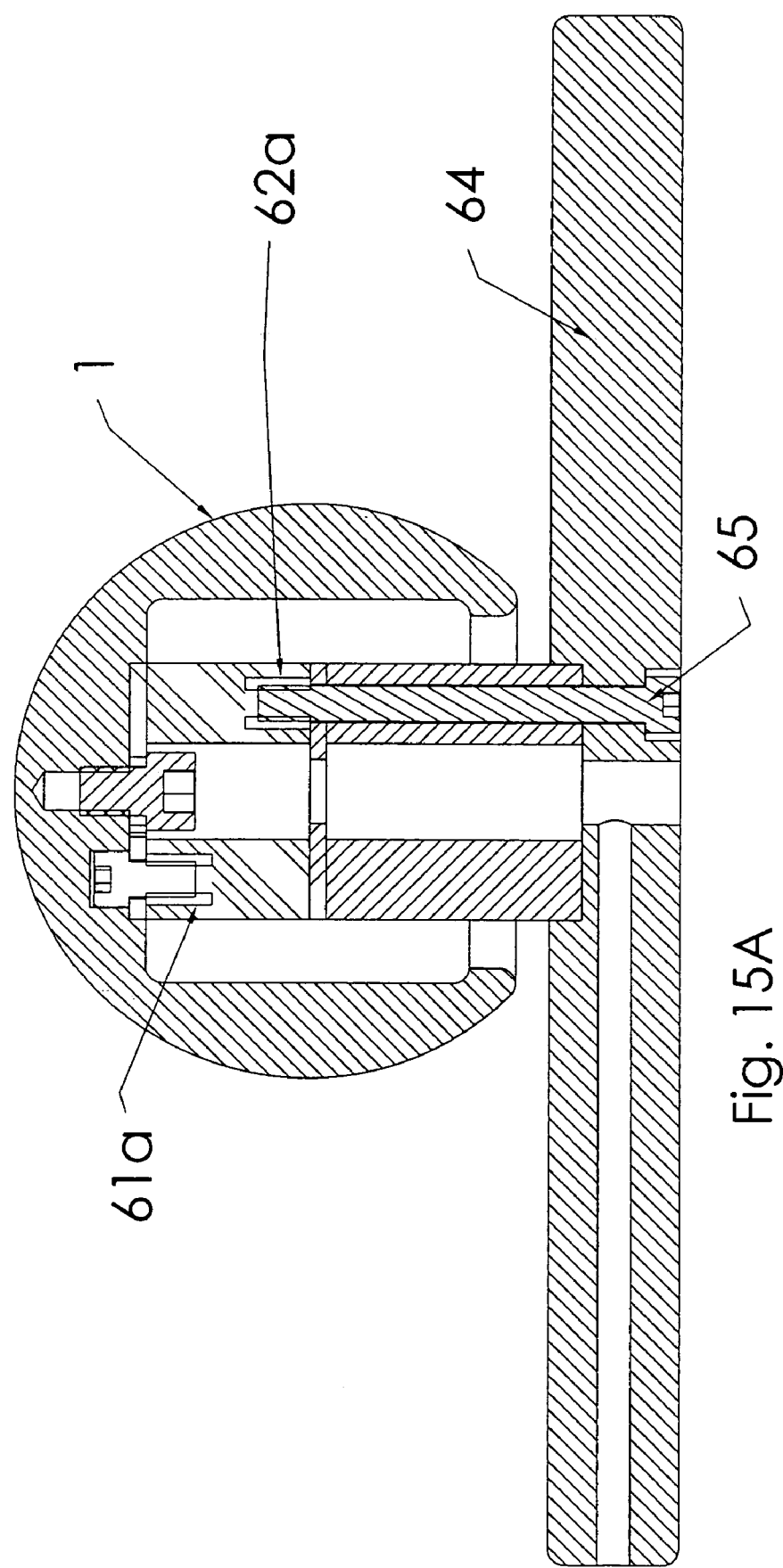

FIG. 15a is a sectional view of an elastomeric embodiment of the present invention.

Figure 15B:
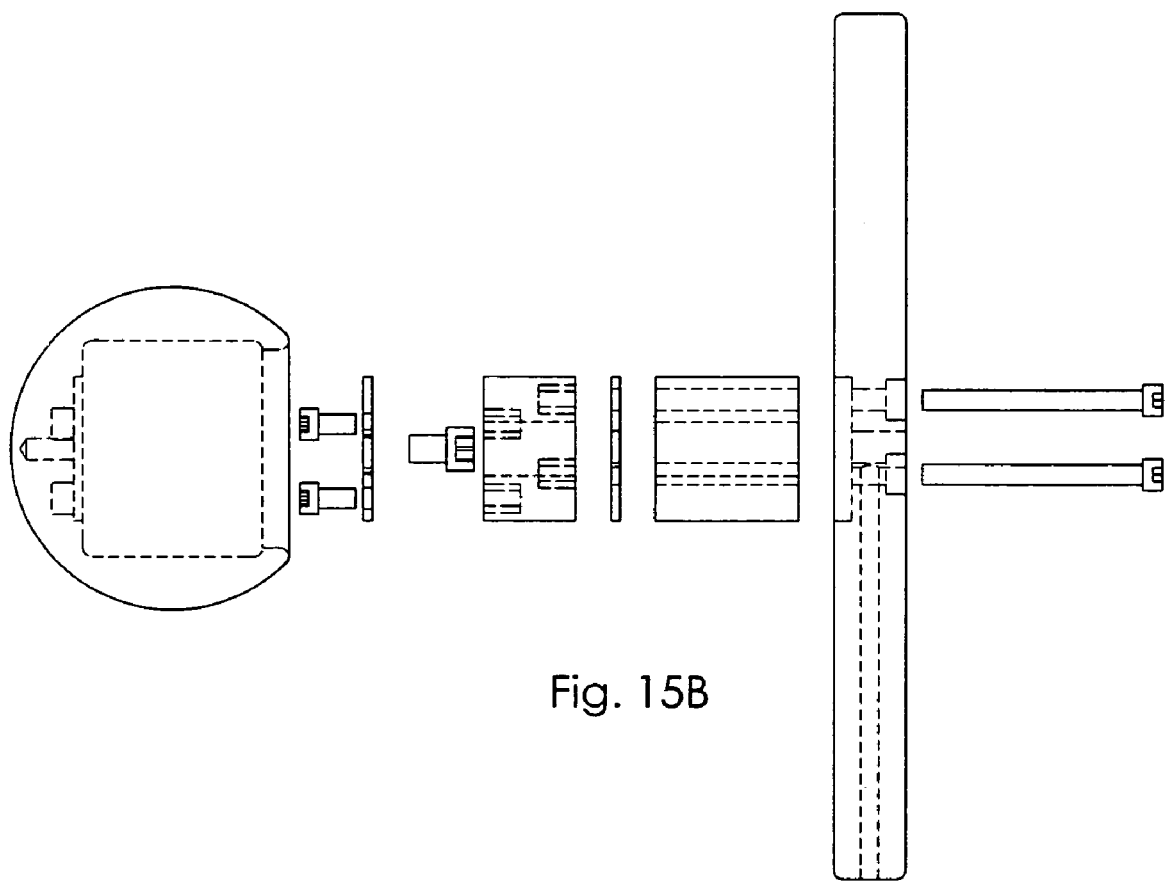

FIG. 15b is an exploded view of the embodiment of FIG. 15a.

Figure 15D:
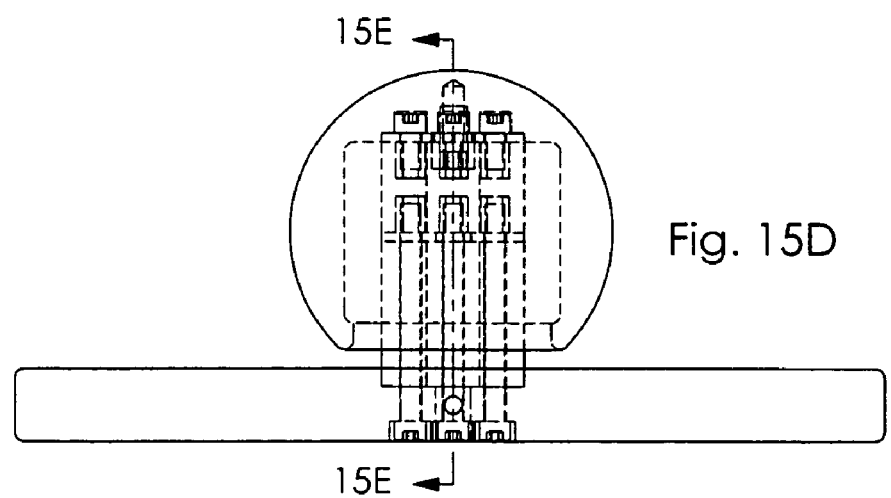
Figure 15C:
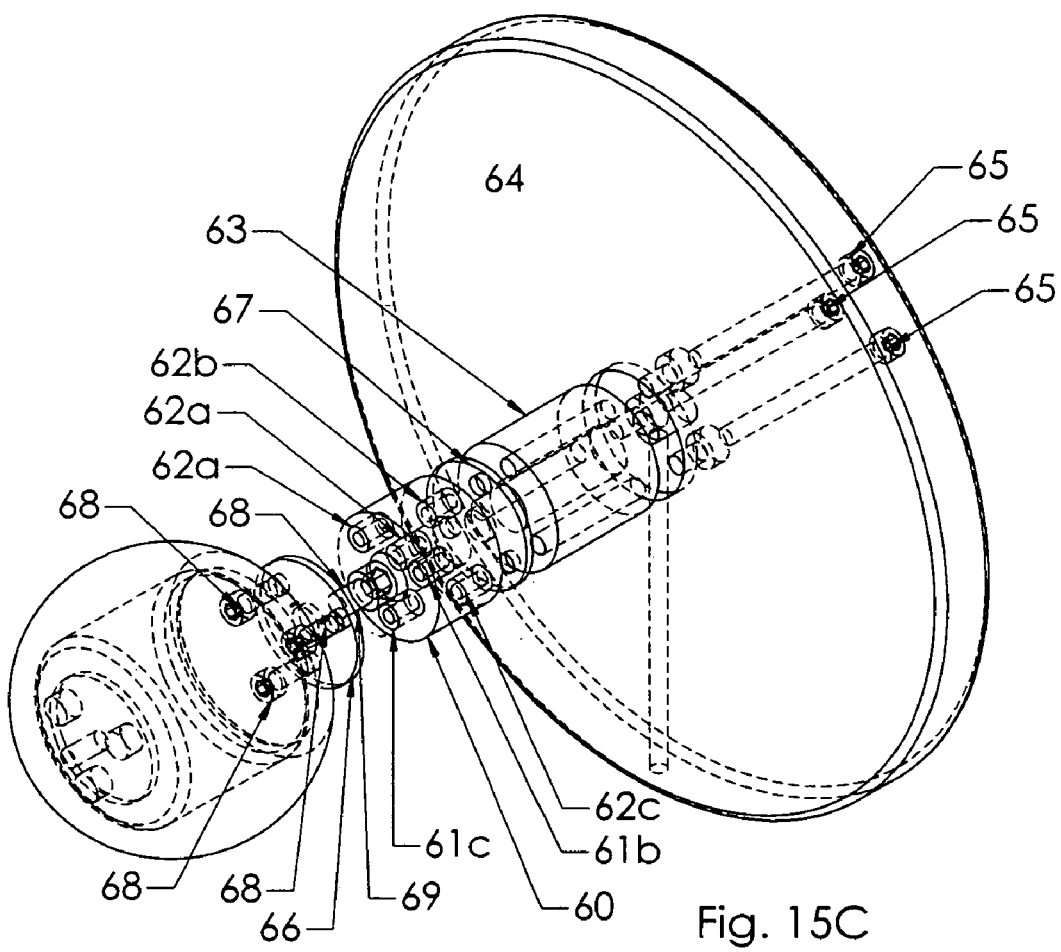

FIG. 15c is another exploded view of the embodiment of FIG. 15a

FIG. 15d is an elevation view of the embodiment of FIG. 15a.

Figure 15E:
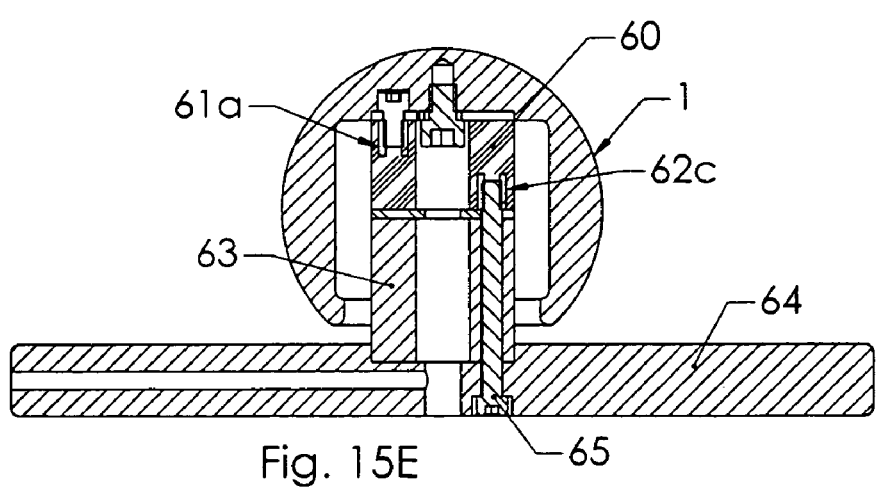

FIG. 15e is sectional view similar to FIG. 15a.

Figure 16:
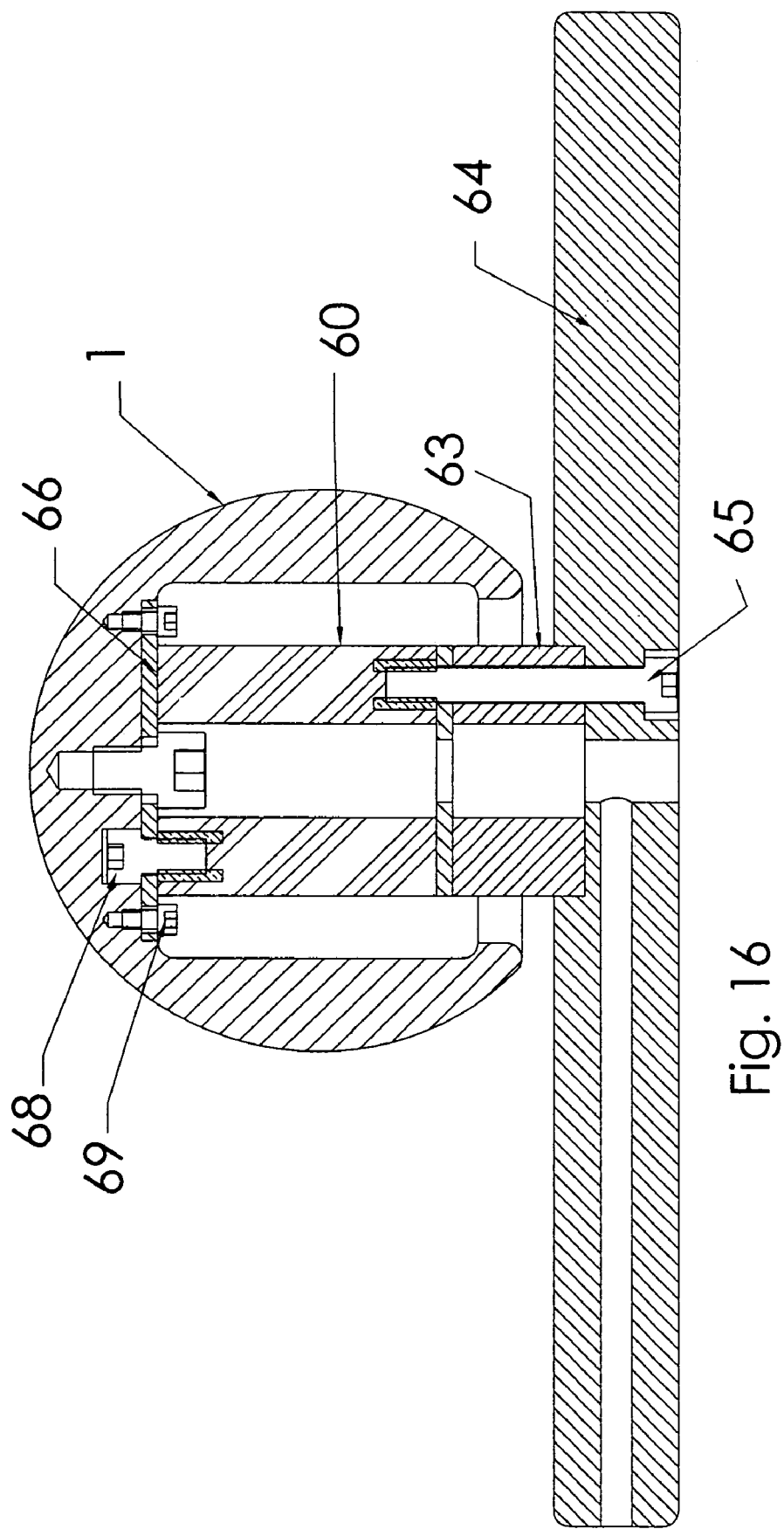

FIG. 16 is a sectional elevation view of another elastomeric embodiment of the present invention.

Figure 17:
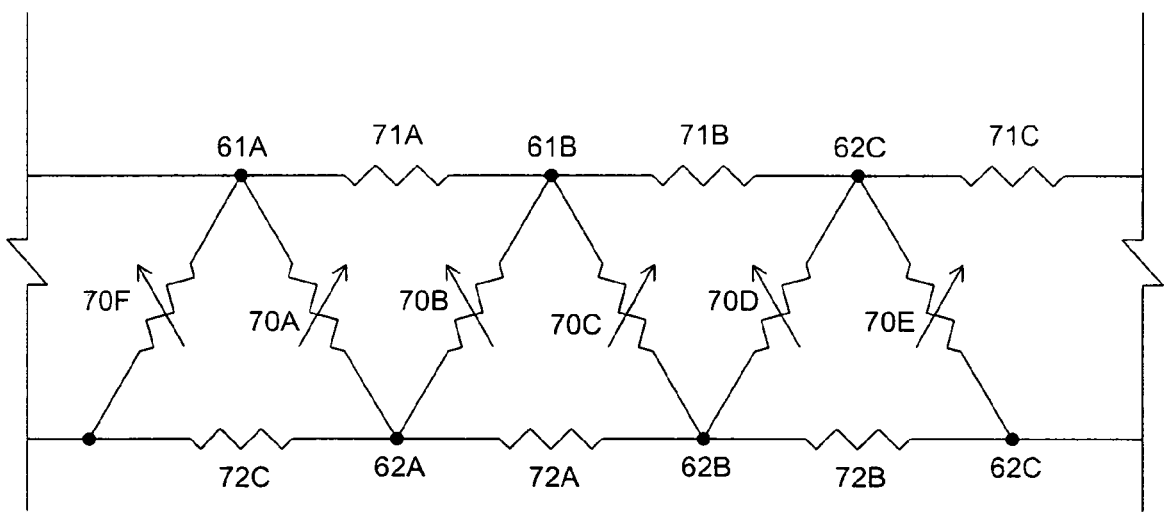

FIG. 17 is a representative equivalent circuit of an elastomeric embodiment of the present invention.

Figure 18A:
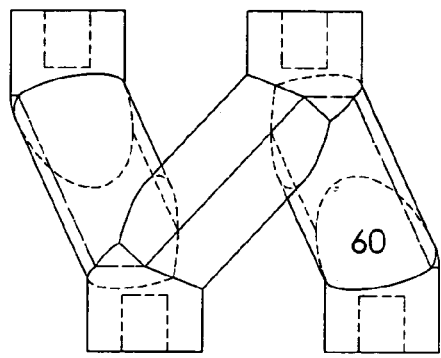

FIG. 18a is an elevation view of the sensor portion of yet another elastomeric embodiment of the present invention.

Figure 18B:
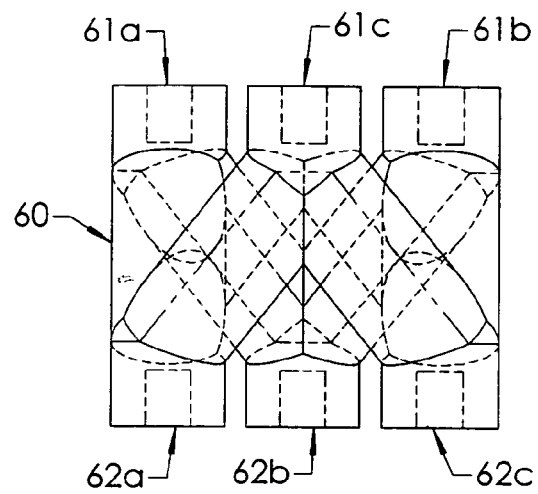

FIG. 18b is another elevation view of the sensor element depicted in FIG. 18a.

Figure 18C:
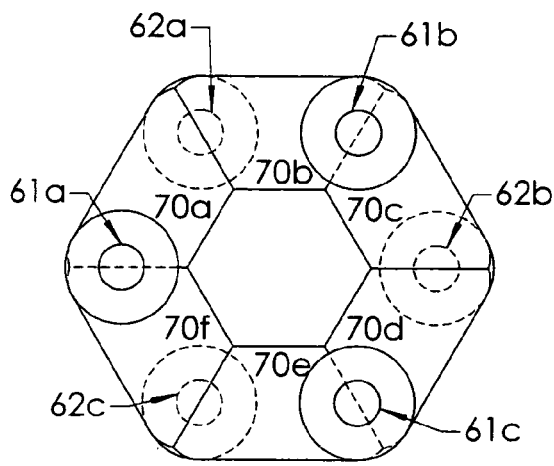
Figure 18D:
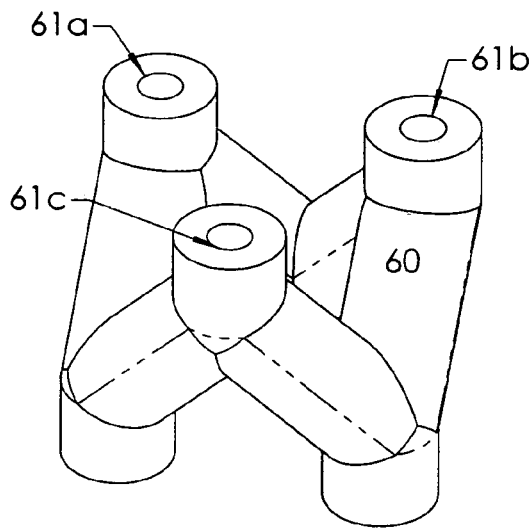

FIG. 18c is a plan view of the sensor element depicted in FIG. 18a, FIG. 18d is a perspective view of the sensor element depicted in FIG. 18a.

Figure 18E:
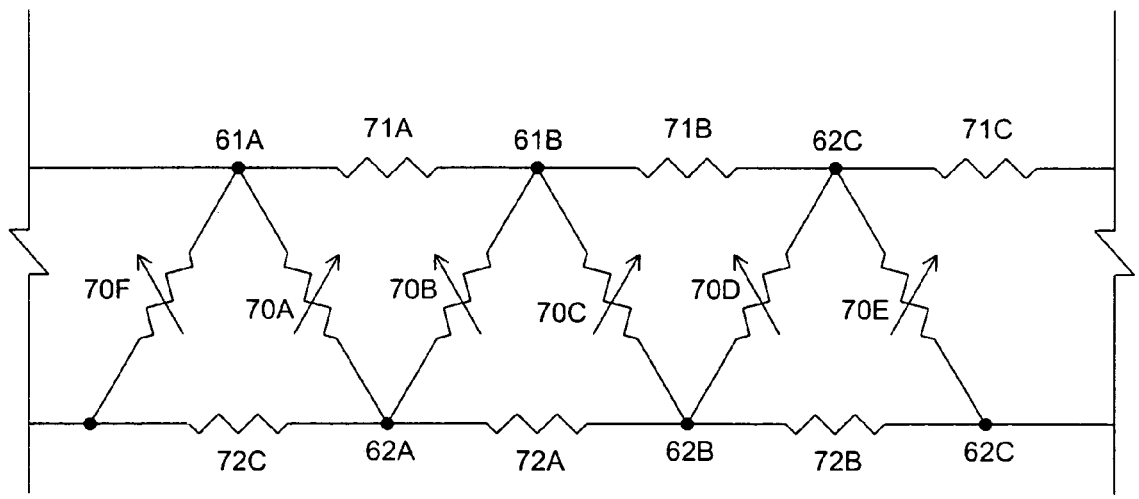

FIG. 18e is a representative equivalent circuit of the sensor element depicted in FIG. 18a.

FIGS. 19a, 19b, 19c, and 19d are respectively, a perspective view, an elevation view, another elevation view, and a plan view of a sensor assembly in accordance with yet another elastomeric embodiment of the present invention.

Figure 19B:
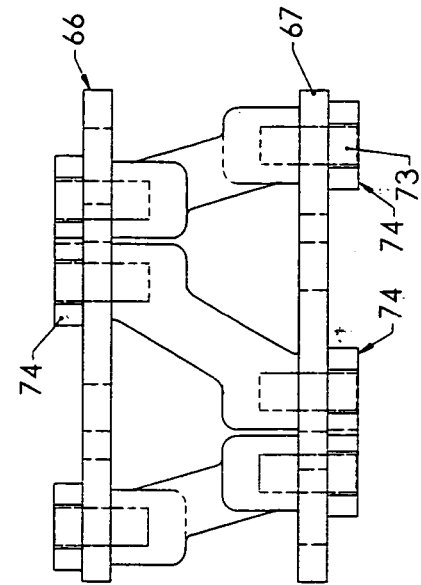
Figure 19D:
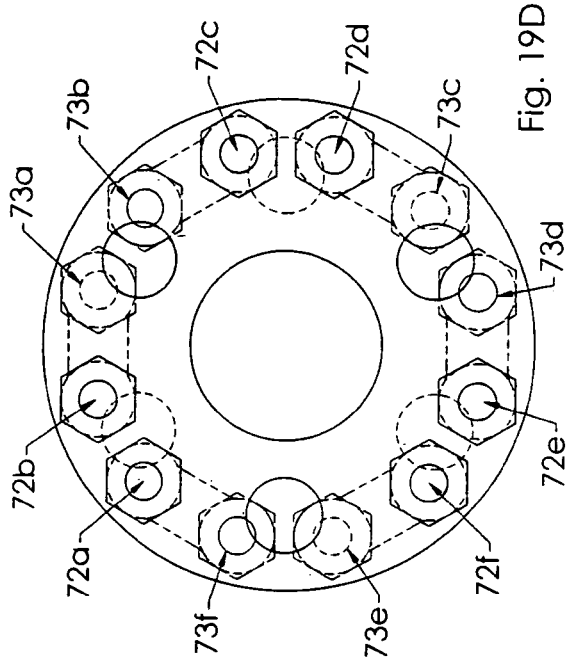
Figure 19A:
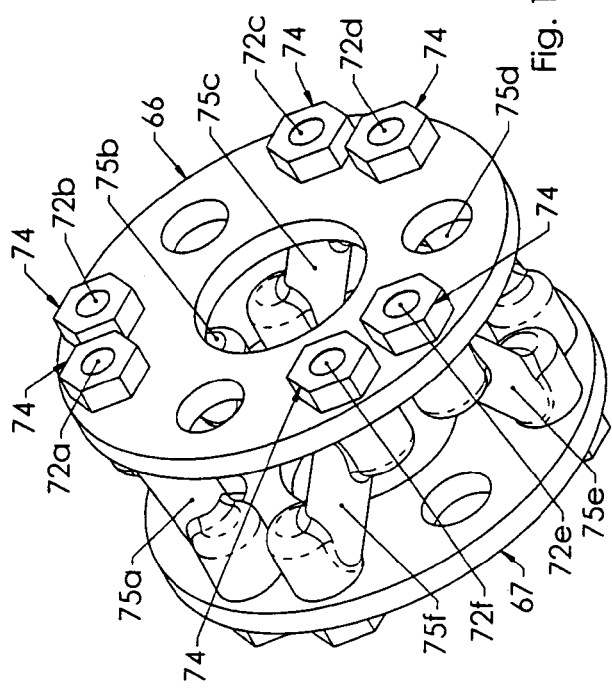
Figure 19C:
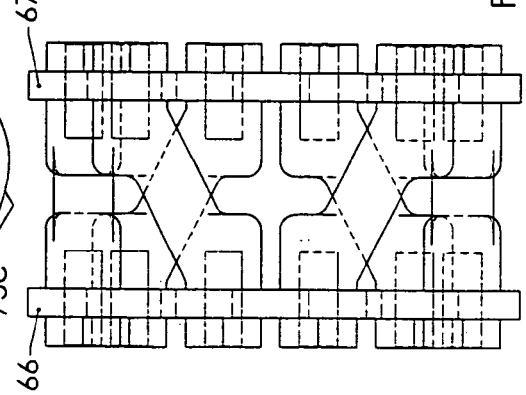
Figure 19E:
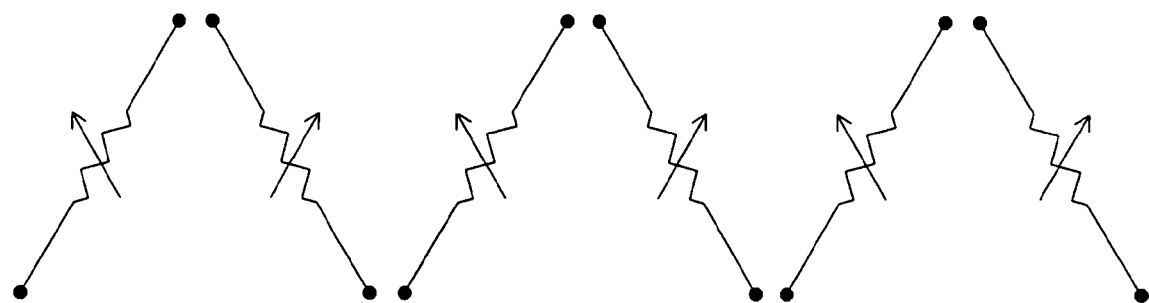

FIG. 19e is a representative equivalent circuit of the sensor assembly of the elastomeric embodiment of the present invention as it is depicted in FIGS. 19a, 19b, 19c, and 19d.

Figure 20A:
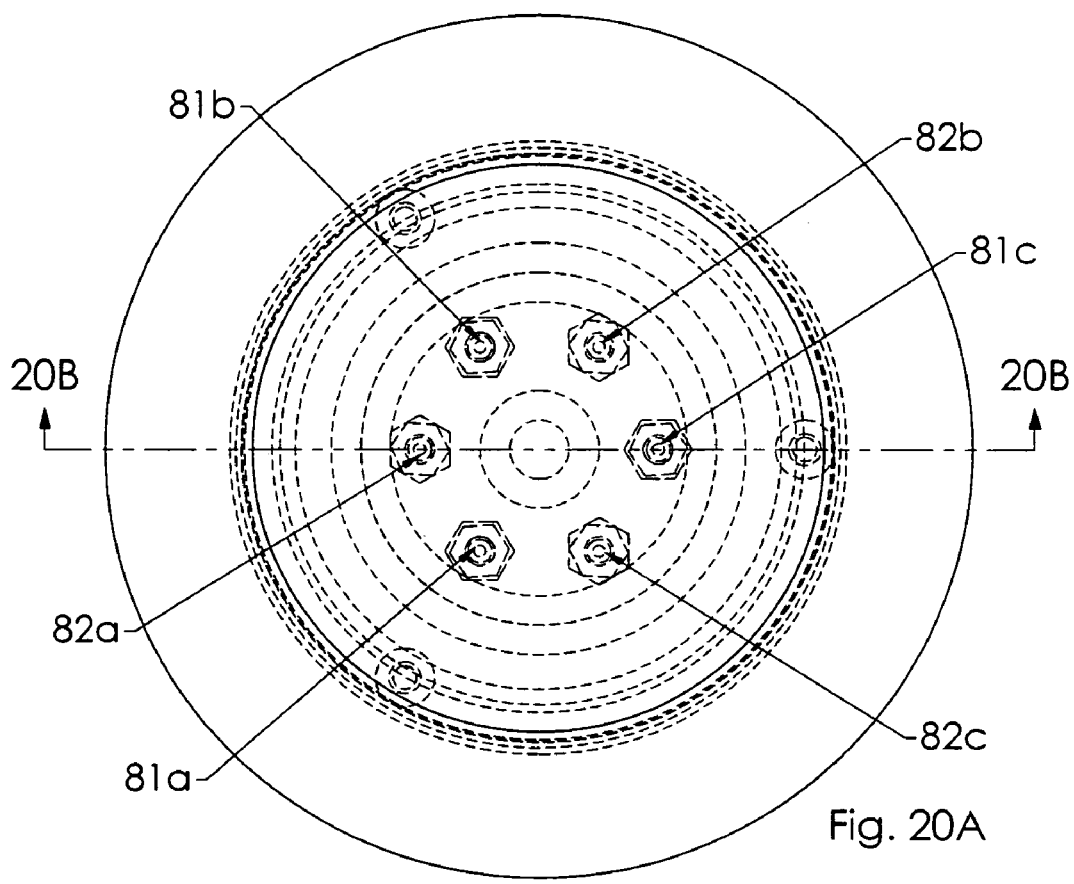
Figure 20B:
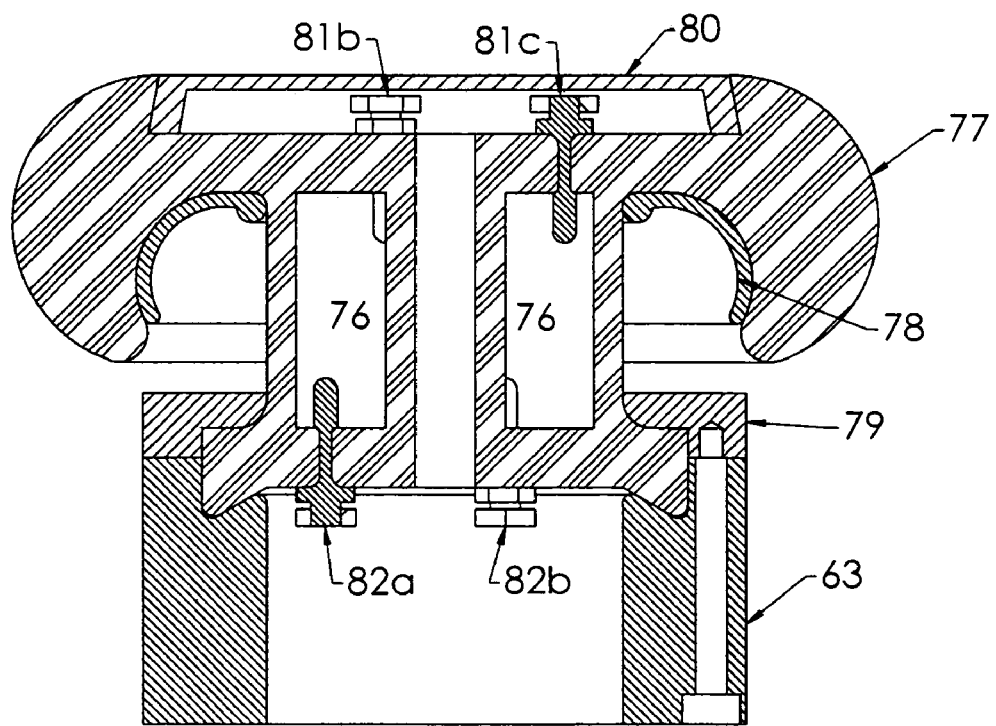

FIGS. 20a and 20b are plan view and sectional elevation view of one of several electrolyte filled elastomeric embodiments of the present invention.

FIGS. 21a, 21d, 21e, and 21f are, respectively, a plan view, an elevation view, another elevation view, and a perspective view of an assembly of another electrolyte filled elastomeric embodiment of the present invention.

FIG. 21b is a view of a single transducer subassembly of the transducer assembly depicted in FIGS. 21a, 21d, 21e, and 21f.

FIG. 21c is section A-A taken through FIG. 21b.

Figure 22:
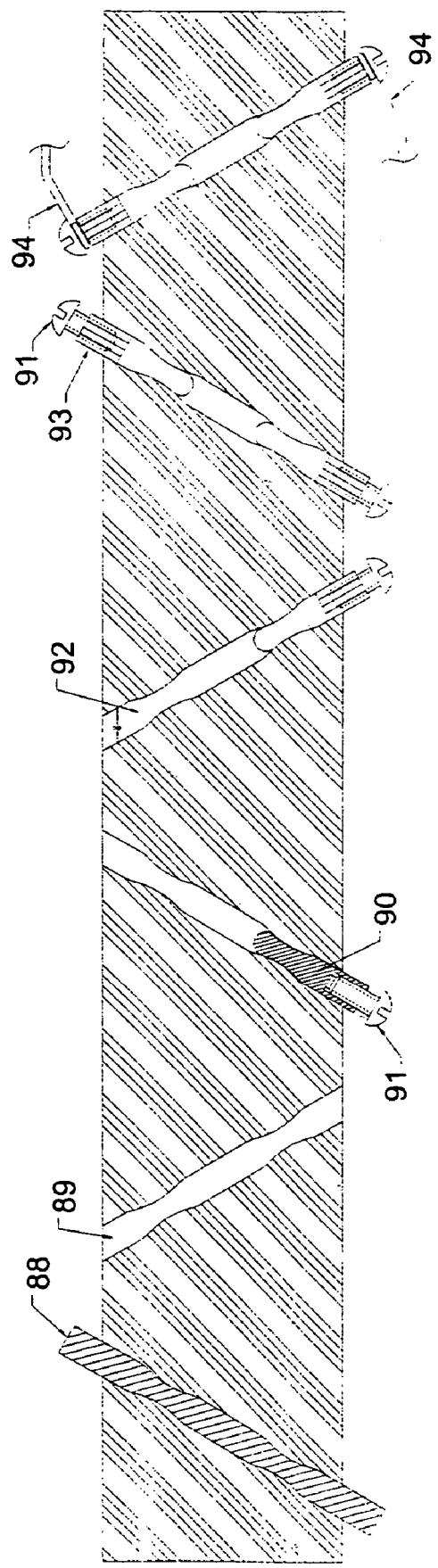

FIG. 22 is a sectional schematic cut along a hexagonal of path yet another electrolyte filled elastomeric embodiment of the present invention shown during representative stages of manufacture and assembly.

Figure 23:
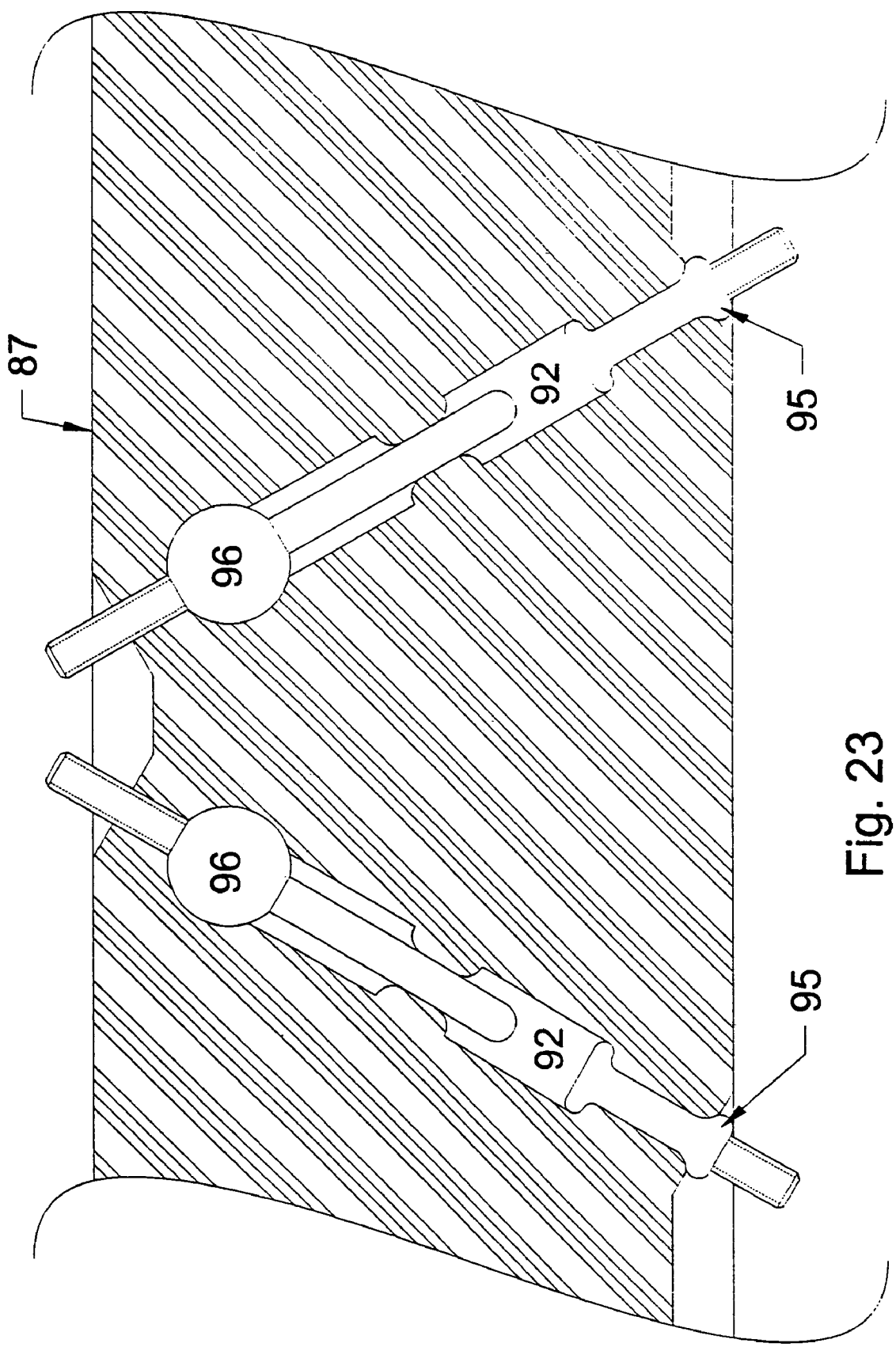

FIG. 23 is a partial sectional schematic cut along a hexagonal path of yet another electrolyte filled elastomeric embodiment of the present invention.

Figure 24:
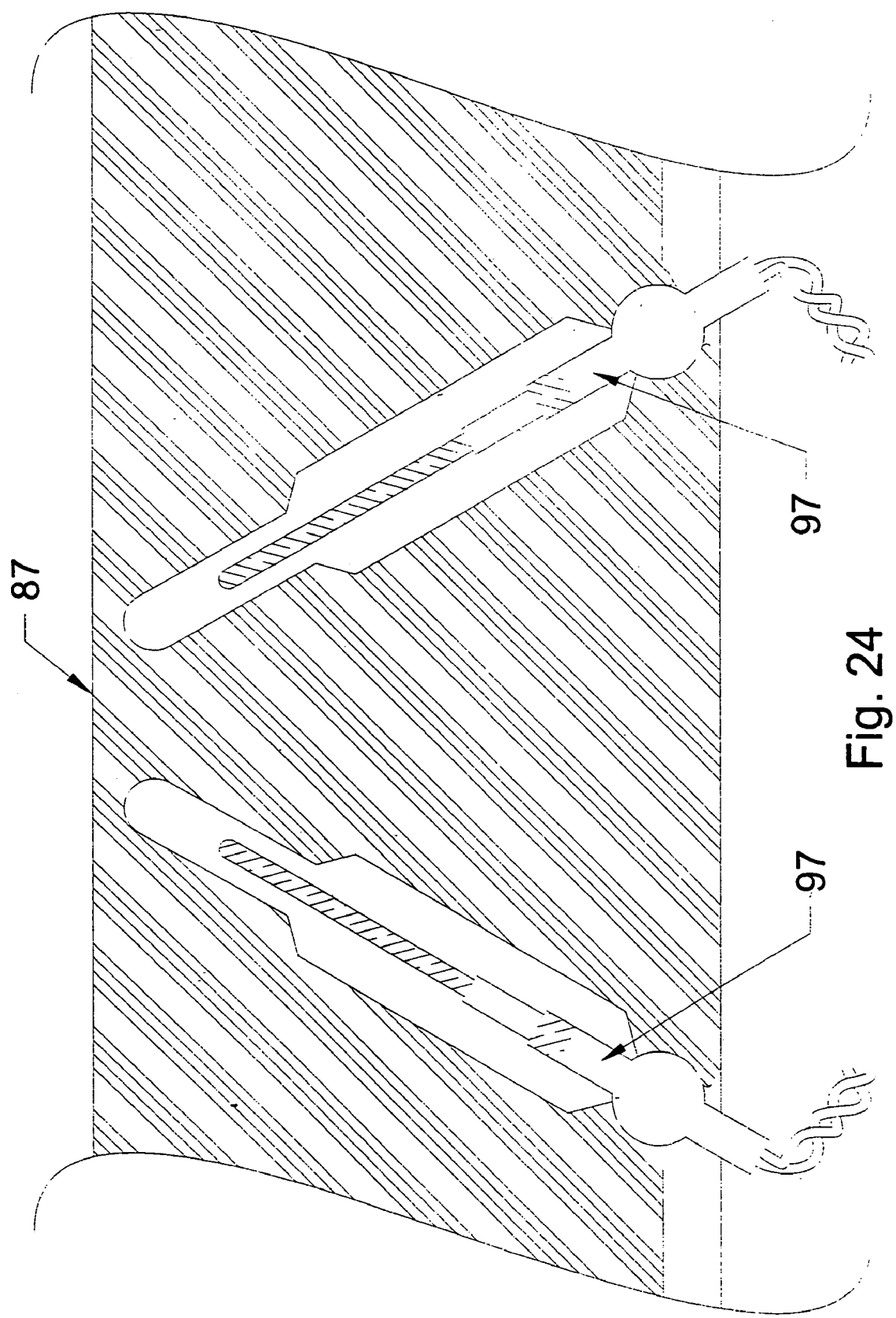

FIG. 24 is a partial sectional schematic cut along a hexagonal path of yet another electrolyte filled elastomeric embodiment of the present invention.

Figure 25A:
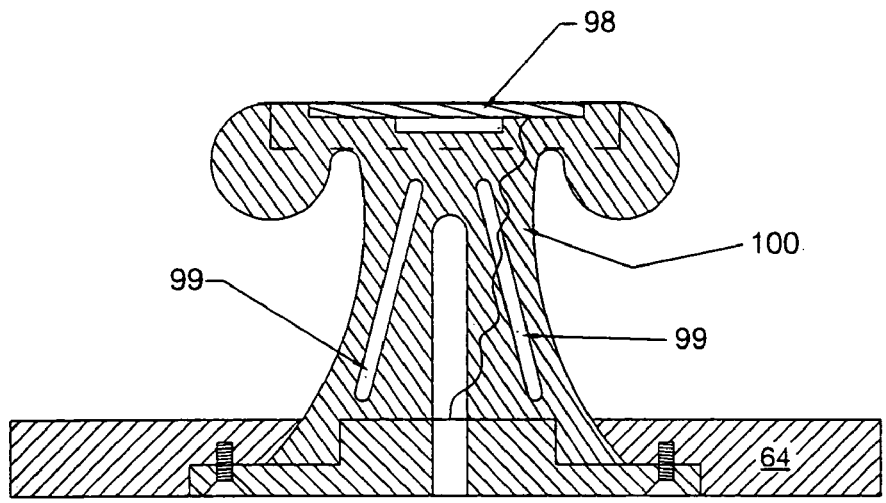

FIG. 25a is an elevation view of an elastomeric embodiment of the present invention utilizing a combination of stiffening elements and force sensors.

Figure 25B:
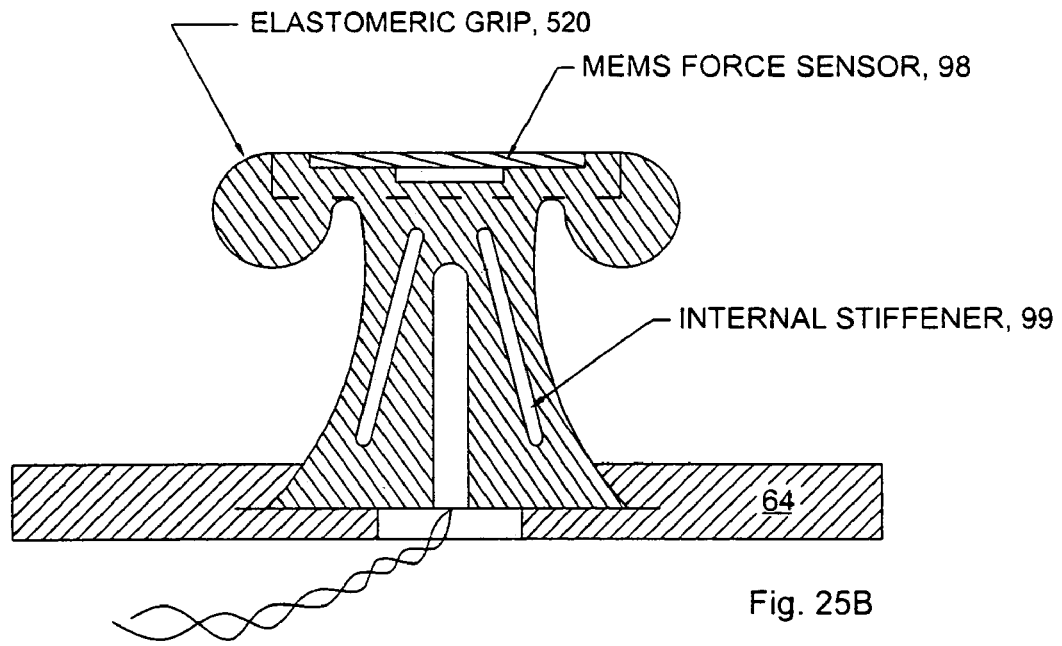

FIG. 25b is an elevation view of another elastomeric embodiment of the present invention utilizing a combination of stiffening elements and force sensors.

Figure 25C:
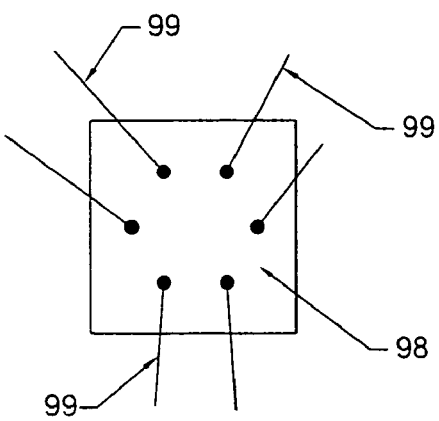

FIG. 25c is a plan view depicting one of many possible stiffener arrangements.

FIG. 26 is a partial sectional view showing one element of the multi-axis sensor portion of an elastomeric embodiment of the present invention utilizing a combination of stiffening means and pressure sensing means.

Figure 27:
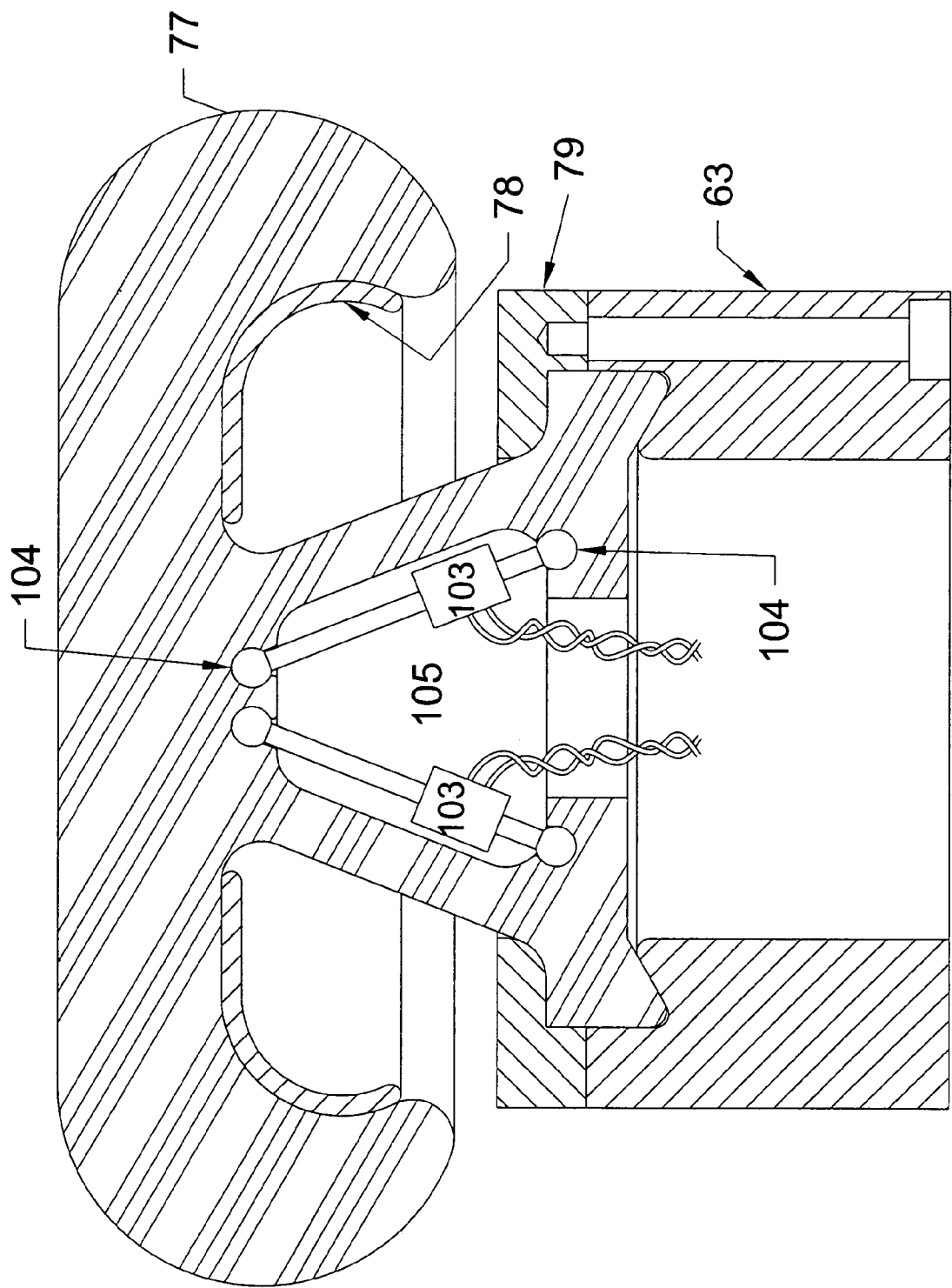

FIG. 27 is a sectional view of an embodiment of the present invention depicting the use of discrete single axis displacement sensors in conjunction with a deformable elastomeric structure.

Figure 28:
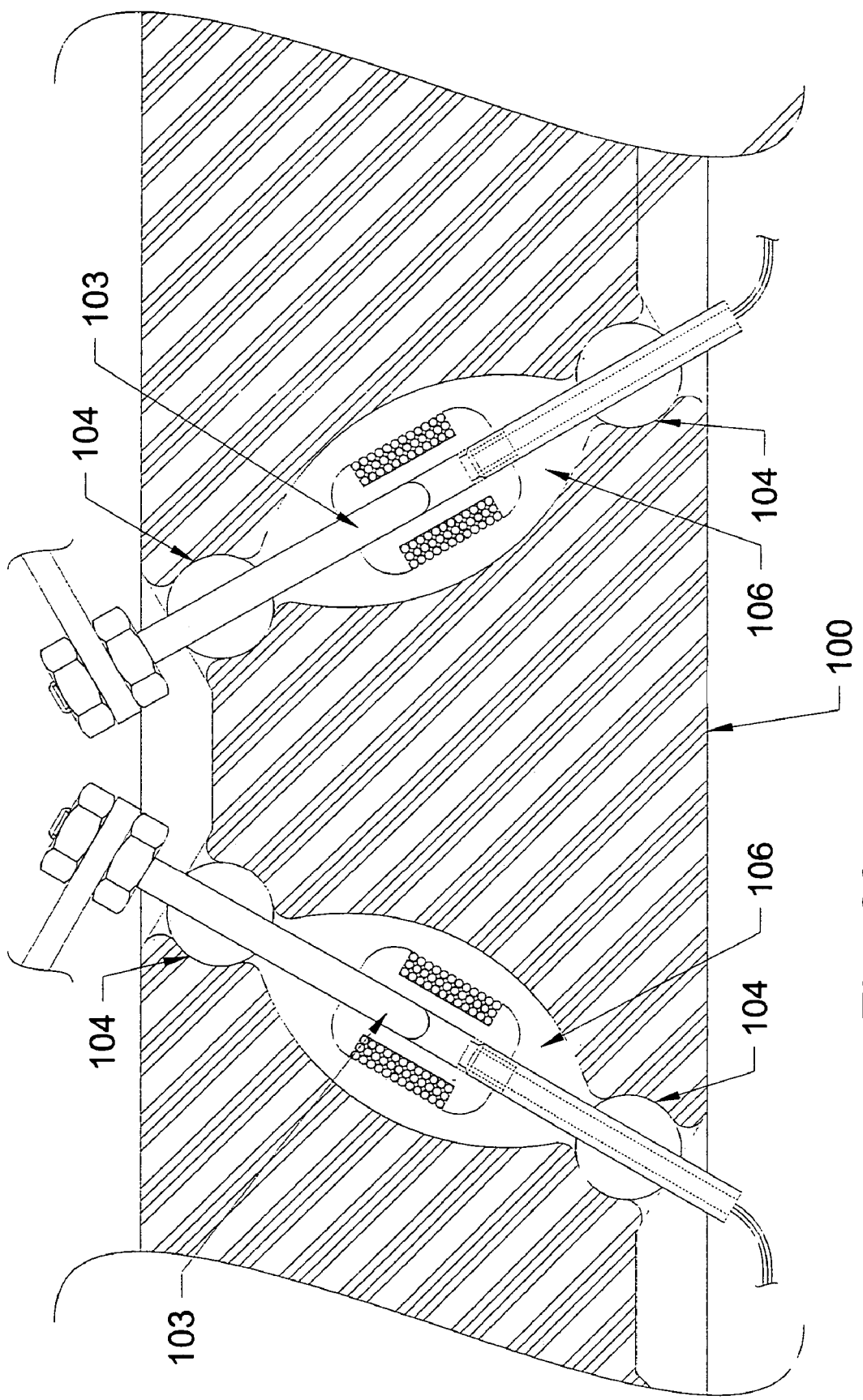

FIG. 28 is a representative partial sectional view of another embodiment of the present invention depicting the use of discrete single axis displacement sensors in conjunction with a deformable elastomeric structure.

Figure 29:
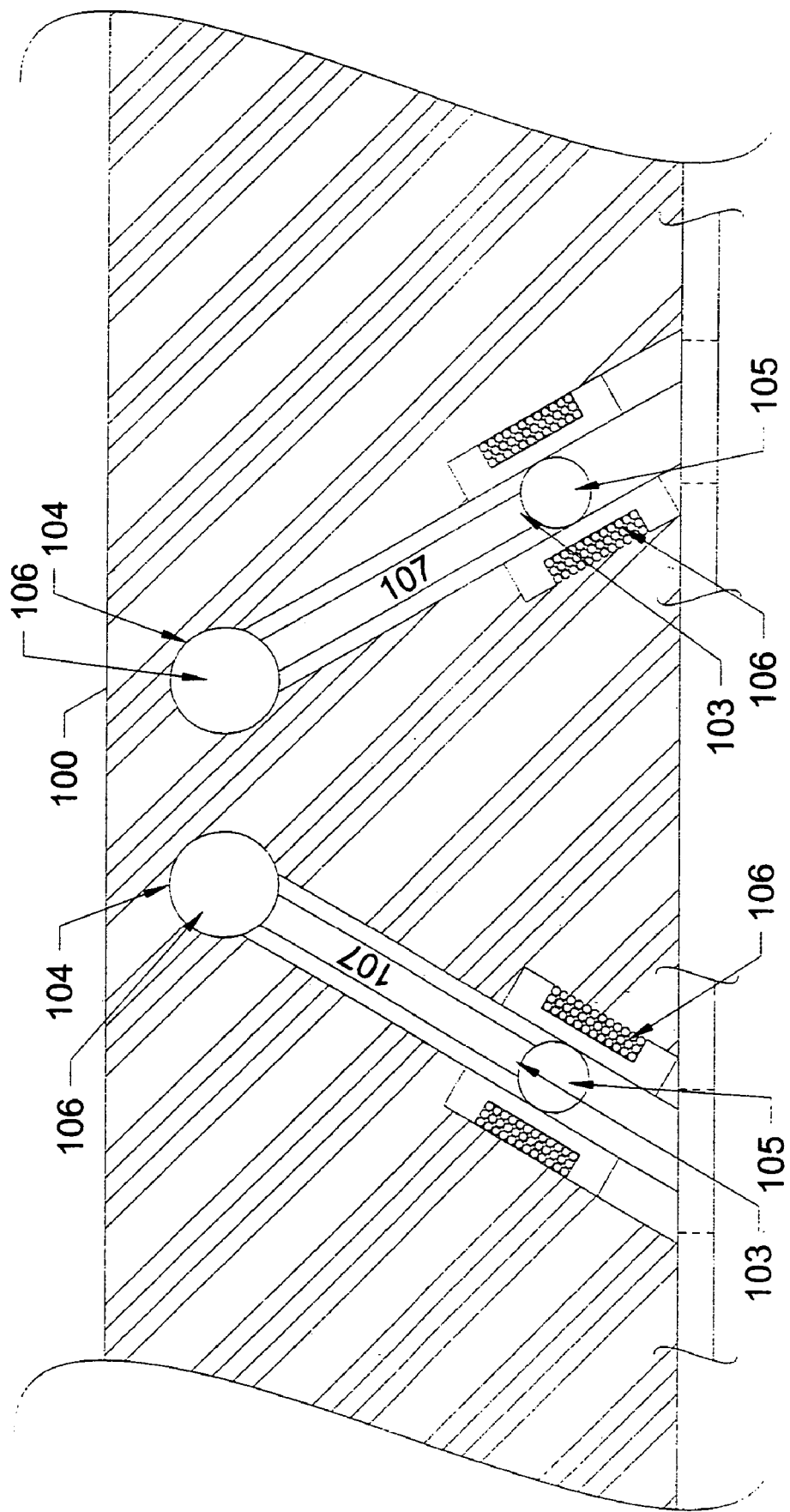

FIG. 29 is a representative partial sectional view of yet another embodiment of the present invention depicting the use of discrete single axis displacement sensors in conjunction with a deformable elastomeric structure.

Figure 30:
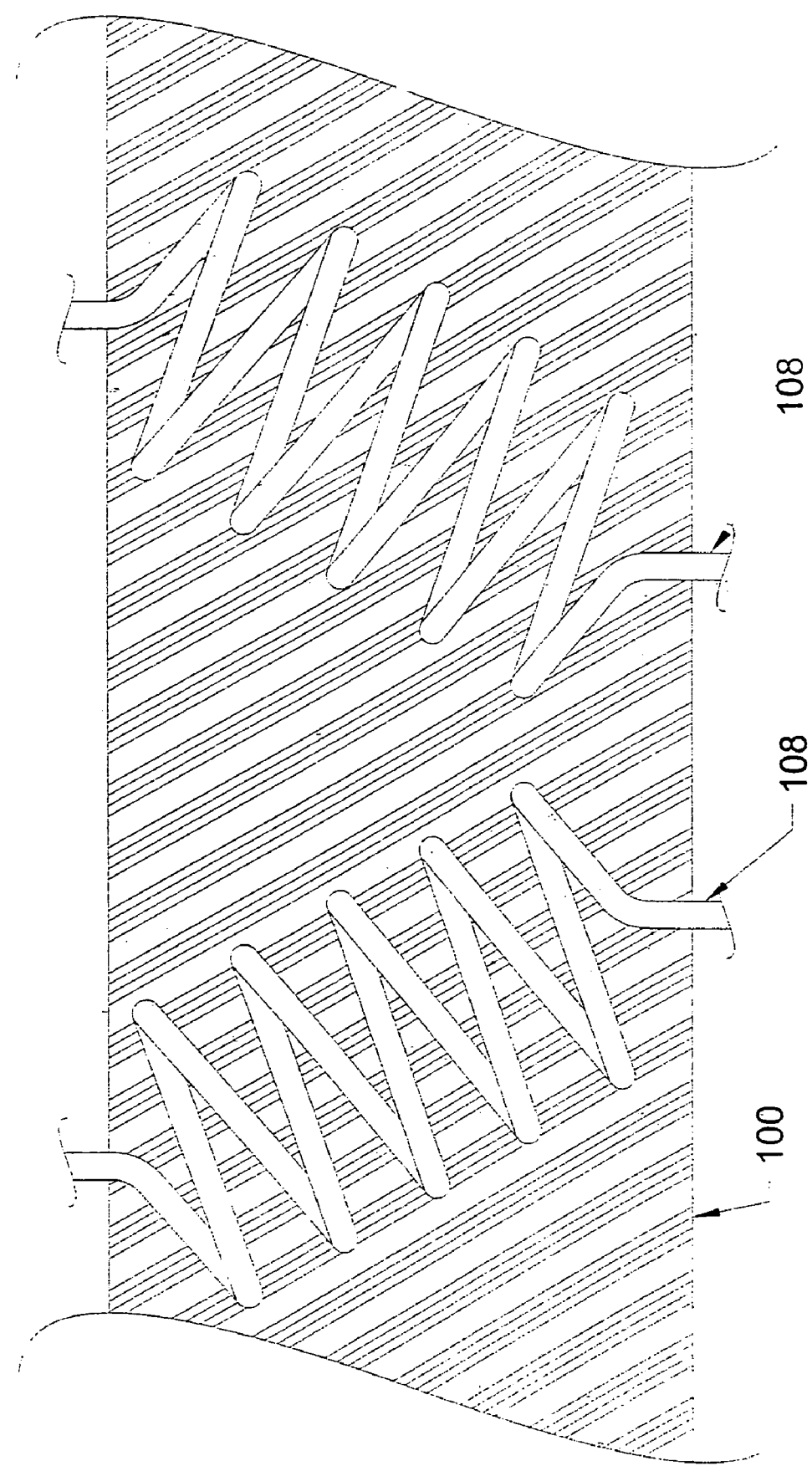

FIG. 30 is a representative partial sectional view of the sensor portion of yet another embodiment of the present invention depicting the use of extendable coiled variable inductors embedded within a deformable elastomeric structure.

Figure 31:
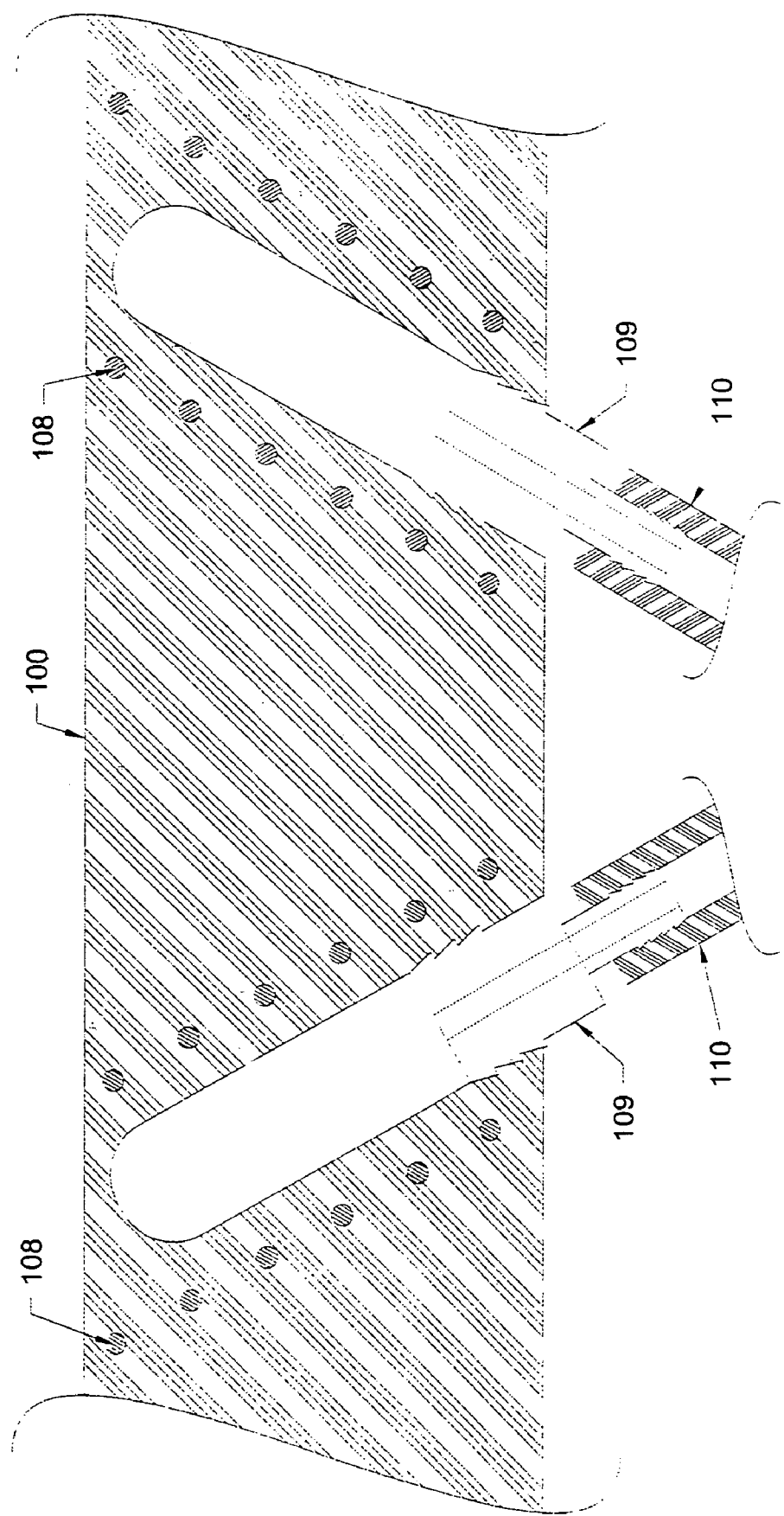
Figure 32D:
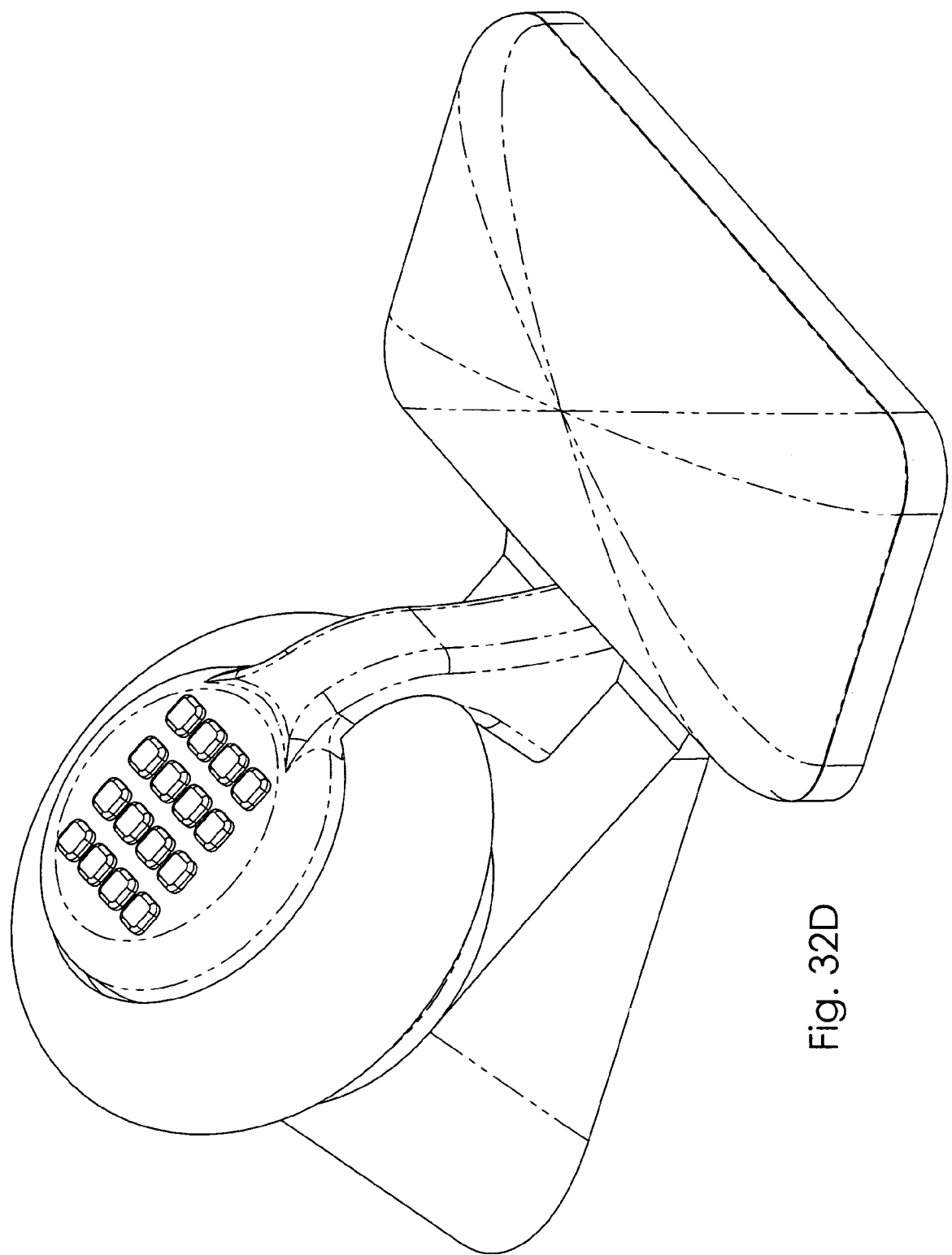

FIG. 31 is a representative partial sectional view of the sensor portion of yet another embodiment of the present invention depicting the use of extendable coiled variable inductors embedded within a deformable elastomeric structure in conjunction with a plurality of cavities which may be deformed by internal pressure for force or position feedback purposes.

FIGS. 32a, 32b, 32c, and 32d are, respectively, sectional elevation, partial plan, partial sectional elevation, and perspective views of an embodiment of the present invention featuring an electrolyte filled deformable sensor, a gel filled wrist rest and an integral data entry keypad.

Figure 33:
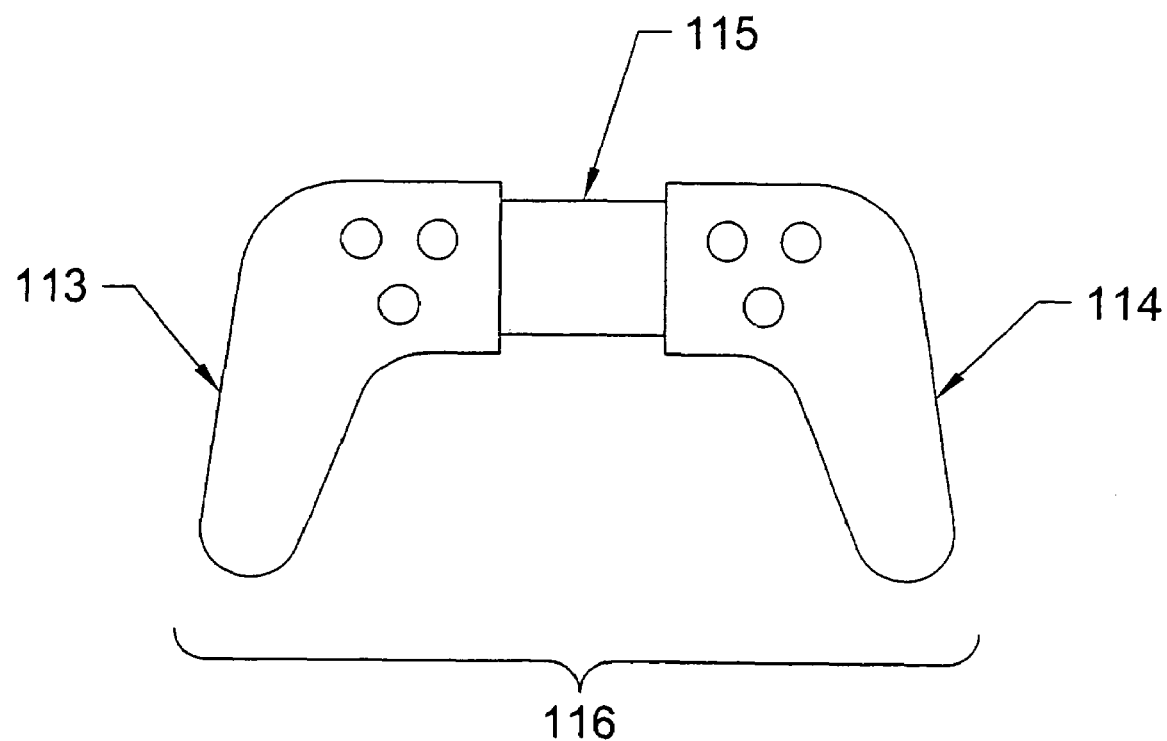

FIG. 33 is a schematic representation of an embodiment of the present invention comprising a two handed game controller with a multi-axis sensor means connecting the right and left gripped portions of said game controller.

Figure 34:
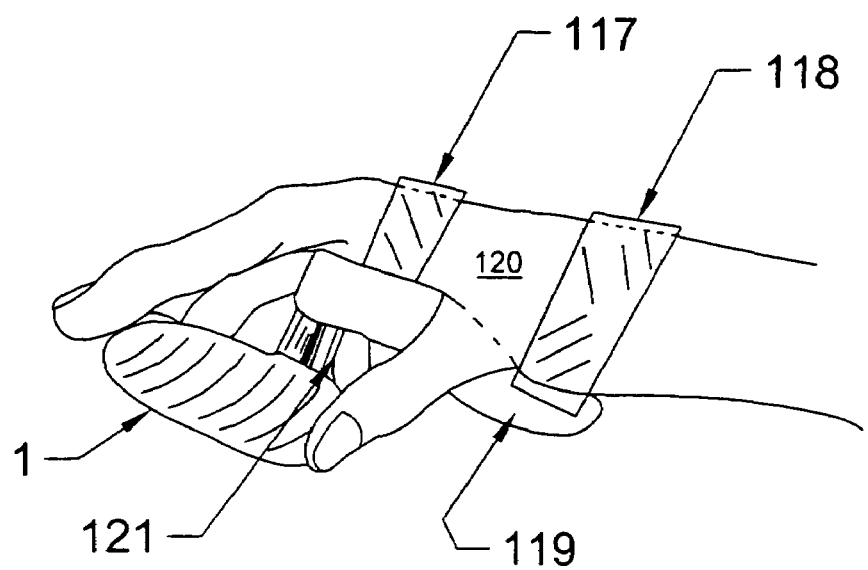
Figure 35F:
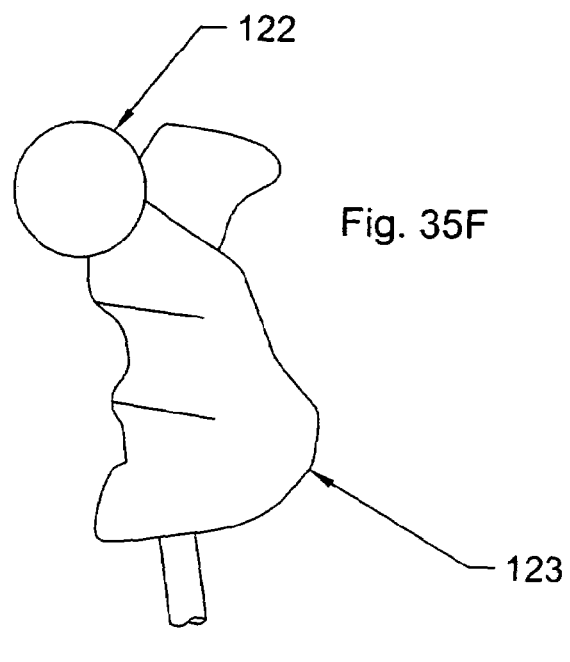
Figure 35G:
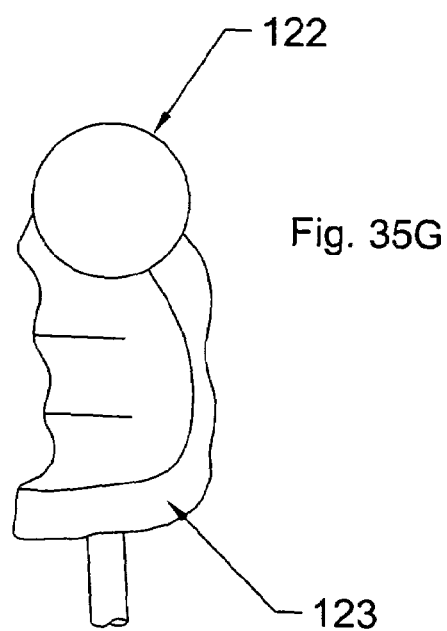
Figure 35H:
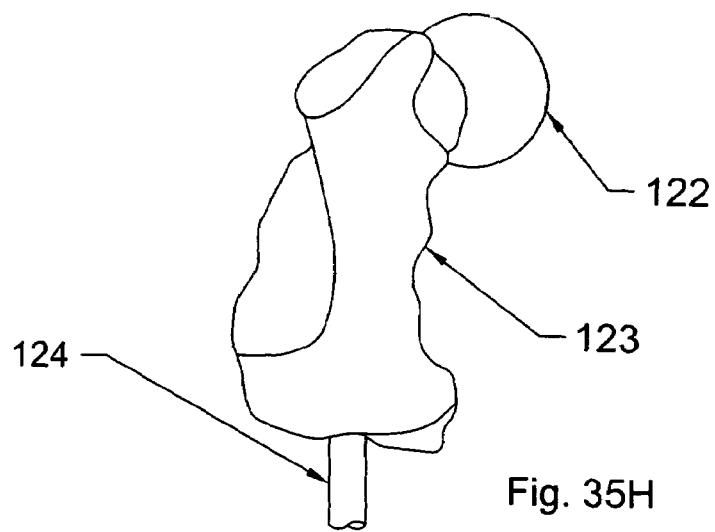

FIG. 34 is a schematic illustration of a hand held embodiment of the present invention.

FIGS. 35a, 35b, 35c, 35d, 35e, 35f, 35g, and 35h are photographs of a model of an embodiment of the present invention comprising a finger tip operated active grip of approximately 1.5 inch diameter, with six degrees of freedom for example, mounted to a hand held active grip, with an additional six degrees of freedom, for example.

Figure 36A:
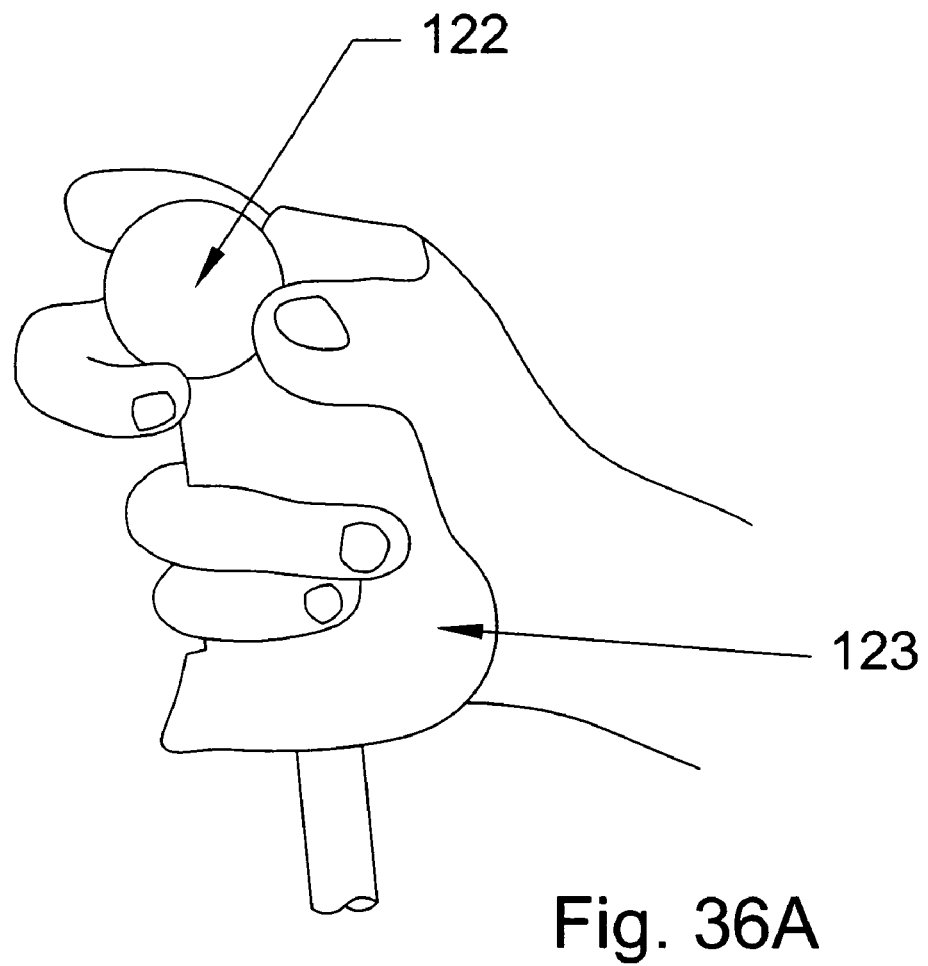
Figure 36B:
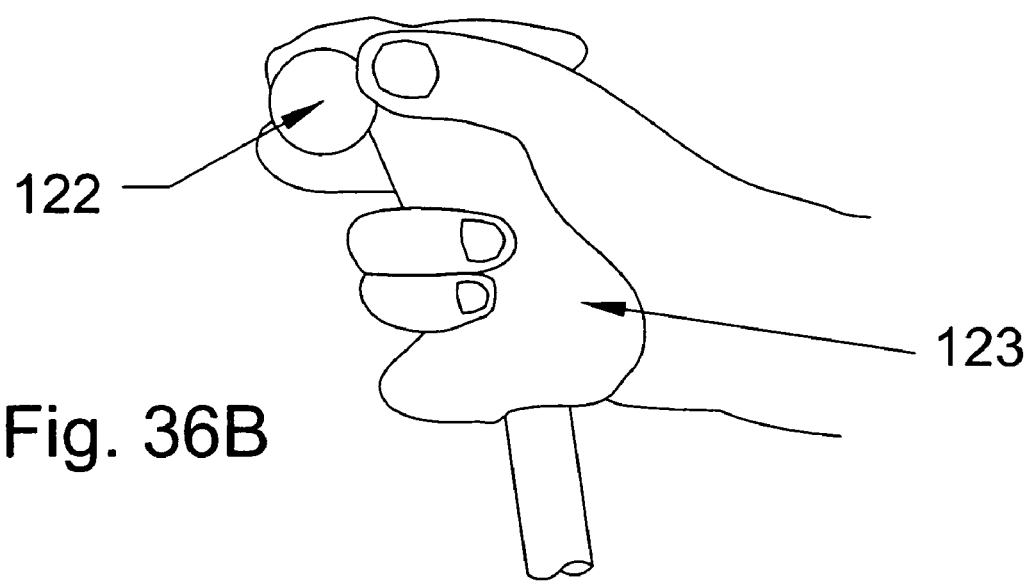

FIGS. 36a and 36b are photographs of a model of an embodiment of the present invention similar to that shown in FIGS. 35a through 35h, except with a finger-tip operated grip of approximately 1 inch diameter.

Figure 37A:
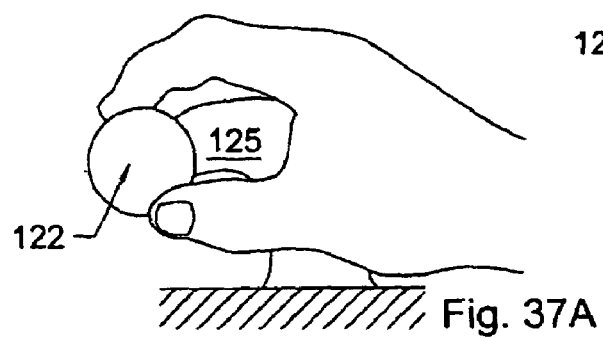
Figure 37B:
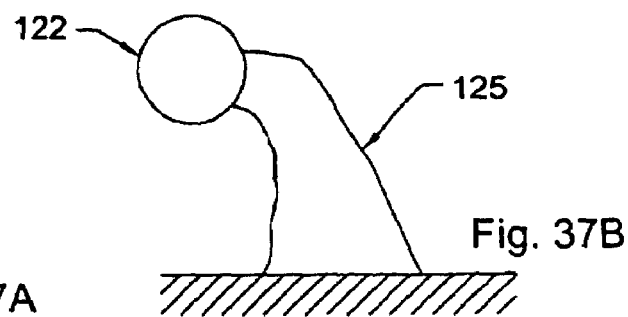
Figure 38A:
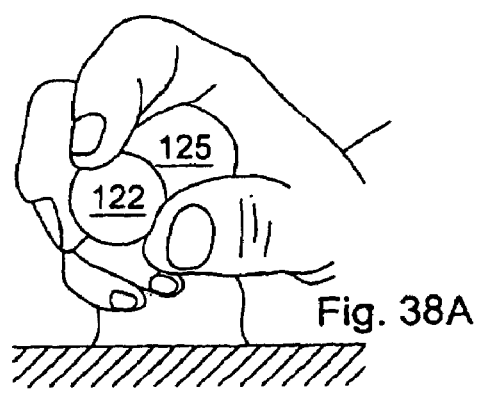
Figure 38B:
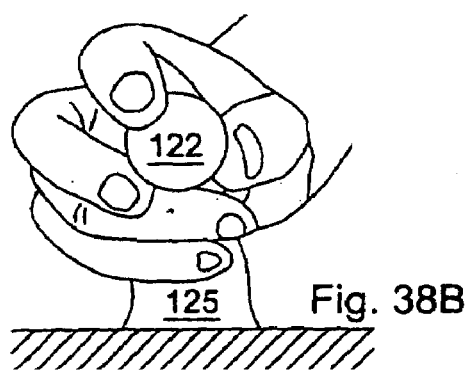
Figure 38C:
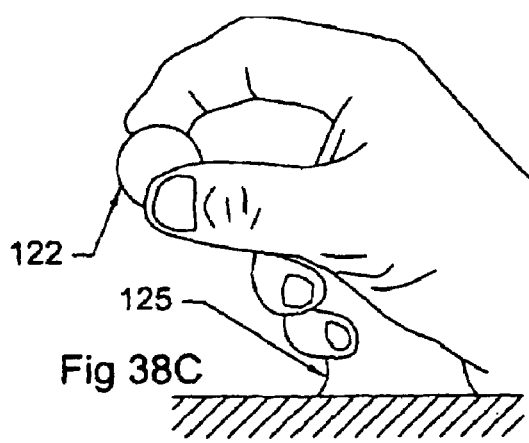
Figure 38D:
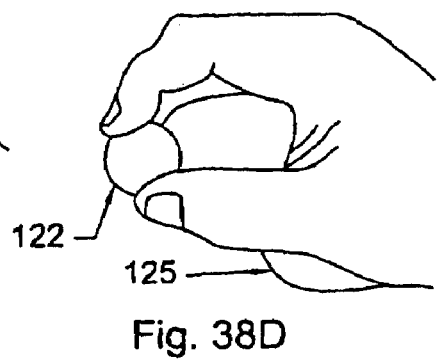

FIGS. 37a and 37b are photographs of an embodiment of the present invention wherein a fingertip active grip is mounted to a fixed hand stabilizing grip wherein said fingertip operated active grip is an approximately 1.5 inch diameter sphere.

FIGS. 38a, 38b, 38c, and 38d are photographs of a model of an embodiment of the present invention similar to that shown in FIGS. 37a and 37b, except that the fingertip operated grip is a sphere of approximately 1 inch diameter.

Figure 39:
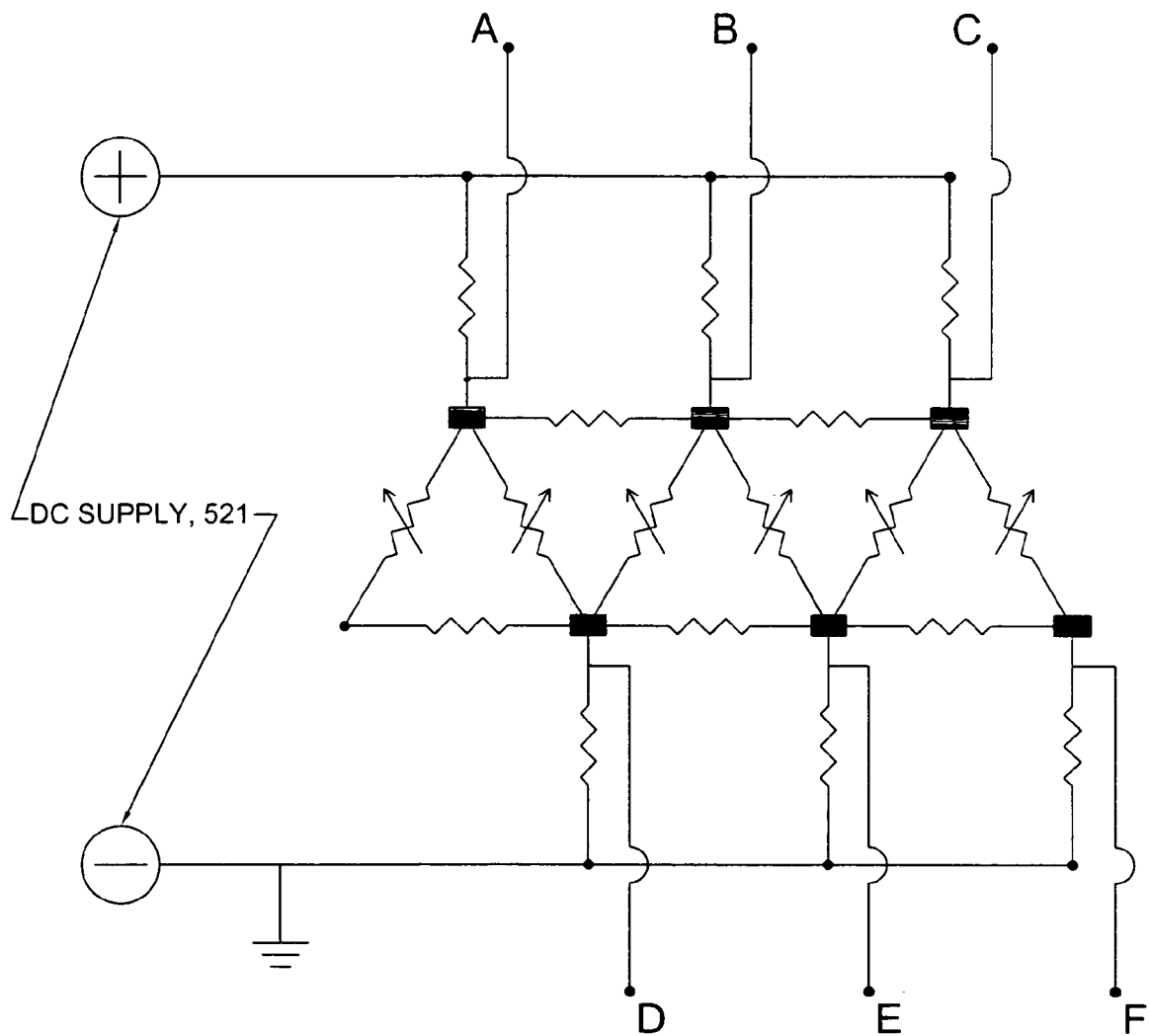

FIG. 39 is an electrical schematic of a bridge circuit corresponding to an elastomeric embodiment of the present invention.

Figure 40A:
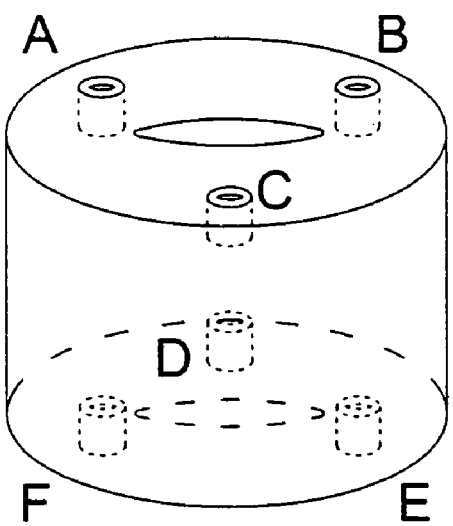

FIG. 40a is a perspective view of an elastomeric sensing element in accordance with one of the embodiments of this invention.

Figure 40B:
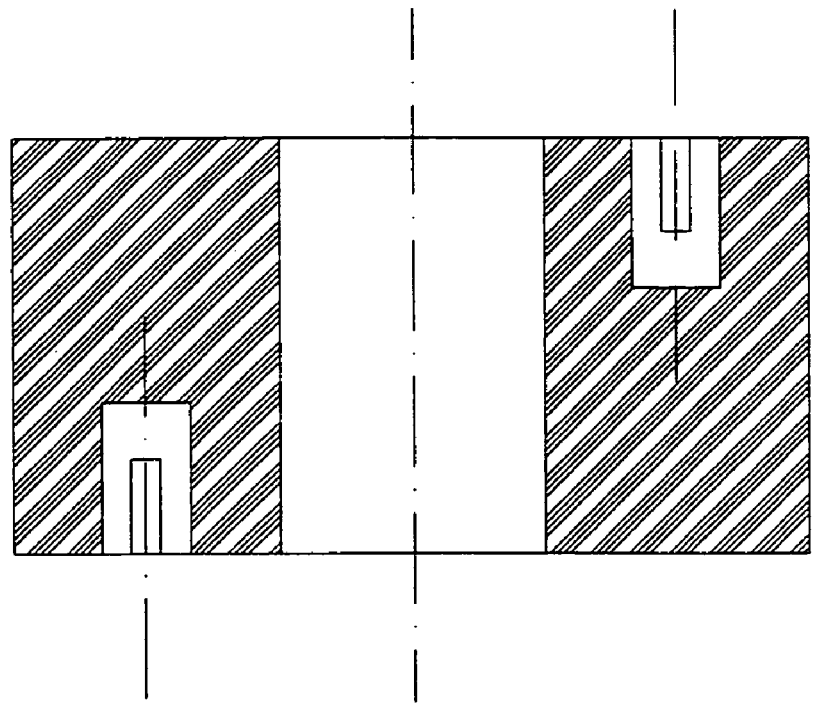

FIG. 40b is a cross sectional view of the sensing element of FIG. 40a.

Figure 41:
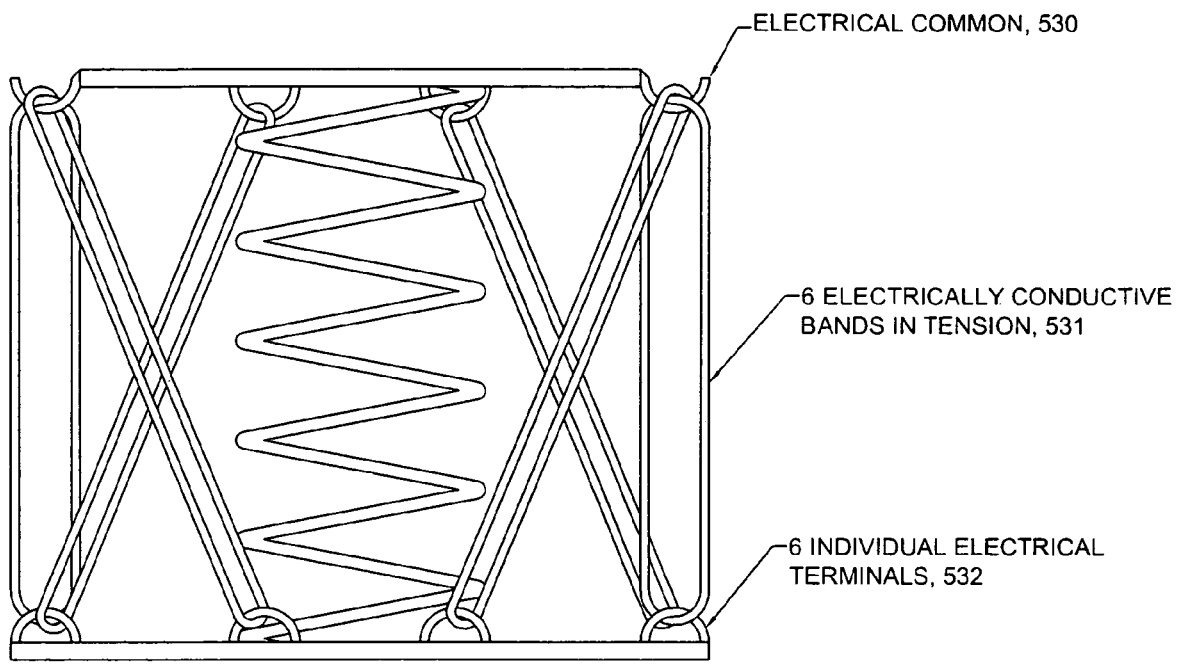

FIG. 41 is an elevation view of an embodiment of the present invention that incorporates a plurality of electrically conductive elastomeric tensile members.

Figure 42:
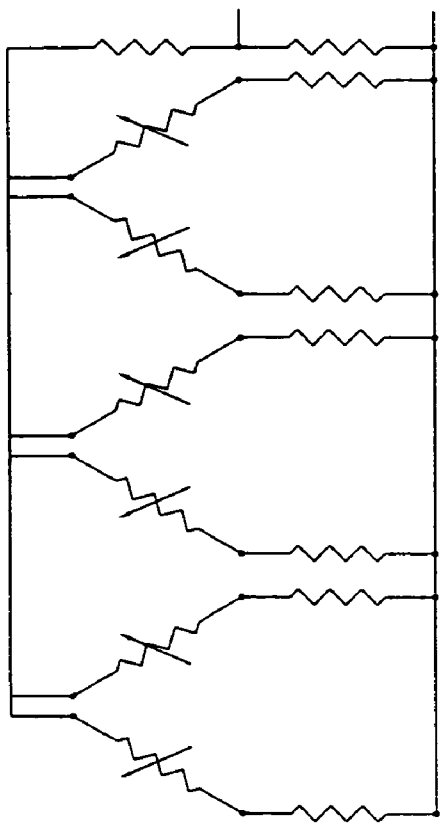

FIG. 42 is a representative electrical schematic of one embodiment of the present invention.

Figure 43:
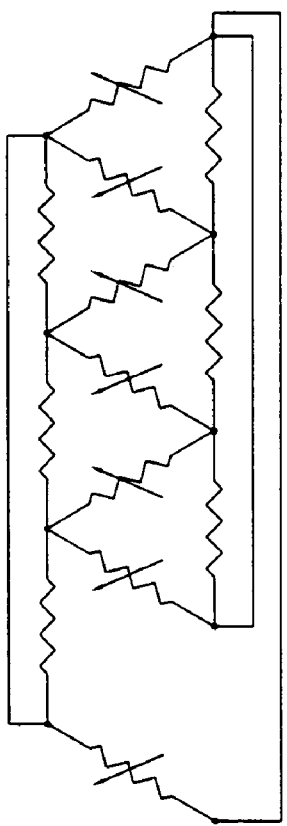

FIG. 43 is a representative electrical schematic of another embodiment of the present invention.

Figure 44:
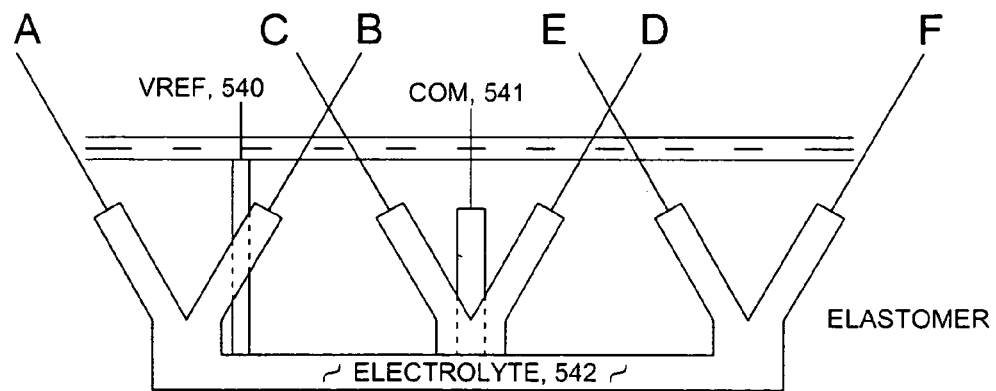

FIG. 44 is a schematic of an electrolyte filled cavity of Stewart Platform geometry within a deformable elastomeric sensing element in accordance with one embodiment of the present invention.

Figure 45:
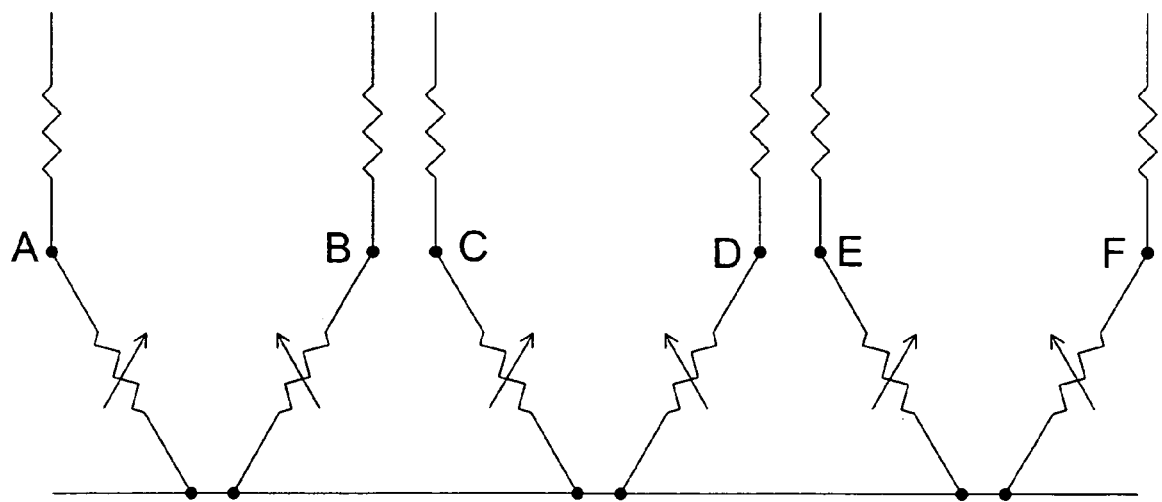

FIG. 45 is an electrical schematic corresponding to the embodiment of FIG. 45.

Figure 46:
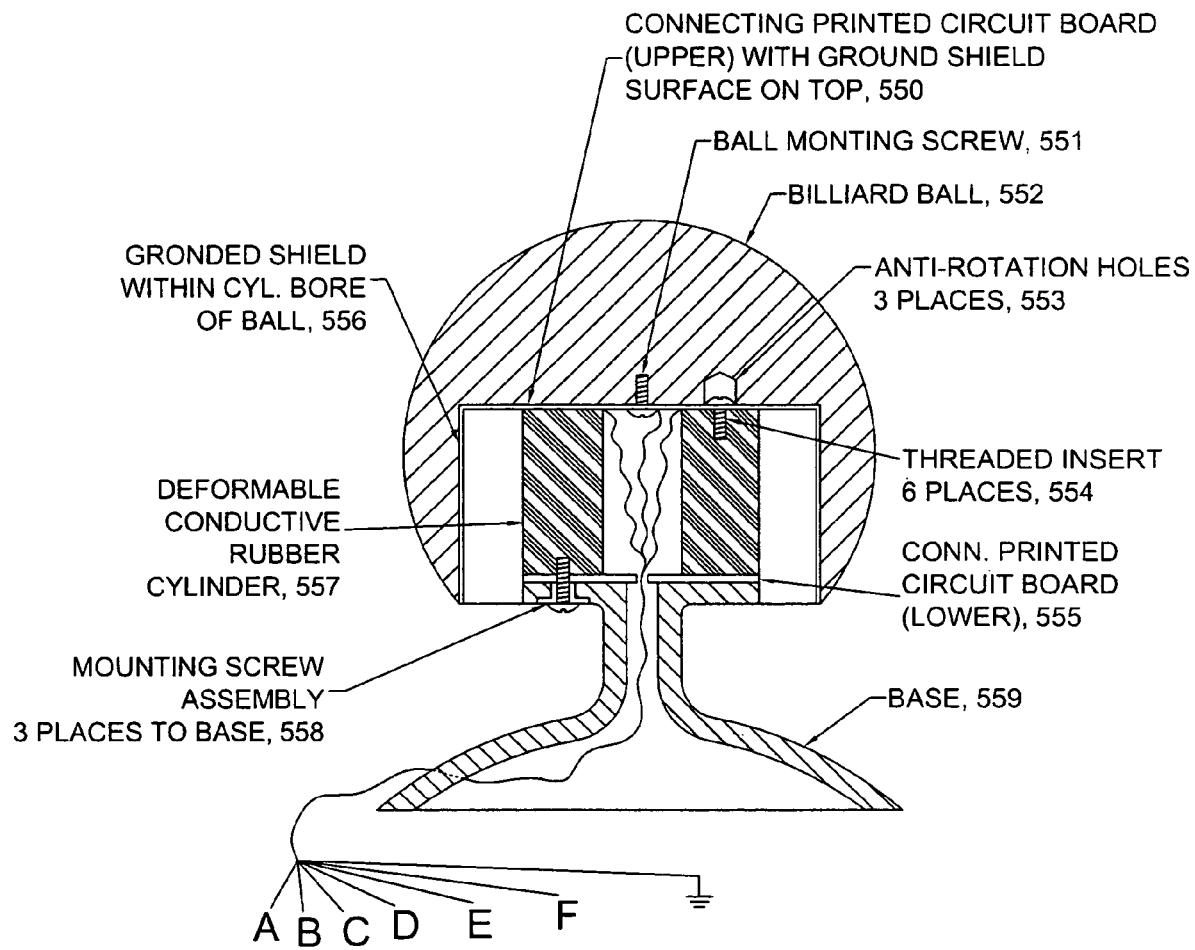

FIG. 46 is a cross section of one embodiment of the present invention.

Figure 47:
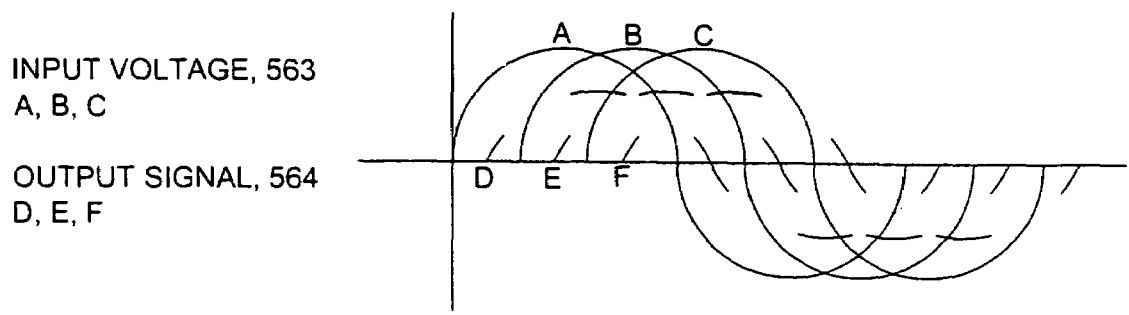

FIG. 47 is an illustration of one exemplary relationship between a three phase excitation signal and an output signal from one embodiment of the present invention.

Figure 48:
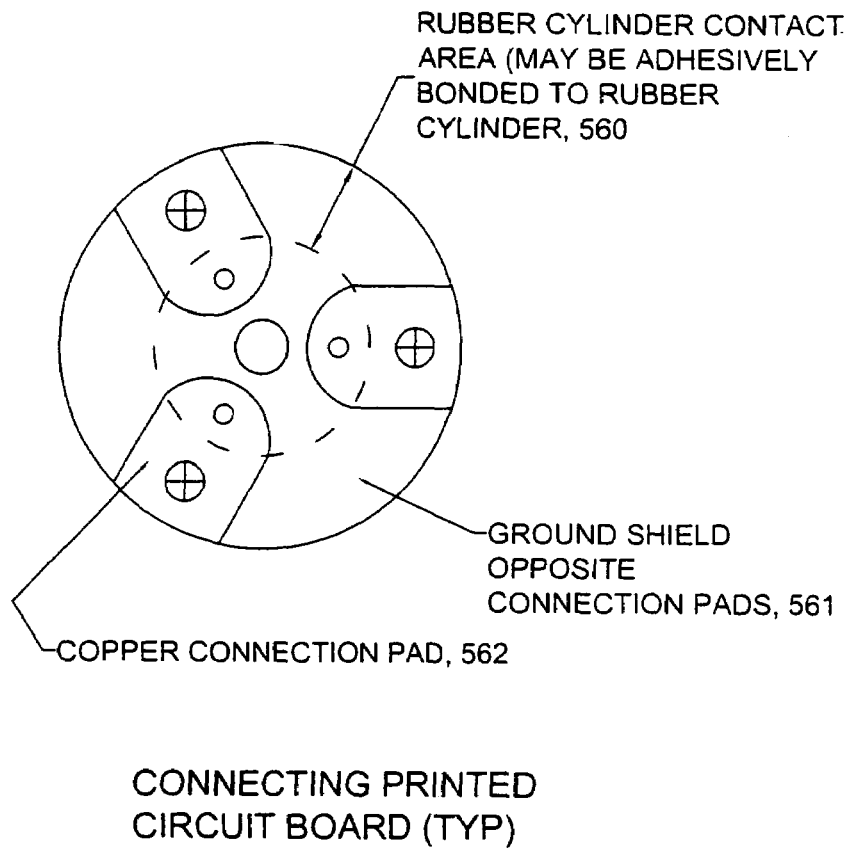

FIG. 48 is a view of a printed circuit board arrangement which might be used in conjunction with the embodiment of FIG. 46.

FIG. 49a is a plan view of one embodiment of the present invention wherein a base portion of a six axis joystick is stabilized by a gel pad wrist rest.

FIG. 49b is a sectional elevation view of the embodiment shown in FIG. 49a.

Figure 49C:
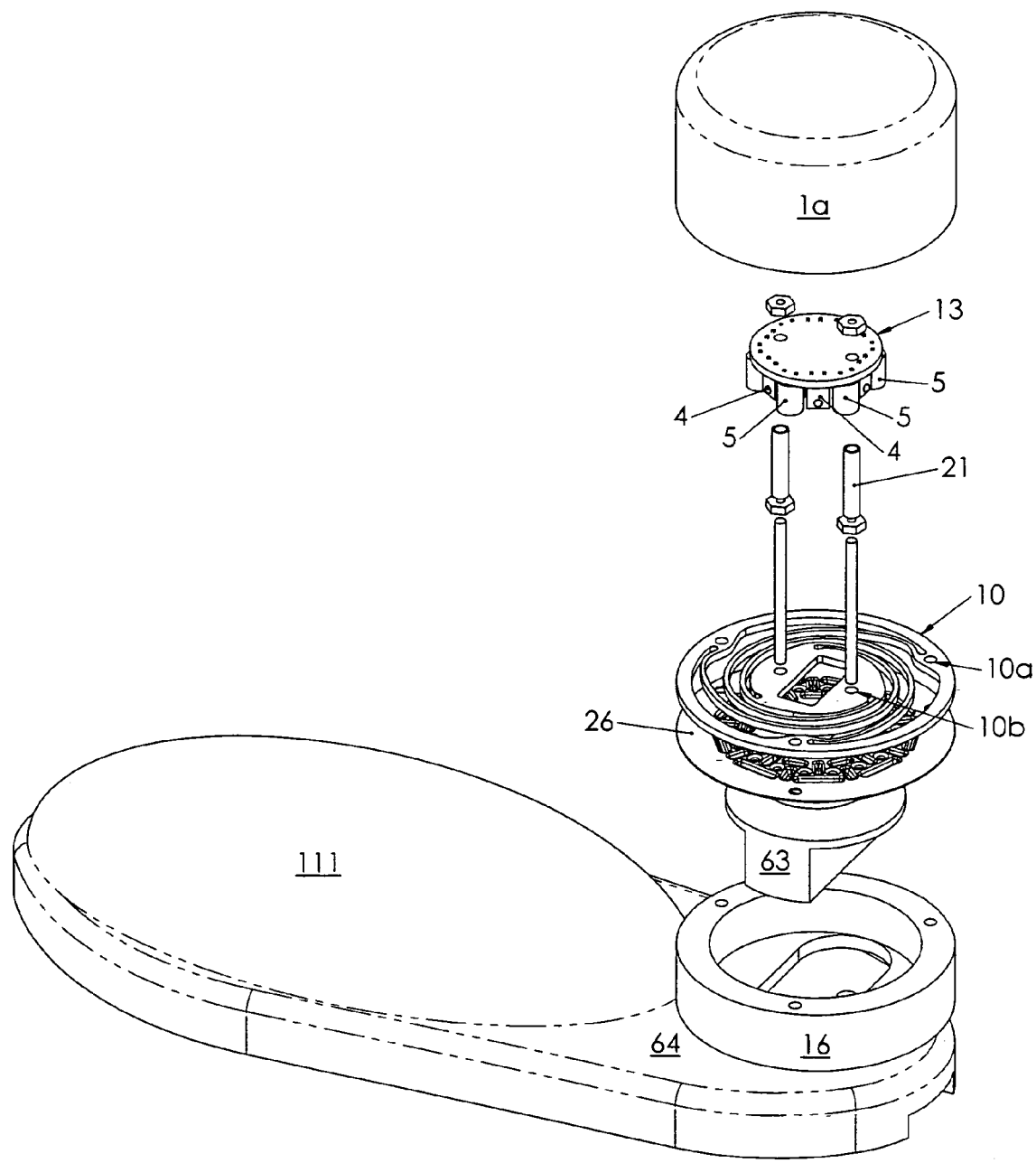

FIG. 49c is an exploded view of the embodiment shown in FIG. 49a.

Figure 49D:
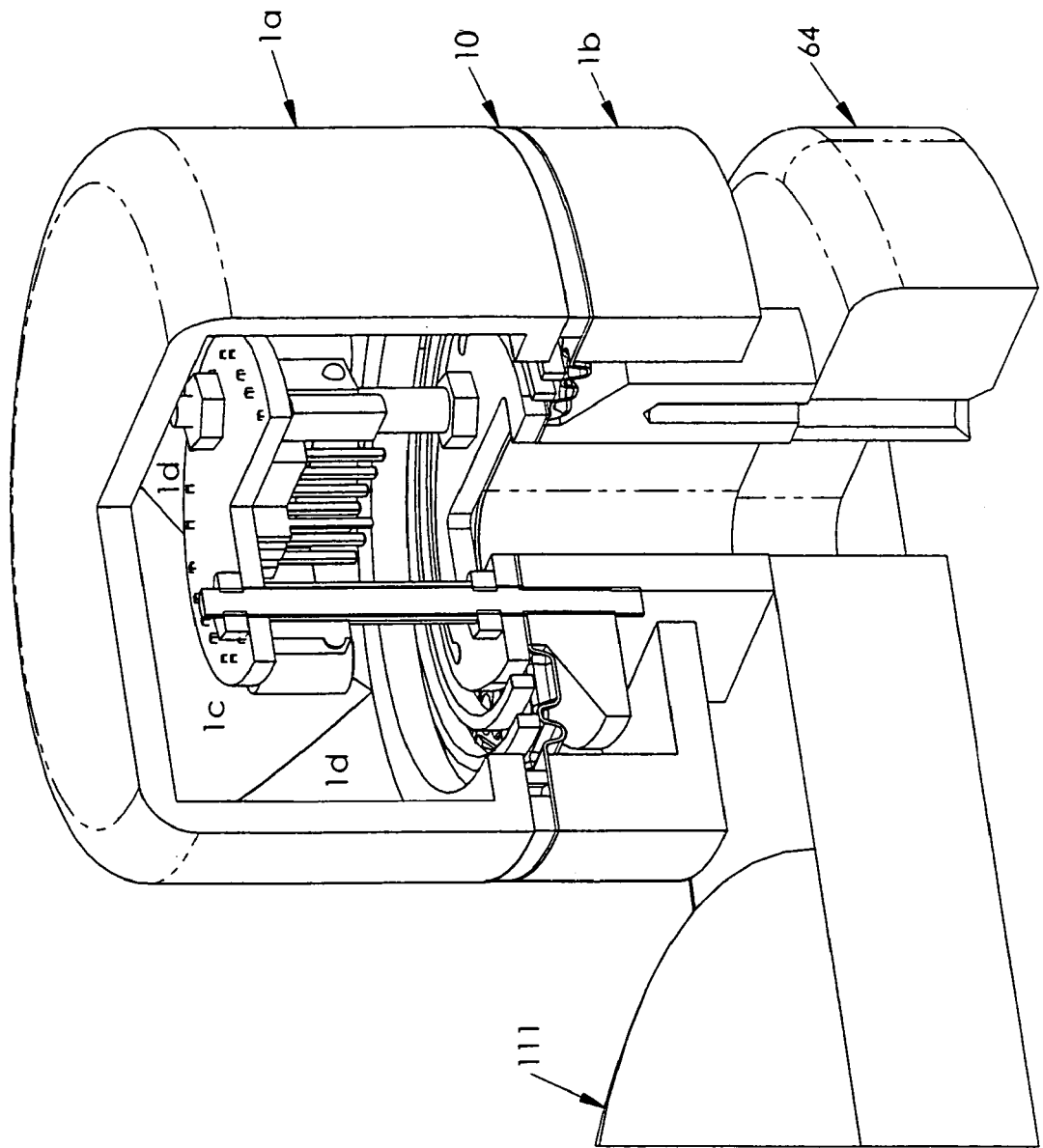

FIG. 49d is a perspective view of a portion of FIG. 49a.

FIG. 50a is a cutaway view of one embodiment of the present invention featuring a monolithic optical position transducer.

FIG. 50b is an exploded view of the embodiment of FIG. 50a.

Figure 50C:
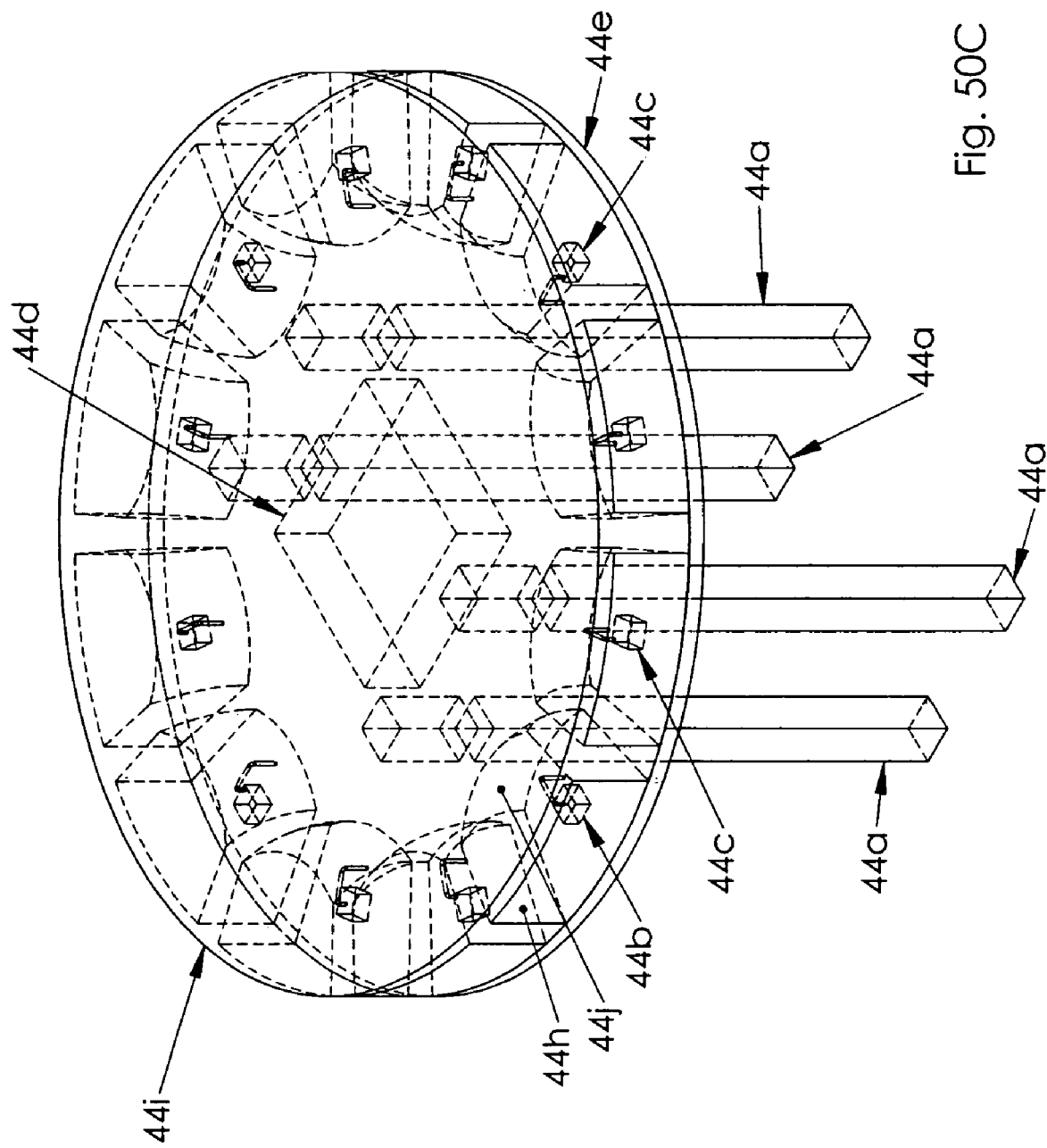

FIG. 50c is a perspective view of the monolithic position transducer from FIG. 50b.

Figure 51A:
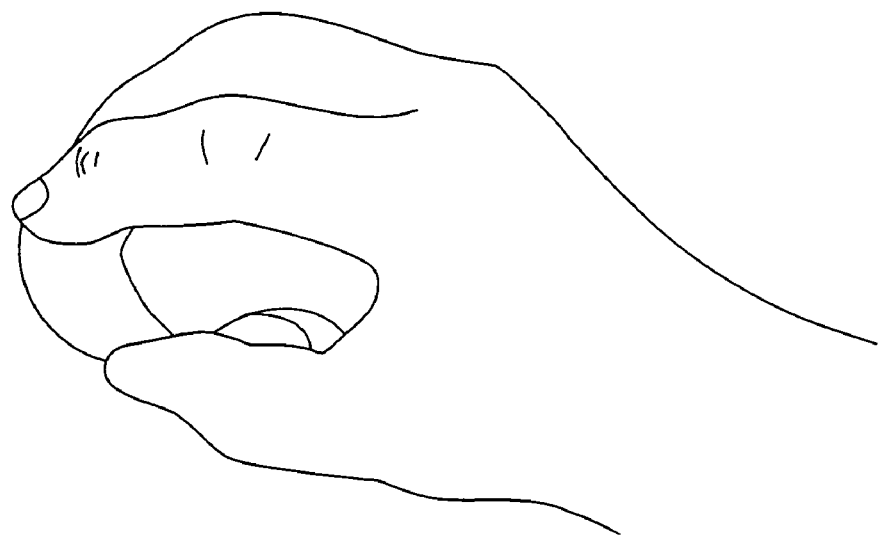

FIG. 51a is a perspective view of a finger operable joystick appended to a three axis mouse.

Figure 51B:
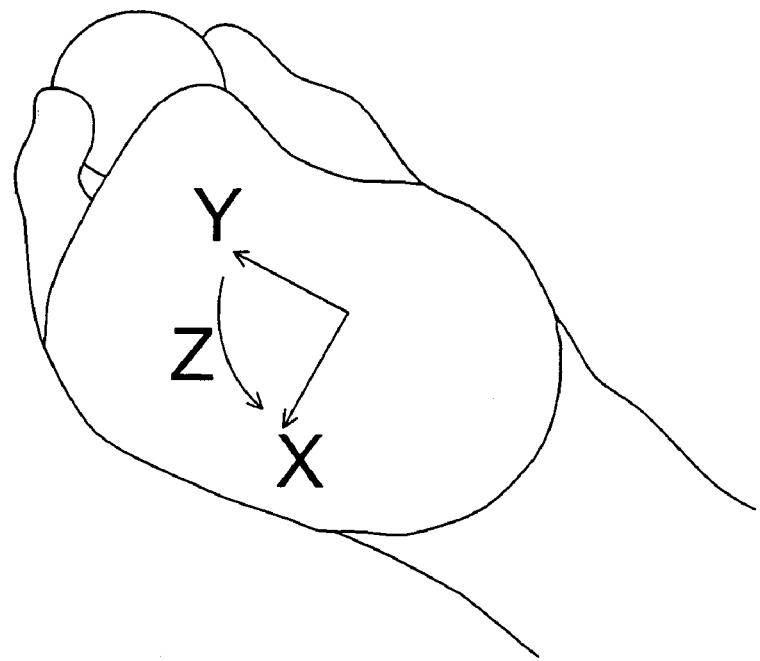
Figure 51C:
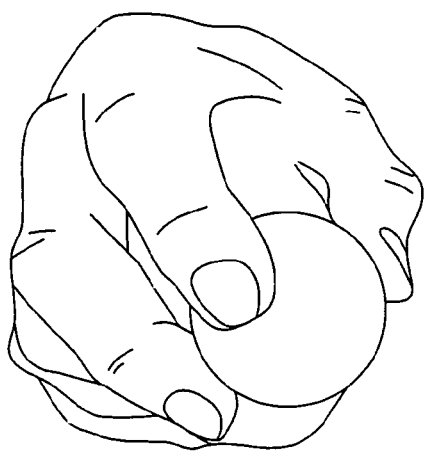
Figure 51D:
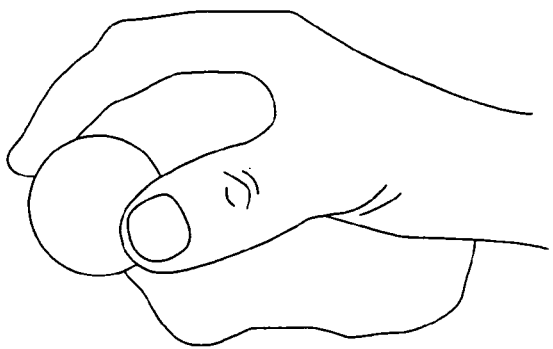
Figure 51E:
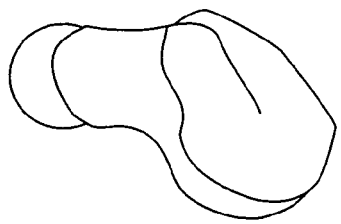
Figure 51F:
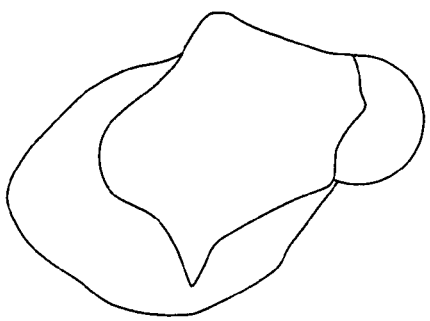
Figure 51G:
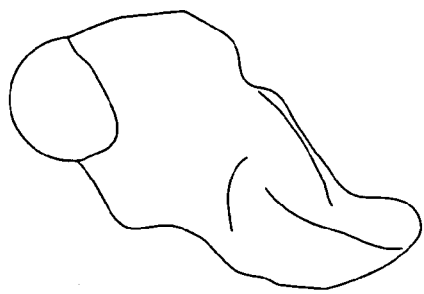

FIG. 51b is a bottom view of the embodiment of FIG. 51a.
FIG. 51c is an end view of the embodiment of FIG. 51a.
FIG. 51d is a side view of the embodiment of FIG. 51a.
FIG. 51e is a top view of the embodiment of FIG. 51a.
FIG. 51f and FIG. 51g are perspective views of the embodiment of FIG. 51a.

Figure 52:
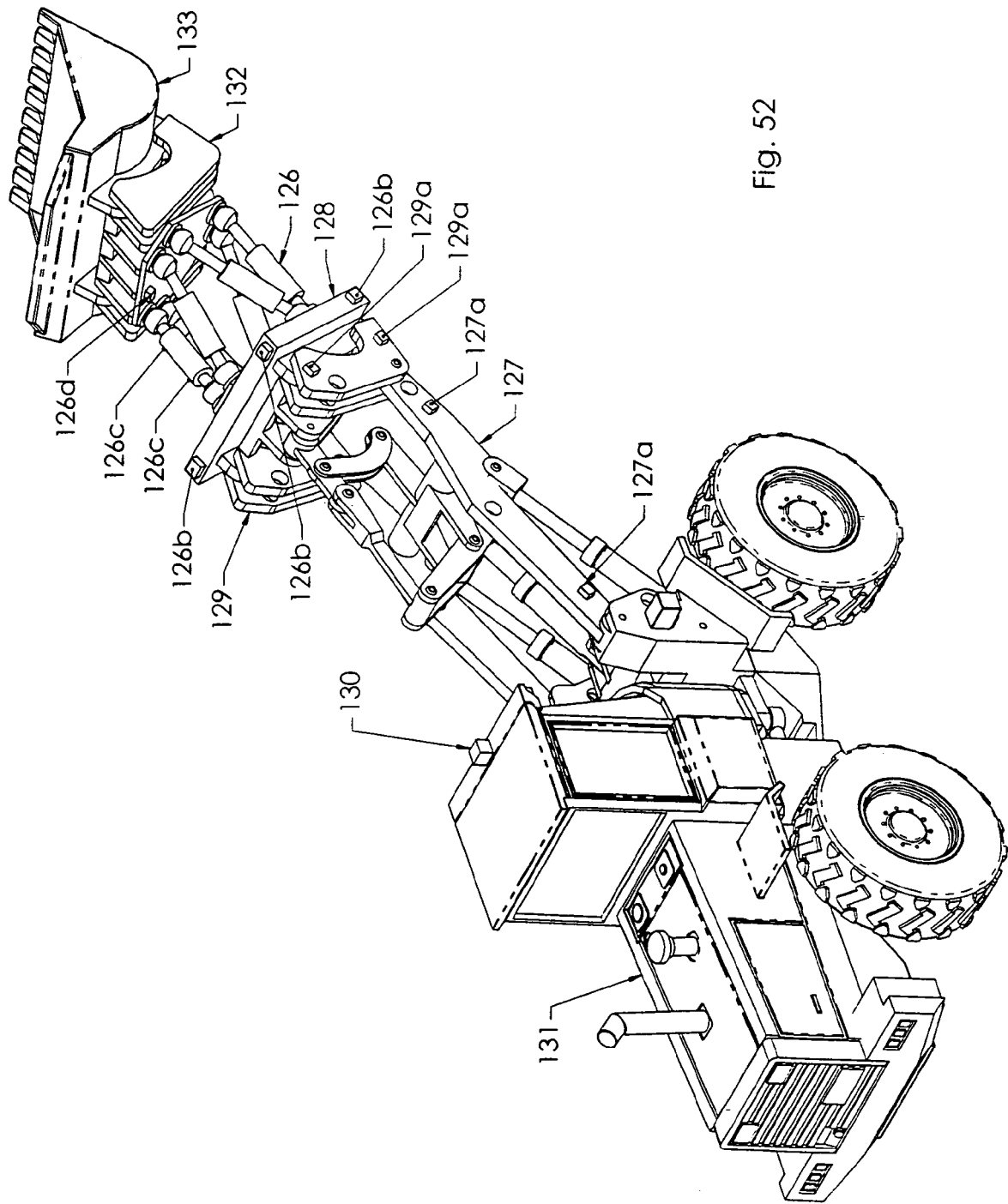

FIG. 52 is a perspective view of an embodiment of the present invention including a loader equipped with sensors to facilitate coordinate transformation for control of a stewart platform adaptor using a joystick.

Figure 53:
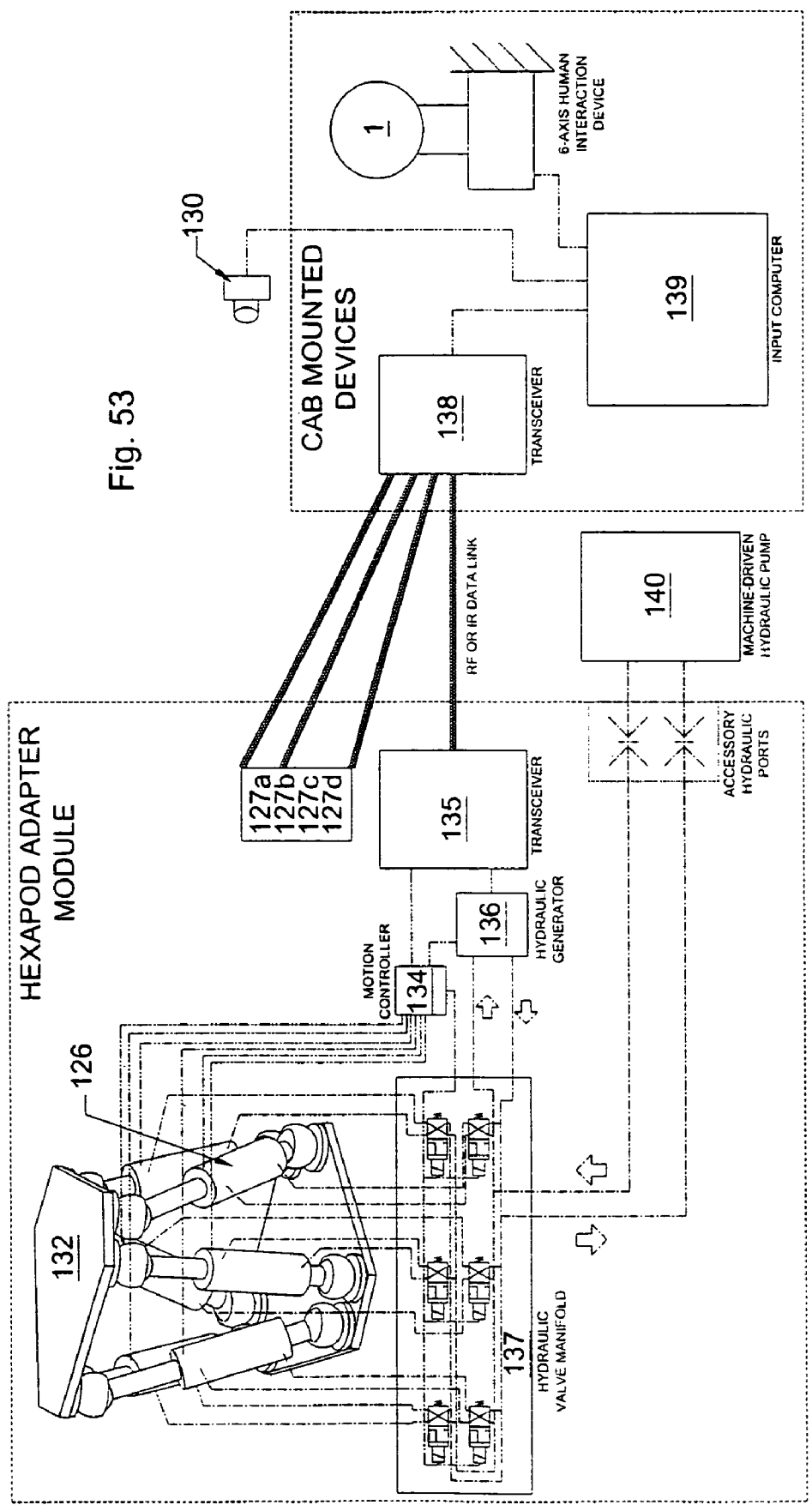

FIG. 53 is a schematic diagram of an example control scheme for the embodiment of FIG. 52.

Figure 54A:
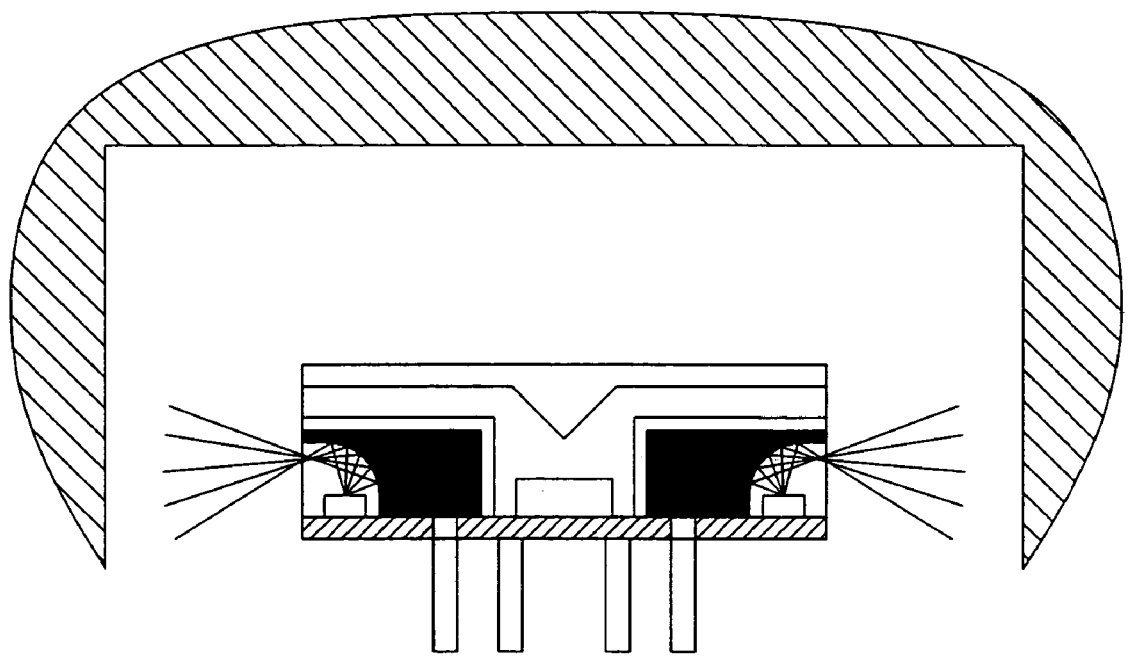
Figure 54B:
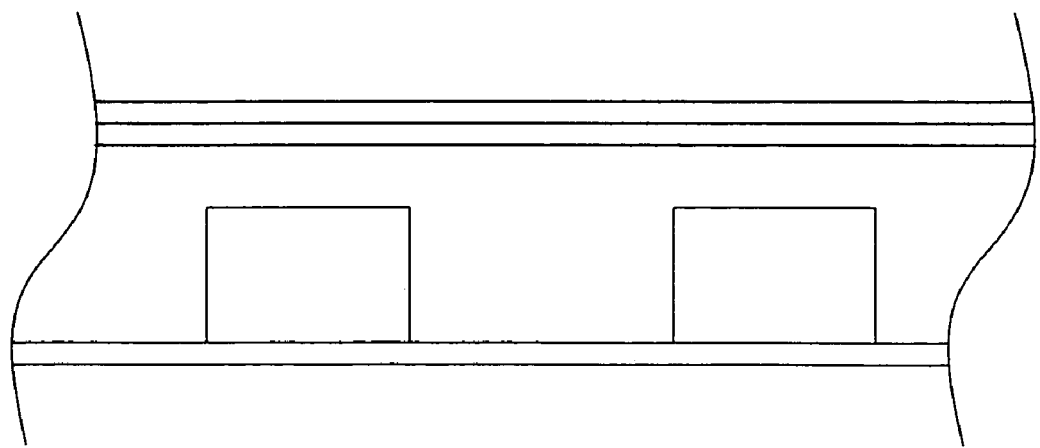

FIG. 54a is a cross section of a monolithic transducer.
FIG. 54b is a partial edge view of the embodiment of FIG. 54a.

Figure 55:
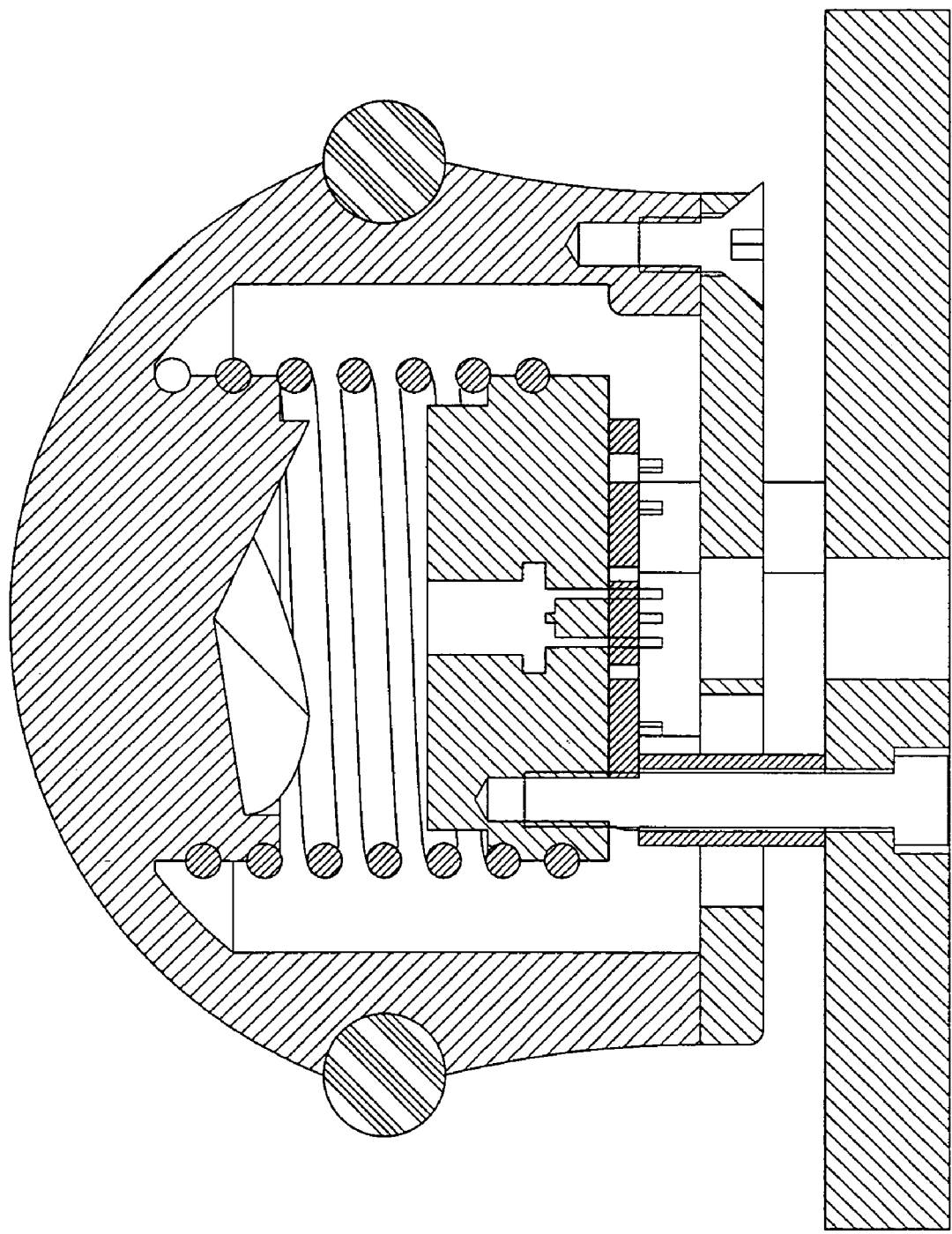

FIG. 55 is a sectional elevation of a joystick in accordance with one aspect of this invention.

Figure 56A:
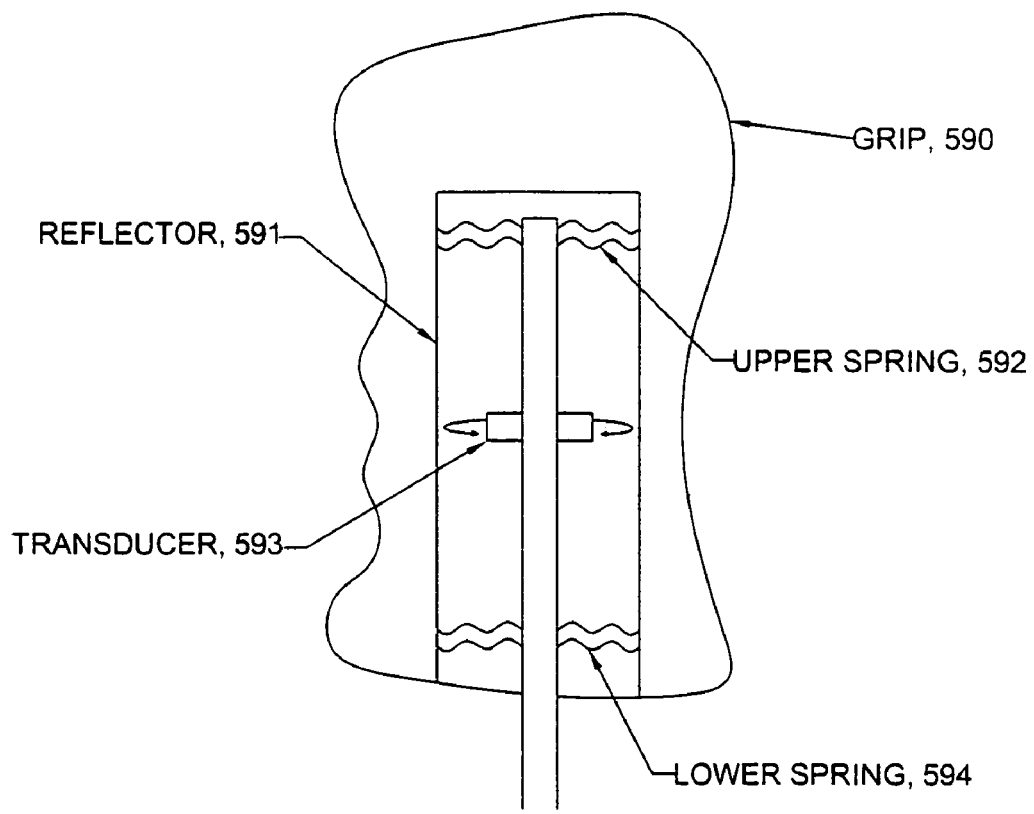

FIG. 56a is a cross section of a joystick in accordance with one embodiment of this invention including two coaxial springs placed symmetrically with respect to the transducing element.

Figure 56B:
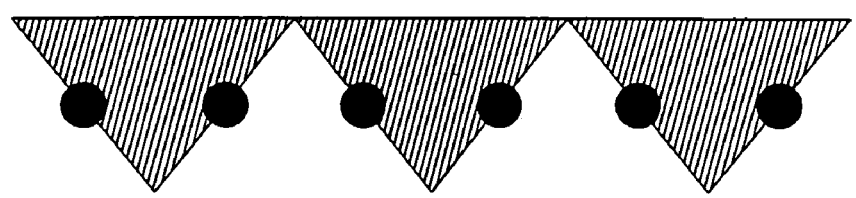
Figure 56C:
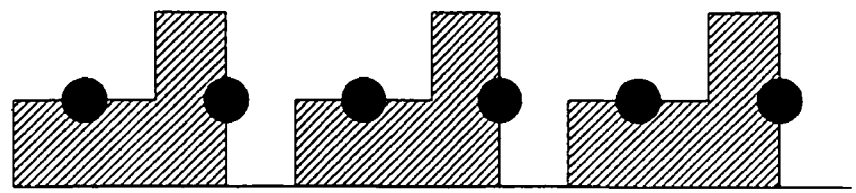

FIG. 56b is an example reflective pattern.
FIG. 56c is an example reflective pattern.

Figure 57:
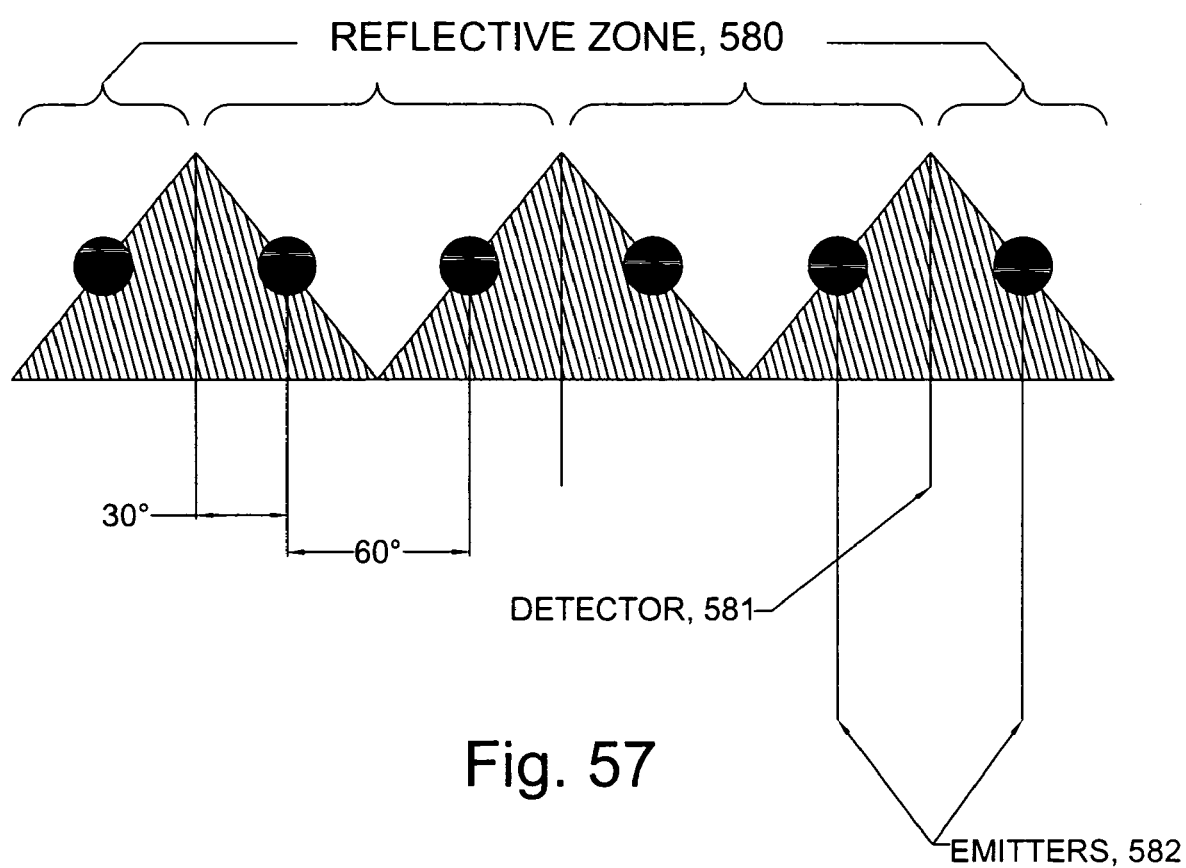

FIG. 57 is a schematic depicting an example null state angular and axial alignment of transducer and reflective pattern.

Figure 58:
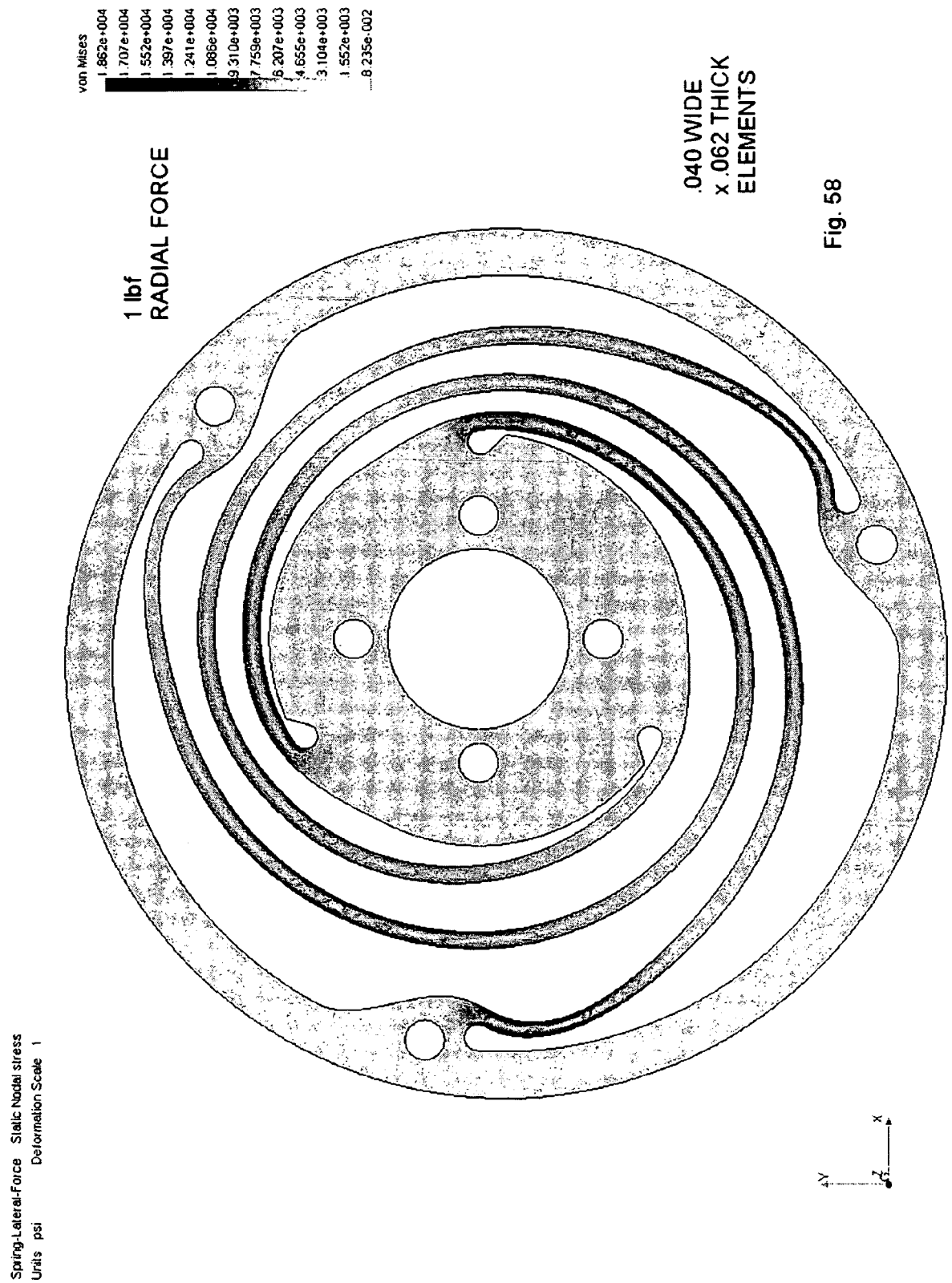

FIG. 58 is an example stress analyses of a spring used in one aspect of this invention.

Figure 59:
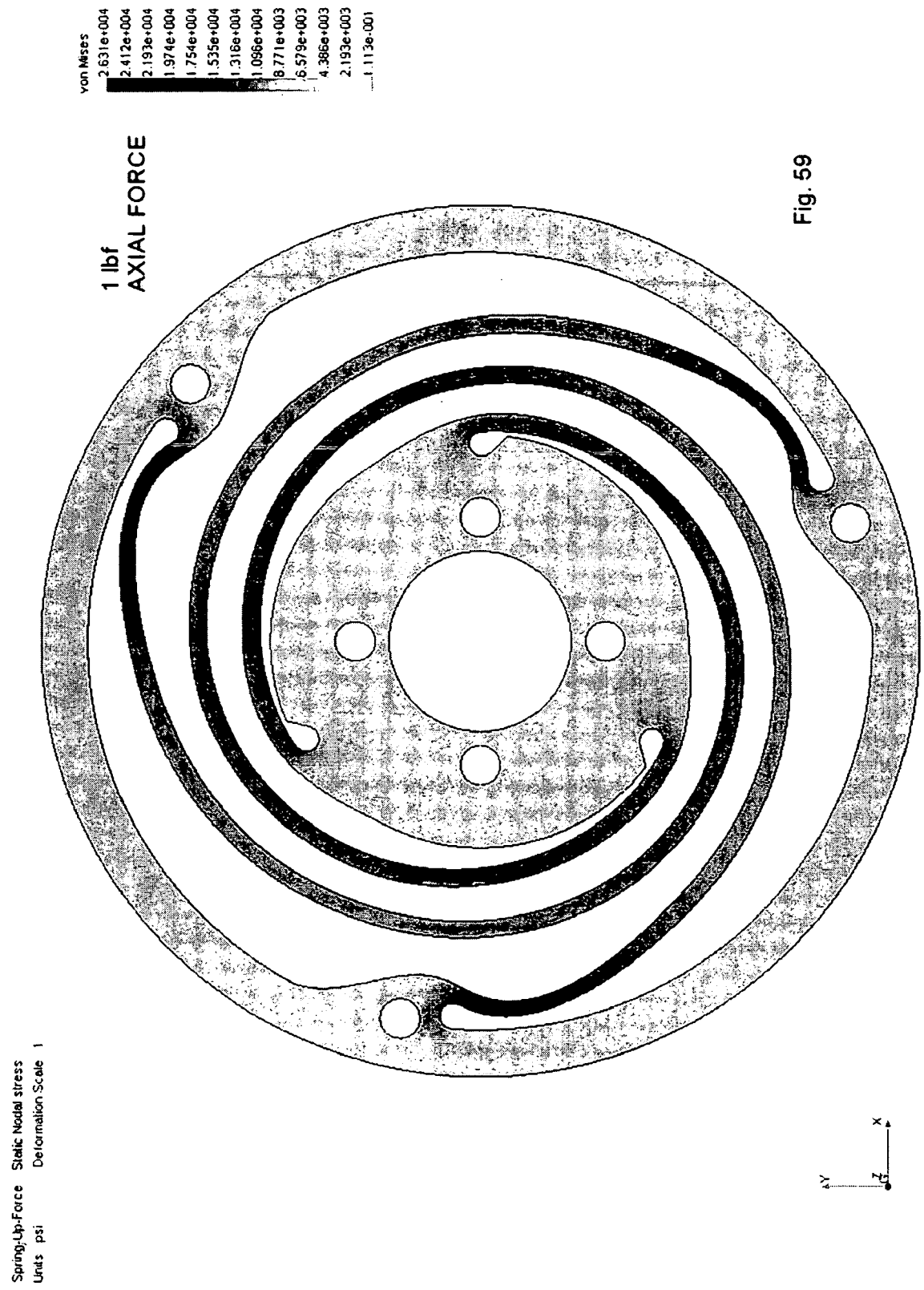

FIG. 59 is another example of a stress analyses of a spring used in one aspect of this invention.

Figure 60:
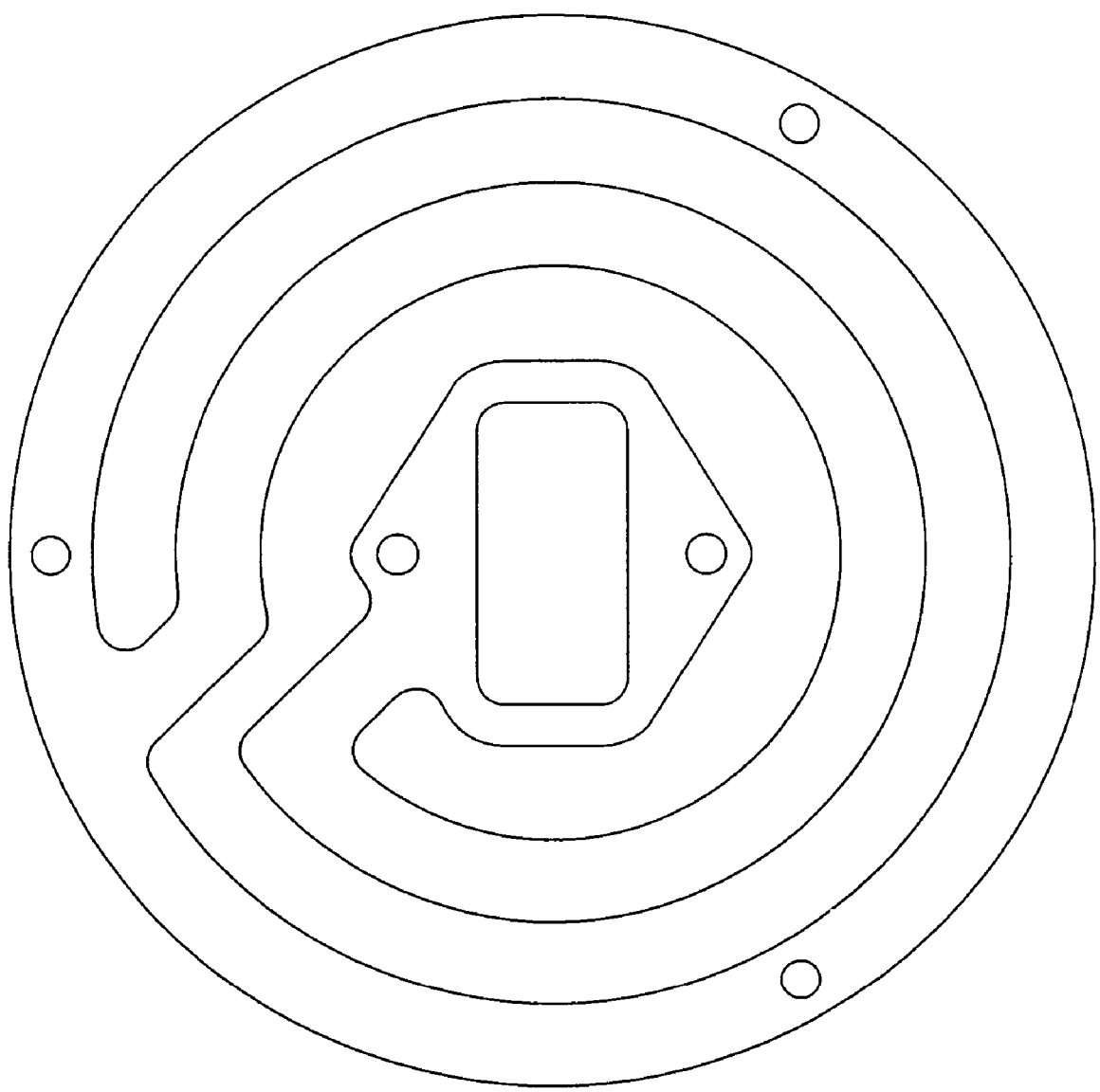

FIG. 60 is an example of a spring with a single elastic element in accordance with one aspect of this invention.

FIGS. 61a and 61b are simulated images incident on the transducer of one embodiment of this invention.

V. MODES FOR CARRYING OUT THE INVENTION

A multi-axis input transducer apparatus may comprise an at least quinary input element capable of input with respect to at least five frames of reference, a reflective element responsive to radiation from a source capable of emitting radiation eventually incident upon said reflective element and at least one reflected radiation detector responsive to radiation from said reflective element. The term reflection is used broadly to include refraction of said radiation. Referring to FIGS. 1a (plan view), 1b (sectional elevation view), 1c (cutaway perspective view), 1d (elevation view), and 1e (exploded view), a preferred embodiment of a six-axis joystick in accordance with the present invention is shown. Active grip 1 may incorporate reflective facets 2a, 2b, 2c, 2d, 2e, and 2f. Said reflective facets or reflector may be aligned such that each reflects the light from light source or radiation source 4 (which may be a light emitting diode) to a photo detection element or other reflected radiation sensor at one particular location. Said photo detection element may be photodiodes, phototransistors, photo resistors, or other suitable light detection means, or fiber optic ports leading to such detection means at another location such as on an ASIC (application specific integrated circuit chip). Active grip 1 may be held in position by a restoration element such as coil spring 10, which may be angularly located in the active grip by recess 11 and in the base 3 by recess 12. A means such as a light baffle 6 may be used to prevent direct illumination of detector(s) 5a, 5b, 5c, 5d, 5e and 5f by light source 4. Said light baffle 6 may also be configured to assist in locating and orienting said light source 4 and perhaps photo detectors 5a, 5b, 5c, 5d, 5e and 5f during soldering, for example. Said baffle 6 may be used to retain printed circuit board 13 by means of screws 7. Some retaining means such as screws 8 or pins may be provided to limit the travel of the active grip perhaps so that maximum travel of active grip 1 remains within the measurement range of the optical elements such as photo detectors 5a, 5b, 5c, 5d, 5e, and 5f in conjunction with reflector element(s) within active grip 1 and light source 4, and perhaps so that said maximum travel remains within the elastic range of restoring means such as spring 10, and within the various mechanical clearances between the movable and stationary components. The contact characteristics between said retaining means 8 and associated receptacles 9 may be optimized by friction reduction element and/or energy absorption element such as coatings or bushings.

Referring to FIGS. 1a and 1d, light paths 14 may no not lie in radial planes but instead may follow paths, which may be controlled, by the locations and orientations of the various mirror facets. By means of this arrangement, the lengths and alignments of the light path to the 6 photo detectors may uniquely define the position of the active grip in the x, y, z, Θx, Θy, and Θz degrees of freedom. In general the brightness may also vary as the inverse square of the effective light path distance. The sensitivity of brightness with respect to mirror facet position may be maximum for movements of any mirror facet along an axis normal to the surface of said mirror facet. Said axes normal to said mirror facets may comprise a virtual octahedral hexapod or "Stewart Platform". Movements along either axis normal to the said first axis may have no effect on light path length or brightness. Extreme movements could of course shift said mirror facet completely off of said light path, but such extreme movements are not required and may be, in fact, prevented by mechanical stops. Angular movements about an axis normal to said mirror facet may have no effect on said light path. Angular movements about any axis lying in the plane of said mirror segment may simply cause a lateral shift in the point of reflection of said light path with only negligible second order effects on light path distance.

Said effective light path distance corresponding to the null position of the active grip can be optimized as a design variable by means of lens elements associated with the light source, the photo detectors and/or by curvature of the reflective facets. For example, a virtual image of the light source may be created at a position closer than the distance corresponding to the physical light path in order to obtain a greater change in brightness for a given change in mirror facet movement. Spatial distribution of illumination by the light source and spatial distribution of light sensitivity of the light detectors may also be adjusted by the use of lens elements. The changes in alignment of the emitters, mirrors, and detectors may also be used advantageously to generate photo detector signals that represent the mirror facet positions. If any particular light path from an emitter straddles an edge of a mirror or the edge of a detector assembly, any relative movement of said light path and said edge may create a significant change in measured light intensity.

The aforementioned discussion of function and geometry may apply equally to an embodiment wherein a single photo detector, which could in said embodiment be designated as item 4 in the various FIG. 1 views, sequentially measures light intensity from a plurality of light emitters 5a, 5b, 5c, 5d, 5e, and 5f in the FIG. 1 views. In said embodiment said light emitters may be cycled in a circular pattern for example, to enable individual light intensities and thereby light path distances to be measured. The use of a single photo detector may facilitate the use of a single channel analog to digital converter which could be time multiplexed in synchronism with illumination of the plurality of light emitters.

Figure 3:
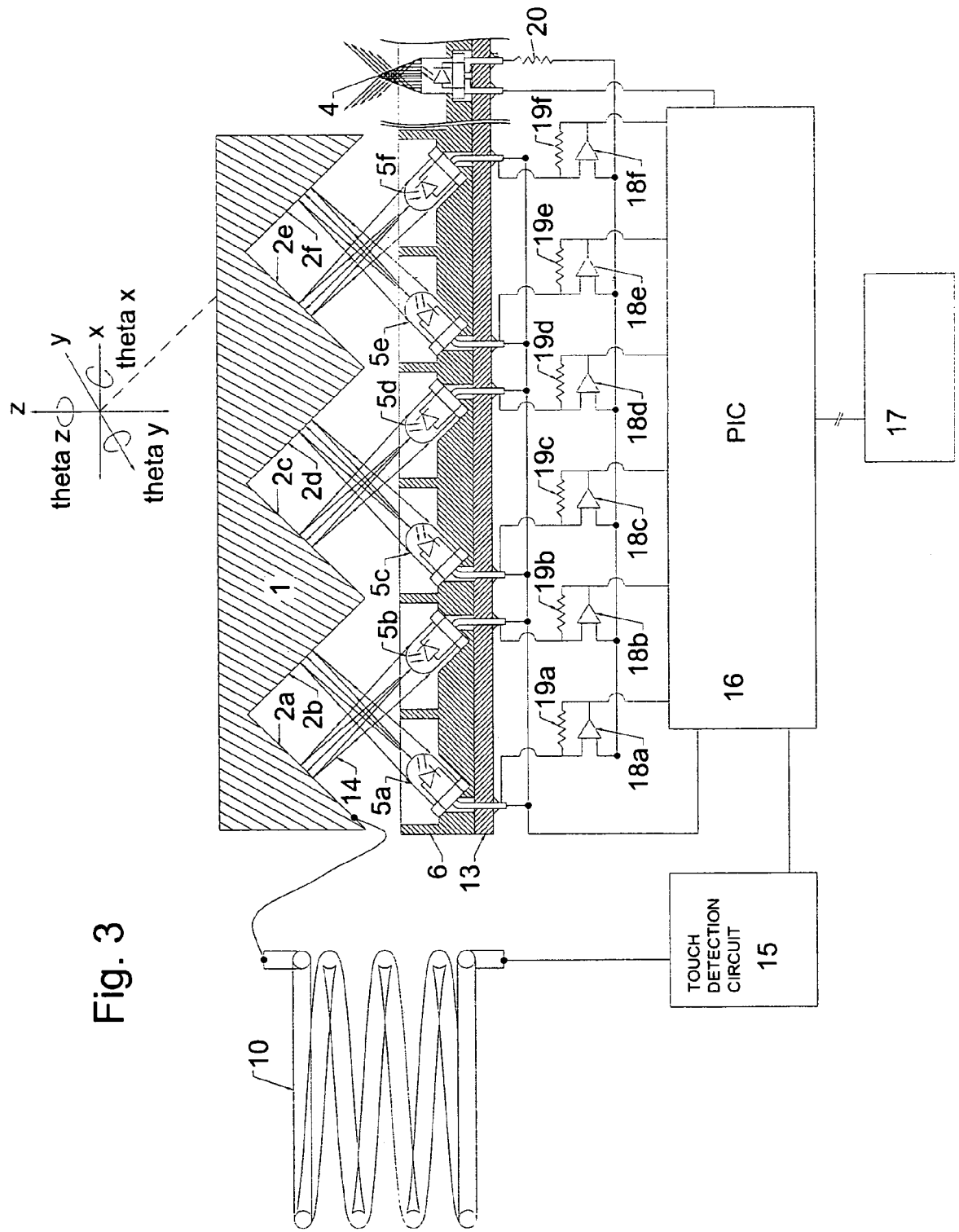
FIG. 3 is a schematic of a cylindrical projection of a six-axis joystick in accordance with the present invention in conjunction with one type of associated electrical schematic.

Referring to FIG. 3, a cylindrical projection schematic is shown in conjunction with a schematic of one of many alternative possible electrical arrangements. The optical elements depicted in FIG. 3 may be the same as those depicted in FIGS. 1a, 1b, 1c, 1d, and 1e. Photo detectors 5a, 5b, 5c, 5d, and 5e may be physically distributed as a hexagonal array around photo emitter 4, which is shown schematically on the right hand side of FIG. 3, but which may be located for schematic purposes directly behind each of said photo detectors. Mirror facet 2a may reflect light from photo emitter 4 onto photo detector 5b. Mirror facet 2b may reflect light from photo emitter 4 onto photo detector 5a. This pattern may be repeated for a total of six light paths, the lengths of which define the exact position and orientation of the active grip and its mirror facets in six degrees of freedom. Coil spring 10 (which physically supports active grip 1 shown schematically on the left hand side of FIG. 3) is shown electrically connected to grip 1 and touch detection circuit 15. Grip 1 may incorporate a separate capacitive touch switch element, if required, or may utilize the mirror coating such as that on mirror facet 2a to accomplish the capacitive touch switch function. "Active grip" is herein used to mean that portion of a multi-axial input device gripped and moved by the user relative to the user's frame of reference. The outputs of photo detectors 5a, 5b, 5c, 5d, 5e, and 5f are shown connected to amplifiers 18a, 18b, 18c, 18d, 18e and 18f and resistors 19a, 19b, 19c, 19d, 19e, and 19f. The output of said amplifiers is shown connected to a programmable interface controller (PIC®) 16 from which device the signal(s) may go to a signal-receiving device 17 such as a computer or robot. The axes of six degrees of freedom are labeled at the top of FIG. 3.

Figure 4:
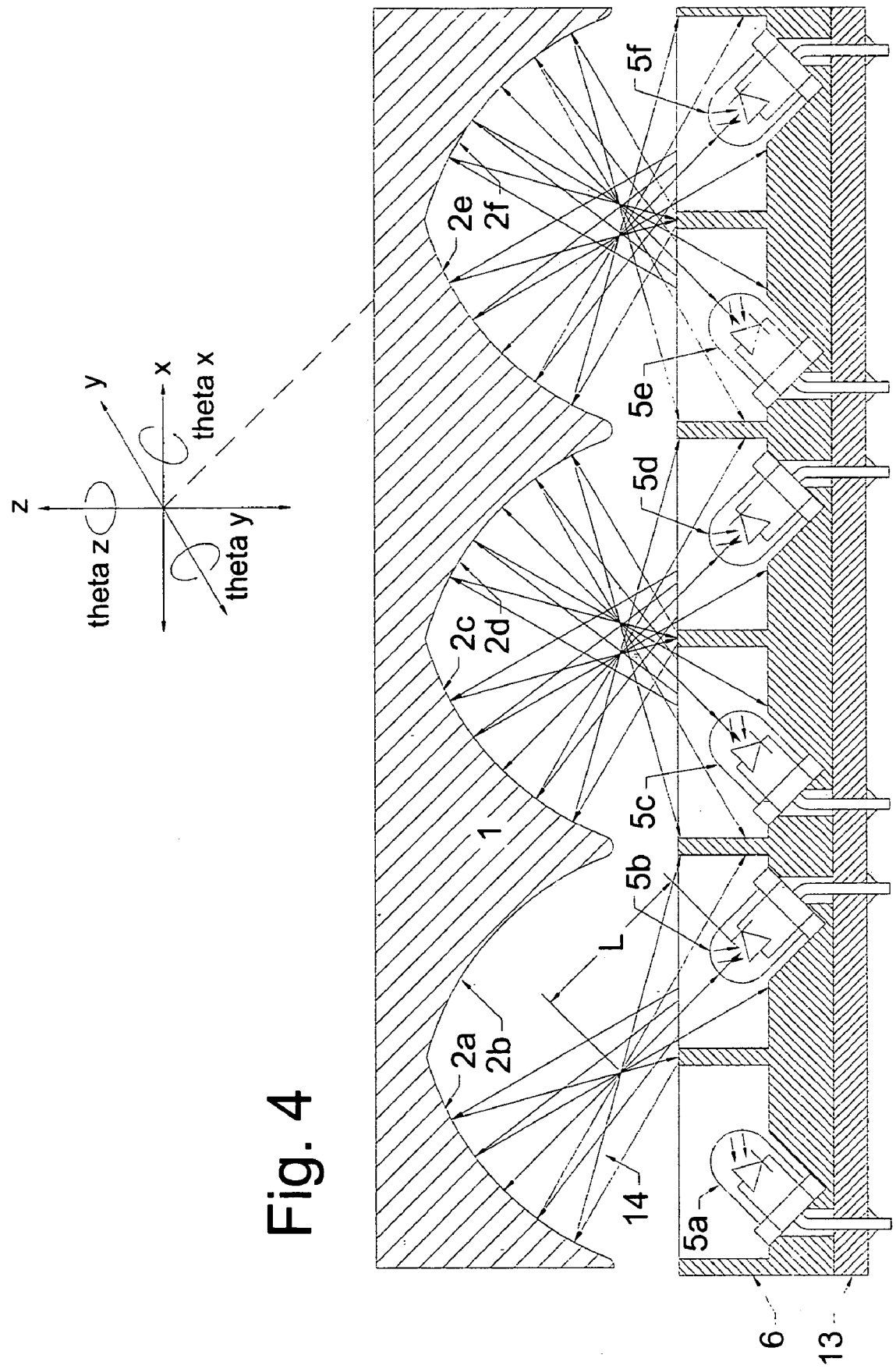
FIG. 4 is a schematic of a cylindrical projection of a six-axis joystick in accordance with the present invention with illustrating the function of curved mirror facets.

Referring now to FIG. 4, while flat mirror facets are depicted in the FIGS 1a, 1b, 1c, 1d, 1e, 2, and 3, the curved facets schematically illustrated in FIG. 4 may be used advantageously to obtain greater sensitivity and resolution for particular applications. Light 14 from emitter 4, which is hidden from direct view in FIG. 4, may be focused by mirror facet 2a to form an image of said emitter 4 at a distance L from photo detector 5b. For clarity, the light between emitter 4 and detector 5a is not shown in FIG. 4.

Figure 5:
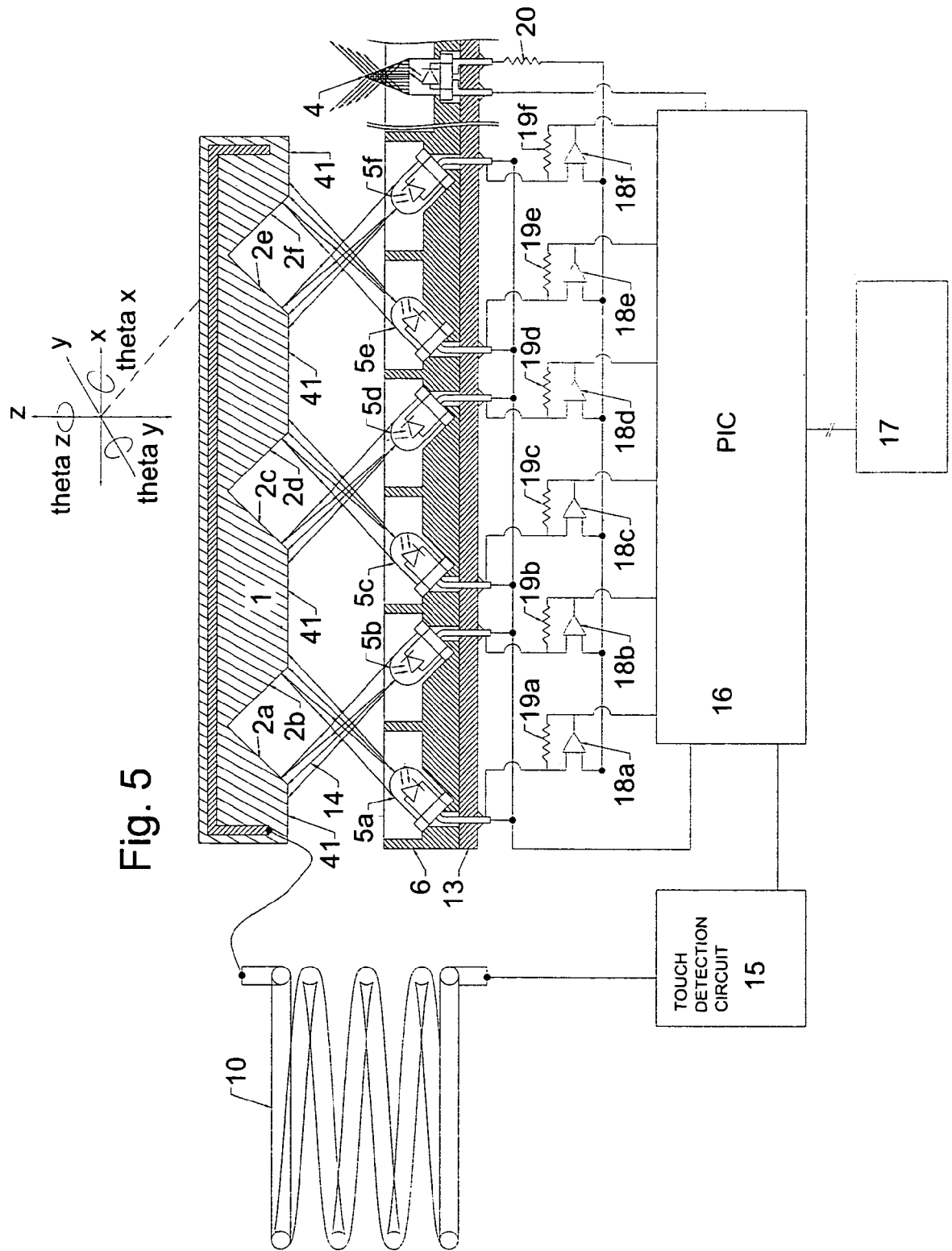
FIG. 5 is a schematic of a cylindrical projection of an embodiment of the present invention shown in conjunction with a corresponding electrical schematic illustrating the implementation of touch sensing means a nd truncated mirror facets.

Referring now to FIG. 5, mirror assembly and active grip 1 may incorporate truncated mirror facets 2a, 2b, 2c, 2d, 2e, and 2f. Light from emitter 4 may follow paths 14 which may impinge of the edges of mirror facets 2a, 2b, 2c, 2d, 2e, and 2f. That light which strikes said mirror facets may reach photo detectors 5a, 5b, 5c, 5d, 5e and 5f. That portion of light which strikes light absorbent surface 41 may not reach said detectors. This arrangement is thus sensitive to the relative movement of the edges of mirror facets 2a, 2b, 2c, 2d, 2e, and 2f.

Figure 6:
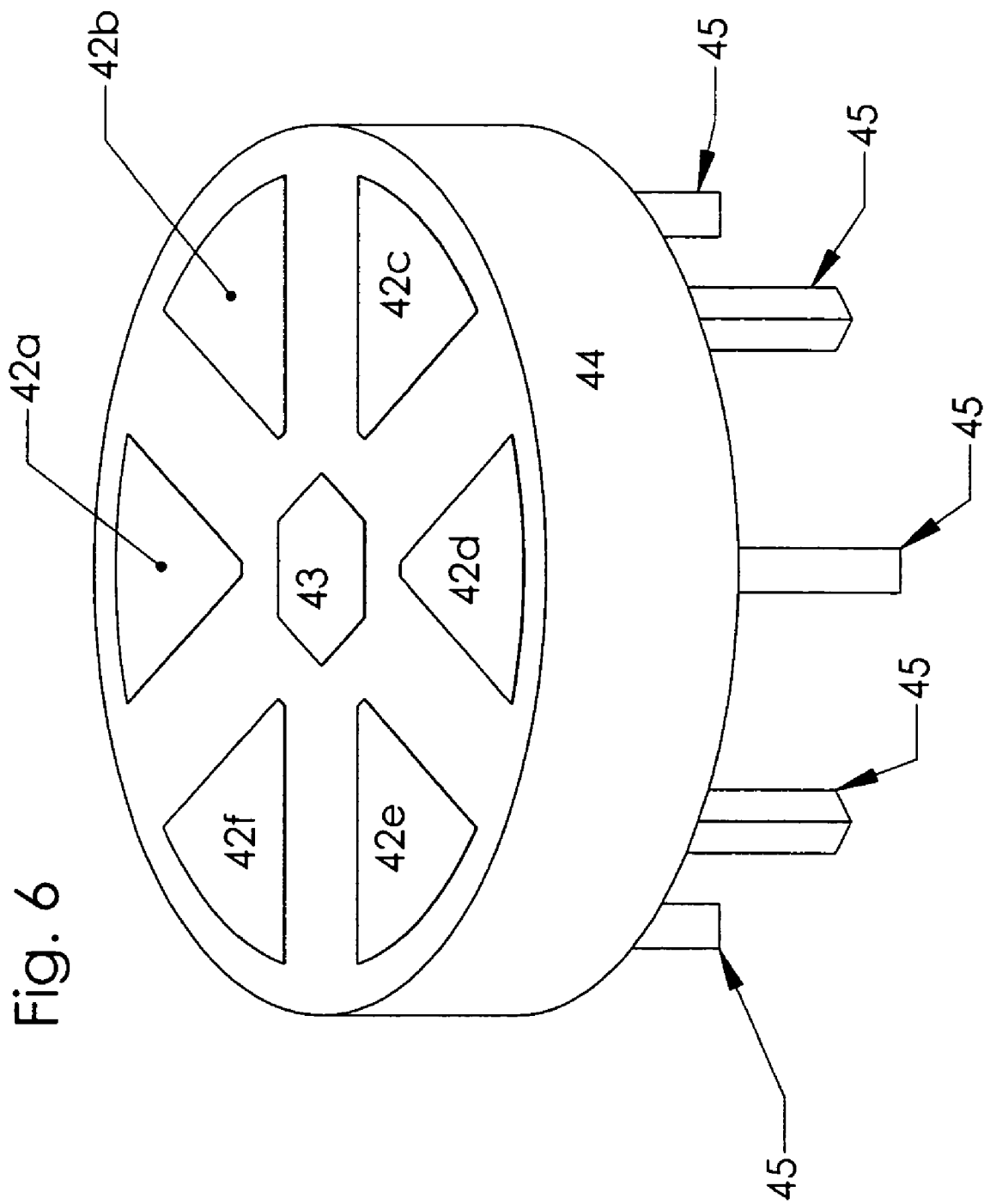
FIG. 6 is a perspective view of integrated photo emitter/photo detector package in accordance with one embodiment of the present invention.

Referring now to FIG. 6, a monolithic photo transducer package is shown comprised of casing 44, photo detectors 42a, 42b, 42c, 42d, 42e, and 42f, photo emitter 43, and electrical connection 45. Such a monolithic transducer may be more robust than printed circuit board mounted transducers and may thus not be subject to optical misalignment due to handling during manufacture or due to high g forces due to being dropped on the floor for example. The monolithic package may also be advantageously used to grind flush and thereby remove the collimating lenses that are standard as-manufactured features of many discrete photo transducer components. Although not depicted in FIG. 6, such a monolithic package may also be configured to retain a spring used to support the active grip.

Referring now to FIG. 7, detectors 46a, 46b, 46c, 46d, 46e, and 46f may be located such that light paths 14 straddle their edges. Any movement, due to movement of active grip 1, of light paths 14 normal to said edges may thus cause a change in brightness.

Referring to FIGS. 8a (plan view), 8b (sectional elevation view), 8c (cutaway perspective view), 8d (elevation view), and 8e (exploded view), a preferred embodiment of a six-axis joystick in accordance with the present invention is shown. Active grip portion 1a, also shown by itself in FIG. 9, may incorporate reflective facets 2a, 2b, 2c, 2d, 2e, and 2f. Active grip portion 1c may retain active grip portion 1b which has preferably a low durometer (<40 Shore A hardness) elastomer. Such a soft grip portion 1a may provide a non-slip surface which may be reliably engaged by the operator's fingertips with minimal gripping force. The compliance of the grip due to its low hardness in combination with significant thickness may reduce contact stresses on the operator's fingers and thus may help prevent reduction in blood circulation. Said grip portion 1b may be a standard O-ring shape. Grip portion 1c may feature holes in bottom portion. The outer holes may provide a predetermined amount of clearance to stand off spacers 21. The relative diameters of holes 22 (taking into account grommets if used) and spacers 21 may define the range of motion in a horizontal plane of the active grip. Vertical clearances between grip portion 1c and base 3 and between grip portion 1c and circuit board 13 may provide a predetermined amount of vertical travel. The active grip assembly comprised of portions 1a, 1b, and 1c may be thus confined to a predetermined allowable extent of travel in six degrees of freedom. Active grip portion 1a may be fixed to spring 10 by spring retaining grooves 47 in active grip portion 1a. Spring 10 may in turn be fixed to monolithic transducer package 21 by groove 48. Said monolithic transducer package 21 may incorporate a circuit board 13 which may extend outward radially to engage spacers 21 and screws 23. Alternatively, an additional separate piece may be used for mounting transducer package 21 and engaging some mounting means such as spacers 21 and screws 23.

Referring now to FIGS. 10a and 10b, an embodiment of the present invention featuring a traditional "joystick" style active grip, an enhanced range of motion, and protective and pressure compensating bellows is shown in cross section. Transducer 25 may be similar to that described in FIGS. 8a, 8b, 8c, 8d, and 8e. Said transducer may necessarily have a limited range of motion especially if it is to be contained within active grip 24. The arrangement shown is intended to provide additional range of translational motion along three axes as follows: Leaf springs 29 and 30 are fixedly mounted to mounting block 28. Connection block 35, which may be nominally the same height as mounting block 28, can be deflected upward and downward along the Z-axis without motion about the Θx axis. Mounting block 36 may be attached to a plurality of beams 31, 32, 33, and 34 that may be in turn attached to connection block 35. Moments of inertia about the Z-axis for beams 31, 32, 33, and 34 are selected to provide a predetermined degree of stiffness in torsion about the Z-axis. The spacing of beams 31, 32, 33, and 34 may be nominally the same at both connection block 35 and at mounting block 36. Horizontal deflections of mounting block 36 may not therefore cause twisting of the active grip about the Θx or Θy axes. The nominal equal spacings of the flexible elements at the various mounting points may be adjusted to achieve controlled amounts of coupling, if desired, of the various rotational and translational axes. Bellows 26 may be similar to that used on conventional joysticks except that it may be provided extra pleats to provide compliance about the Θz axis. Bellows 27 may compensate for air volume changes in housing 37 due to Z-axis movements of bellows 26. Bellows 27 may be preferably attached to mounting block 35 so that the movement of bellows 27 is directly hand powered and said bellows 27 therefore does not lag behind until a sufficient air pressure differential might cause a sudden movement of said bellows 27, which might in turn cause an unintended sudden movement of bellows 26 and therefore of transducer assembly 25, which could thus cause spurious signals. The small size of transducer assembly 25 may facilitate the use of a grip 24 that is small enough to allow reliable gripping even while the operator's thumb and forefinger are used to actuate typical game-style joystick buttons or triggers.

Referring to FIGS. 11a, 11b, 11c and 11d Permanent magnet 53 may be held between (magnetic) spring grip 56 and (magnetic) pole piece 52 by (non-magnetic) stud 55 and nut 54. The lower end of (non-magnetic) spring 10 may be fixed to (non-magnetic) spring platform 51, which may be shaped to engage said spring 10. Three (non-magnetic) spacers 21 position (non-magnetic) spring platform 51 above magnetic pole piece 52 and printed circuit board 13. Six magnetic flux sensors such as Hall Effect sensors 50a, 50b, 50c, 50d, 50e, and 50f may be fixed to printed circuit 13 and located such that displacement of the spring suspended assembly comprised of magnetic grip 1, spring grip 56, stud 55, nut 54, and pole piece 52 along any translational axis or about any rotational axis may produce a unique output signal from the combined set of magnetic flux sensors 50a, 50b, 50c, 50d, 50e, and 50f. Pole piece 52 may feature three poles: 52a (located between magnetic flux sensors 50a and 50b), 52b (located between magnetic flux sensors 50e and 50f) and 52c (located between magnetic flux sensors 50c and 50d). Said poles, at the null position, are angularly, with respect to the Z-axis, located exactly between their respective magnetic flux sensors. In elevation view, each of said poles may be located above the plane defined by the position of the magnetically responsive elements within said magnetic flux sensors. In this manner the vector dot products of the local magnetic flux and the maximum sensitivity axis of each of said magnetic flux sensors may create a pattern of signals uniquely representing the position of said spring suspended assembly. The six vectors of maximum sensitivity (maximum change in signal of individual magnetic flux sensors versus change in position of the respective pole) may define a shape in space similar to a hexapod or Stewart Platform. Spacers 21 and pole piece 52 may be shaped to limit the travel of said spring mounted assembly in the horizontal plane or about the Z-axis. Downward movement (along the Z-axis) may be limited as the end of stud 55 engages printed circuit board 13. Upward movement of said spring mounted assembly may be limited as pole piece 52 engages spring platform 51. Each of the contacting surfaces of pole piece 52, spacers 21, circuit board 13 and spring platform 51 could, of course, be appropriately covered with non-abrading impact absorbing material. This might be accomplished, for example, by rubber coating of pole piece 52 and using a smooth acorn nut as nut 54 in conjunction with a nylon wear plate attached to the top of circuit board 13. A comfortable grip material such as a soft rubber sleeve could be applied to outside of grip 1. Each said magnetic flux sensor may be preferably an integrated circuit such as a type 3503 ratiometric, linear Hall-Effect sensor as manufactured by Allegro Microsystems, Inc. which type includes an amplifier to facilitate subsequent signal handling. Signal handling may be accomplished by any of numerous known methods such as by use of analog to digital conversion boards or programmable interface chips (PIC®) such as those manufactured by Microchip Corporation. Optionally, a de-Gaussing coil may be added to the assembly to reduce any undesirable prior magnetization.

Referring to FIG. 12, a plan view of the flux path is shown without a magnetic grip. Referring to FIG. 13, a plan view is shown indicating the magnetic flux path with a magnetic grip. Referring to FIG. 13*a*, the magnetic flux path 57 is shown in elevation view. The use of a return magnetic flux path through the grip may allow the flux to carry further from the pole pieces, resulting in better mechanical clearances, greater range of movement and better ergonomics.

Referring to FIG. 14, a circuit board 13 is shown with magnetic flux sensors 50*a*, 50*b*, 50*c*, 50*d*, 50*e* and 50*f*. Damping circuits 58 and 59 may be provided to serve a function similar to Amortisseur windings in rotating electric machines. Discrete resistors may optionally be provided in the damping circuits such as 58 and 59.

Referring to FIGS. 15*a* through 15*e*, grip 1 may be connected to the upper end of elastomeric sensing element 60.

It should be noted that the terms "upper" and "lower" are used simply to facilitate description of the various drawings and are specifically intended to not be limiting with respect to any disclosure or any claims. The various multi-axial input devices herein described are each capable of operating in any orientation with respect to gravity.

The lower end of elastomeric sensing element 60, which may be a conductive elastomeric element, and which may be ionically conductive, may be fixed to pedestal 63, which may be fixed to base portion 64. The upper end of sensing element 60 may be fitted with electrical terminals 61*a*, 61*b*, and 61*c*. The lower end of elastomeric sensing element 60 may be fitted with electrical terminals 62*a*, 62*b*, and 62*c*. Said electrical terminals may also be used for mechanical attachment of grip #1 and pedestal 63 to the elastomeric sensing element 63. Lower printed circuit board 67 and upper printed circuit board 66 may be used to facilitate electrical connection to elastomeric sensing element 60. Upper circuit board 66 may be fastened to elastomeric sensing element 60 by means of fasteners 68 and may also be fastened to grip I by means of fastener 69. Circuit board 62 may be clamped between pedestal 63 and elastomeric sensing element 60 by means of fasteners 65. Fasteners 65 may also serve to attach pedestal 63 to base portion 64. Referring to FIG. 16, upper circuit board 66 may be configured to facilitate use of multiple fasteners 69 for attachment to grip 1. Referring again to FIGS. 15*a* through 15*d*, upper electrical terminals 61 a, 61*b*, and 61*c* are preferably equally spaced 120 degrees apart. Electrical terminals 62*a*, 62*b*, and 62*c* are also preferably equally spaced 120 degrees apart and are also preferably offset angularly from upper electrical terminals by 60 degrees. In this manner, the electrically conductive elastomeric sensing element 60, in combination with said electrical terminals, may function as a variable resistance circuit as represented in FIG. 17. Note that FIG. 17 is a planar representation of a three dimensional electrical circuit, which may be thought of as a cross section of the elastomeric sensing element 60 of FIG. 15*a* through 15*e* cut along either a circular or hexagonal pattern intercepting electrical terminals 61*a*, 61*b*, 61*c*, 62*a*, 62*b*, and 62*c*. Referring again to FIG. 17, variable resistor 70*a*, for example, may represent the variable resistance between electrical terminals 61*a* and 62*a*, which resistance may vary as elastomeric sensing element 60 is deformed. Said three dimensional electrical circuit may be in the general shape of the actuator geometry of a Stewart Platform. Importantly, six degrees of freedom of the deflections of elastomeric sensing element 60 may be uniquely represented by the resistive electrical characteristics between electrical terminals 61*a*, 61*b*, 61*c*, 62*a*, 62*b*, and 62*c*. Elastomeric sensing element 60 may be made from a wide variety of materials of several classes. In one embodiment of this invention, the elastomeric material may be a solid solution of a metal salt dissolved in a polymer, such as that described in U.S. Pat. Nos. 5,898,057, 6,063,499, 6,111,051, or 6,184,331 to Chiang et al. or as commercially available from Mearthane Products Corp. In the case of said solid solution of a metal salt dissolved in a polymer, the electrical excitation signal is preferably of alternating polarity. Such an elastomer may be referred to hereafter as ionically conducting. For example, a three phase alternating current supply may be used as depicted in FIG. 45. Alternatively, the elastomeric sensing element 60 may be an "intrinsically conductive polymer" (ICP) such as Polyaniline (PAni) developed by Zipperling Kessler & Co. or blends of such polymers. Alternatively, polymers with conductive fillers may be used but may not be preferred due to inconsistent and often non-linear strain-resistivity relationships.

Referring to FIGS. 18*a*, 18*b*, 18*c*, and 18*d*, various views are shown of another embodiment of an elastomeric sensing element 60 of this invention. Upper electrical terminals are designated 61*a*, 61*b*, and 61*c*. Lower electrical terminals are designated 62*a*, 62*b*, and 62*c*. This embodiment may be superior to the embodiment of FIGS. 15*a* through 15*e* due to a reduced or eliminated electrical current through equivalent resistances 71*a*, 71*b*, 71*c*, 72*a*, 72*b*, and 72*c* as depicted in FIG. 17. Additionally, the mechanical stiffness along the various axes may be readily tailored by controlling the shapes and angles of the elastomeric "legs" 70*a*, 70*b*, 70*c*, 70*d*, 70*e*, and 70*f*.

Referring to FIG. 18*e*, a representative equivalent circuit is shown wherein variable resistances 70*a* through 70*f* represent the resistances of the "legs" of the same designation in FIGS. 18*a* through 18*d*.

Referring to FIGS. 19*a*, 19*b*, 19*c*, and 19*d*, various views are shown of yet another embodiment of the current invention wherein a plurality of discrete elastomeric sensing elements 75*a*, 75*b*, 75*c*, 75*d*, 75*e*, and 75*f* may replace the single elastomeric sensing element 60 of the preceding figures. Electrical terminals 72*a* through 72*f* and 73*a* through 73*f* may fix said elastomeric sensing elements to upper circuit board 66 and lower circuit board 67. The upper circuit board 66 and lower circuit board 67 may be fixed to a grip and pedestal or base portion as depicted in other views. The size and shape of the discrete sensing elements may be selected to optimize the stiffness characteristics, strength, and ergonomic feel along each axis.

Referring to FIG. 19*e*, a representative equivalent circuit is shown corresponding to the plurality of elastomeric sensing elements of FIGS. 19*a* through 19*d*.

Referring to FIG. 20*a* and FIG. 20*b*, a plan view and cross section view, respectively, are shown of another embodiment of the present invention wherein a cavity 76 containing an electrically conducting liquid or gel, hereinafter referred to simply as "electrolyte", may be provided within a deformable elastomeric structure 77. A deformable element containing an ionically conducting liquid may hereafter be referred to as a deformable liquid element. A deformable element containing an ionically conducting gel may hereafter be referred to as a deformable gel element. Such deformable elements may be deformed with respect to electrical resistance by elongation, shortening, dilation, narrowing, electrode shading, etc. A plurality of electrical terminals 81*a*, 81*b*, 81*c*, 82*a*, 82*b*, and 82*c* may provide for connection of appropriate electrical circuitry for measurement of electrical resistance along various axes.

Upper electrical terminals 81a, 81b, and 81c are preferably equally spaced 120 degrees apart and are preferably angularly offset from lower electrical terminals 82a, 2b, and 82c, which are also equally spaced 120 degrees apart. The outer rim of elastomeric structure 77 may be radially stiffened by insert 78. A cover 80 may be used to shield electrical terminals 81a, 81b, and 81c. Retainer 79 may be used to fix elastomeric structure 77 to pedestal 63.

Referring now to FIGS. 21a through 21f various views are shown of another embodiment of this invention wherein a plurality of discrete elastomeric elements such as lengths of rubber hose 83 each containing electrolyte are provided. Hose clamps 84 may secure electrodes 81 and 82. Mounting platforms 85 and 86 position the various electrodes 81 and 82 and may transmit various applied forces thereto. Any deflection of platforms 85 and 86 relative to each other may cause a unique pattern of electrical resistance between the various electrical terminals 81 and 82. Elongation of any of the various elastomeric elements 83 may result in a longer distance between electrodes and a narrower cross section of electrolyte and thus a higher resistance. Measurement of said resistances may be preferably done with an excitation signal of alternating polarity in conjunction with standard am detection circuitry.

Referring now to FIG. 22, a cross section is shown cut along a hexagonal path of yet another embodiment of the present invention. Various stages of manufacture and assembly are indicated as follows: Elastomeric structure 87 may be molded with pins 88 in place. Pins 88 may be withdrawn leaving cavities 89. Electrodes 90 may be inserted into the bottom of elastomeric structure 87. Cavities 89 may then be filled with electrolyte 92. Upper electrodes 93 may then be inserted, sealing off electrolyte 92 within cavities 89. Electrical connections 94 may complete the assembly of the sensing element portion of this embodiment of this invention.

Referring now to FIG. 23, two out of six sensing element assemblies are depicted in a configuration that may provide for greater sensitivity than is provided by the embodiment of FIG. 22. The nominal distance between upper electrodes 95 and lower electrodes 96 is small compared to the height of elastomeric structure 87, resulting in a greater relative change in electrode spacing for a given deflection of elastomeric structure 87.

Referring now to FIG. 24, an embodiment is depicted which may require insertion of only a single electrode assembly 97 into each cavity within elastomeric structure 87. This embodiment may be simpler to manufacture and may be less affected by small amounts of air entrained within the cavities during assembly.

Referring now to FIGS. 25a, 25b, and 25c, another embodiment of the present invention is shown wherein a deformable elastomeric structure 100 may contain a plurality of internal stiffening elements 99 which may couple strains of elastomeric structure 100 along selected axes to strains which are more easily measured by a compact device 98 such as an array of printed circuit board strain gauges or one or more MEMS force sensors.

Referring now to FIG. 26, a partial view of another embodiment of the present invention is shown wherein stiffening elements 99 may be coupled to pressure sensing means 101 through fluid filled channels 102.

Referring to FIG. 27, a cross section of another embodiment of the present invention is shown wherein a deformable elastomeric structure 77 may be provided to which displacement measurement devices 103 may be pivotably attached at locations 104 within a common cavity 105. Stiffening insert 78 may provide radial stiffness to the outer rim of elastomeric structure 77. Preferably, six measurement devices 103 are provided in the geometry of a Stewart platform.

Referring now to FIG. 28, a partial cross section of another embodiment of the present invention is shown wherein displacement measuring devices 103 are fitted within discrete cavities 106 within elastomeric structure 100.

Referring now to FIG. 29, a partial cross section view is shown depicting another embodiment of the present invention wherein displacement measuring devices such as variable inductors or differential transformers are installed within individual cavities within a deformable elastomeric structure. The embodiment shown further may provide for use of a single molded spherical seat 104 for each individual transducer 103. The partial cross section view of FIG. 29 depicts two of the preferred quantity of six transducers 103 which may be preferably oriented in a Stewart Platform configuration. Spherical portion 106 of transducer assembly 103 may be seated in molded spherical seat 104 within elastomeric body 100. Transformer cores 105 may feature spherical outside diameters which may slide within coil assemblies 106. Rod portions 107 connect spherical portions 106 with transformer cores 105.

Referring now to FIG. 30, coil springs 108 within elastomeric structure 100 may vary in inductance as they change length with deformation of elastomeric structure 100. Variance in inductance may be measured in order to establish an electronic representation of the deformed shape of elastomeric structure 100.

Referring to FIG. 31, elastomeric structure 100 may feature inflatable cavities 89 within coils or coil springs 108. Inflatable cavities 89 may be connected to an external source of compressed fluid or gas by means of fittings 109 and hoses 110. Inflatable cavities 89 may be preferably provided in quantity six in a Stewart Platform configuration within elastomeric structure 100. By way of this embodiment a force feedback or "haptic" joystick may be constructed. A combination of six of the two elements shown may be termed a "stage" of an actuator. By mounting multiple independently operable "stages" end-on-end, a robotic, snake-like device may be constructed with great flexibility and controllability. Such a multi-stage device may be useful for catheter steering for medical applications, for example. Control of such multiple stage devices may preferably be by means of single pressure manifolds in conjunction with miniature valve manifolds such as MEMS valve assemblies that are preferably addressed and actuated from a single digital data bus. In this manner, a single compressed air line in conjunction with a single data bus could be collocated along the center of an extended multi-stage actuator in a structure analogous to an vertebrate animal spine.

Referring now to FIGS. 32a through 32d, another embodiment of the present invention is shown wherein an electrolyte filled elastomeric sensing element 77 (similar to that shown in FIGS. 20a and 20b) is used in combination with a gel filled wrist rest 111 and a numeric key-pad 112. The axis of symmetry of elastomeric sensing element 77 may be inclined from vertical to allow the user's hand to be in a comfortable and relaxed position. The bottom 64a of base portion 64 could normally sit flat on a horizontal surface such as a desk.

Referring now to FIG. 33, yet another embodiment of the present invention is shown wherein left half 113 of game controller 116 may be connected to the right half 114 of game controller 116 by means of multi-axis sensing element 115. By means of this embodiment, all of the conventional features of a two handed game controller may be preserved while six, for example, additional degrees of freedom may be added.

Referring now to FIG. 34, a wrist mounted embodiment of the present invention is depicted wherein hand strap 117 and wrist strap 118 may secure base portion 119 to the user's hand 120. Active grip 1 may be connected to base portion 119 through sensor portion 121.

Referring now to FIGS. 35a through 35g, 36a and 36b, photographs of a model of another embodiment of the present invention are shown whereby twelve degrees of freedom may be readily controlled with one hand. Fingertip operated grip 122 is connected by sensor means 121 (not shown) to hand held grip 123. The fingertip operated grip 122 may be preferably approximately 1 to 1½ inches in diameter, a possibly novel level of compactness which the sensor means disclosed by this invention may facilitate. Additional sensor means for measurement of hand held grip inputs may be located within hand held grip 123 or at the base of connecting link 124, or within connecting link 124 or may be achieved by external, e.g., video measurement means.

Referring now to FIG. 37a, 37b, 38a, 38b, 38c, and 38d, photographs are shown depicting yet another embodiment of the present invention wherein a hand held stationary grip 125 may be used to stabilize the user's hand while active grip 122 may be operated in multiple degrees of freedom, six for example, by the user's thumb, forefinger, and middle finger.

Referring now to FIG. 39, an example of one of many alternative electrical schematics for one class of embodiments of the present invention is shown.

Referring to FIG. 40a, a perspective view is shown of an elastomeric sensing element in accordance with one of the embodiments of this invention.

Referring now to FIG. 40b, a cross sectional view is shown of the sensing element of FIG. 40a.

Referring now to FIG. 41, an elevation view is shown of an embodiment of the present invention that incorporates a plurality of electrically conductive elastomeric tensile members.

Referring now to FIG. 42, one of many possible representative electrical schematics is shown of one class of embodiments of the present invention.

Referring now to FIG. 43, one of many possible representative electrical schematics is shown of another embodiment of the present invention.

Referring now to FIG. 44, an example schematic is shown of an electrolyte filled cavity of Stewart Platform geometry within a deformable elastomeric sensing element in accordance with one embodiment of the present invention.

Referring now to FIG. 45, a representative electrical schematic is shown corresponding to the embodiment of FIG. 44.

Referring now to FIG. 46, a cross section is shown of an embodiment of the present invention similar to the embodiment shown in FIGS. 15a through 15e.

Referring now to FIG. 47, an example electrical signal scheme is shown wherein a three phase excitation Voltage represented by Voltages A, B, and C is applied to one set of terminals such as 61a, 61b, and 61c of the embodiment of FIGS. 15a through 15e. Six degree of freedom position information may be obtained, for example, by measurement of the Voltage and phase angle of Voltages D, E, and F as would be available for measurement at terminals 62a, 62b, and 62c in the embodiment of FIGS. 15a through 15e.

Referring to FIG. 48, a printed circuit board is shown which might be used in conjunction with the embodiment of FIG. 46.

Referring now to FIGS. 49a, 49b, 49c, and 49d, a joystick is shown which features a base 64 to which is mounted a gel pad wrist rest 111 which allows the user comfortably clamp the base 64 securely against a supporting surface 126 such as a desk during manipulation of the joystick. Pedestal 63 is attached to base 64 and may be shaped to prevent excessive rotation or horizontal movement of lower grip portion 1b. Lower grip portion 1b is accordingly shaped to allow desirable but not excessive movement about pedestal 63. The movement of lower grip portion 1b is limited in the downward direction by base 64 and is limited in the upward direction by pedestal 63. Diaphragm 2 is convoluted along several directions to provide flexibility in six degrees of freedom and provides protection of the optical components from dust and insects. Spring 10 provides a restoring force to the grip 1a and 1b and also locates by way of holes 10a and 10b the upper grip relative to the photo emitters 4 and photo detectors 5. Lower grip 1b is also located relative to pedestal 63 by means of spring 10. Spring 10 is depicted with three way symmetry. Spring 10 may have any number of configurations such as two way symmetry or it may be constructed with a single spiral element. Upper grip 1a features an internal surface with a combination of absorptive zones 1c and reflective zones 1d. Emitters 4 may be aimed directly at the boundaries betweens zones 1c and zones 1d. Photo detectors 5 may have a wide field of view and may each be responsive to the reflected light from several photo emitters. If the photo emitters are energized one at a time, all of the photo detectors, photo diodes for example, may be electrically connected in parallel and may be connected to a single analog input channel of a mixed signal integrated circuit such as a Microchip PIC® device. Such a device may be mounted directly to circuit board 13 along with other electronic components which may be required to direct power to the photo emitters 4 and to derive a signal from the photo detectors 5. Upper grip 1a as shown in FIGS. 49a, 49b, 49c and 49d is drawn in this example at 53 mm diameter.

Referring now to FIGS. 50a and 50b, an embodiment of the present invention is shown which incorporates a monolithic photo transducer 44. Pedestal 63 is attached to base 64 and may be shaped to prevent excessive rotation or horizontal movement of lower grip portion 1b. Lower grip portion 1b is accordingly shaped to allow desirable but not excessive movement about pedestal 63. The movement of lower grip portion 1b is limited in the downward direction by base 64 and is limited in the upward direction by pedestal 63. Diaphragm 2 is convoluted along several directions to provide flexibility in six degrees of freedom and provides protection of the optical components from dust and insects. Spring 10 provides a restoring force to the grip 1a and 1b and also locates by way of holes 10a and 10b the upper grip relative to the photo emitters 4 and photo detectors 5. Lower grip 1b is also located relative to pedestal 63 by means of spring 10. Spring 10 is depicted with three way symmetry. Spring 10 may have any number of configurations such as two way symmetry or it may be constructed with a single spiral element. Upper grip 1a features an internal surface with a combination of absorptive zones 1c and reflective zones 1d. Emitters 44c may be aimed directly at the boundaries between zones 1c and zones 1d. Photo detectors 44b may have a wide field of view and may each be responsive to the reflected light from several photo emitters. FIGS. 50a, 50b, and 50c are drawn to a scale such that upper grip 1a is approximately 40 mm in diameter, thus rendering it operable with the user's thumb tip, index finger tip, and middle finger tip and leaving the users remaining fingers available to grip a further device such as a mouse or joystick to which base 64 may be attached.

Referring now to FIG. 50c, the monolithic optical transducer 44 of FIGS. 50a and 50b is shown. Monolithic optical transducer 44 is comprised of a substrate 44e which may be a printed circuit board. six discrete photo emitters 44c and six discrete photo detectors 44b may each be encased in a transparent medium such as epoxy resin. An opaque medium may surround the transparent medium in order to prevent direct transmission of light between the photo emitters and photo detectors. A reflective coating 44j may be applied to the outer surface of the transparent medium 44h prior to over-molding for example with opaque medium 44i. Connection pins 44a provide power to and transmit data from the device by means of a an interface such as USB for example. Mixed signal microcontroller 44d and other electronic components as may be required may be mounted to substrate 44e and encapsulated is resin systems 44h and/or 44i. In this manner a low cost robust transducer package may be produced.

Referring now to FIGS. 51a, 51b, 51c, 51d, 51e, 51f, and 51g, an embodiment of the present invention is shown wherein a six axis joystick 1 as attached to a three axis mouse 64a. The mouse is shaped to allow the users wrist to be substantially vertical thus permitting greater range of z axis rotation of the mouse base. The depicted shape also facilitates firm grasping of the mouse portion against the user's palm by the user's ring finger and little finger. A ridge between the users palm and bent fingers further enhances security of gripping. The joystick is approximately 40 mm in diameter and thus allows easy manipulation with the user's thumb, index finger and middle finger. The bottom surface of the mouse features two sets of offset conventional optical mouse transducers. Each transducer set may measure both x and y movements, although the transducer set at one of the two locations need only measure x movements. For nomenclature purposes, the transducer sets lie along a line parallel to the y axis. The third mouse axis is derived from z axis twisting of the mouse which causes a differential output of the two x transducers. The depicted device provides 9 degrees of freedom. buttons may also be provided around the periphery of the base of the six axis joystick. A small ten key pad may be added to the top of the device.

Referring now to FIG. 52, another embodiment of the present invention is shown wherein a joystick 1 controls a hexapod adaptor 126 which controls the spatial relationship between a piece of construction equipment 131, in this case a loader, and a removable implement 133, in this case a bucket. Various other implements such as forks, grapples, booms, saws, hammers, augers, drills, mowers, etc. may be similarly controlled. Machine vision sensor 130 which may be a video camera is used to machine determine the posture of the linkage 127 relative to the joystick 1. The machine vision sensor 130 may also be used to sense the posture of the hexapod 126. The posture of hexapod stage 126 may also be interpreted by machine vision means such as by video camera or scanning laser beam. Such a laser beam might, for example scan reflective tags on each of the six struts. The timing of the reflected signals might be used to determine the posture of the hexapod. Various other machine vision schemes could also be used. Alternatively or conjunctively posture information may be deduced from discrete sensors such as MEMS (Micro Mechanical Electrical Systems) devices 126c attached to attached to the hexapod struts and MEMS devices 126b and 126d attached to platforms 128 and 132. Further MEMS devices (which may be accelerometers or angular rate sensors for example) 127a and 129a may be attached to the various parts of the linkage 127 of a machine. Such devices may be attached magnetically and preferably transmit information wirelessly.

Exhibit A illustrates a general approach to determining the position, angular velocity, and angular acceleration of a machine element on the basis of MEMS accelerometer data. A similar approach may be used to determine the position, angular velocity, and angular acceleration of multiple connected linkages such as robotic arms, hexapods, combinations thereof and the like.

Referring now to FIG. 53, a partial general control arrangement is shown which might be used in conjunction with the embodiment shown in FIG. 52. Joystick 1 is used by the operator to control slave platform 132. Coordinates are continuously adjusted to match the user's frame of reference by computer 139 using machine vision sensor 130 and/or discrete sensors 127a, 127b, 126c, 126d, and the like. Conventional absolute angle and position encoders may also be utilized. Hexapod struts 126 may be hydraulically controlled by hydraulic valve manifold 137, which may receive electrical power through motion controller 134 from hydraulic electrical generator 136. Hydraulic electrical generator 136 may also supply electrical power to transceiver 135. Transceiver 135 may receive motion command data from transceiver 138. Such a scheme is adaptable to a wide variety of machinery. Installation of such equipment need not be permanent and may be well suited even to rental construction equipment. In general, the accuracy of the posture determining system need only be sufficient to reasonably align the hexapod, for example, frame of reference with the frame of reference of the operator. Absolute position feedback would be in direct visual or audible directly to the operator, independent of the control system. Optionally, a haptic joystick could be utilized to provided tactile force feedback.

As can be easily understood from the foregoing, the basic concepts of the present invention may be embodied in a variety of ways. It involves both multi-axis input techniques as well as devices to accomplish the appropriate method. In this application, the multi-axis input techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of, alternative or equivalent elements. Again, these are implicitly included in this disclosure. Where the invention is described in device-oriented terminology, each element of the device implicitly performs a function. Not only are apparatus claims included for the device described, but also method or process claims may be included to address the functions the invention and each element performs. Neither the description nor the terminology is intended to limit the scope of the claims which will be included in a full patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon for support of the claims for the full patent application. It should be understood that such language changes and broad claiming is accomplished in this application based on a provisional filing. This patent application may seek examination of as broad a base of claims as deemed within the applicant's right and is designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "means for detecting" or a "detector" should be understood to encompass disclosure of the act of "detecting"—whether explicitly discussed or not—and, conversely, were there effectively disclosure of the act of "detecting", such a disclosure should be understood to encompass disclosure of a "detector" and even a "means for detecting". Such changes and alternative terms are to be understood to be explicitly included in the description.

Patents, publications, or other references mentioned in this application for patent are hereby incorporated by reference. In addition, as to each term used it should be understood that unless its utilization in this application is inconsistent with such interpretation, both traditional and common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement or list of references filed with the application are hereby appended and hereby incorporated by reference, however, as to each of the above, to the extent that such information or statements incorporated by reference might be considered inconsistent with the patenting of this invention such statements are expressly not to be considered as made by the applicants.

Thus, the applicants should be understood to claim at least: i) each of the input devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, xi) each potentially dependent claim or concept as a dependency on each and every one of the independent claims or concepts presented, xii) processes performed with the aid of or on a computer as described throughout the above discussion, xiii) a programmable apparatus as described throughout the above discussion, xiv) a computer readable memory encoded with data to direct a computer comprising means or elements which function as described throughout the above discussion, xv) a computer configured as herein disclosed and described, xvi) individual or combined subroutines and programs as herein disclosed and described, xvii) the related methods disclosed and described, xviii) similar, equivalent, and even implicit variations of each of these systems and methods, xix) those alternative designs which accomplish each of the functions shown as are disclosed and described, xx) those alternative designs and methods which accomplish each of the functions shown as are implicit to accomplish that which is disclosed and described, xxi) each feature, component, and step shown as separate and independent inventions, and xxii) the various combinations and permutations of each of the above.

It should also be understood that for practical reasons and so as to avoid adding potentially hundreds of claims, the applicant may eventually present claims with initial dependencies only. Support should be understood to exist to the degree required under new matter laws—including but not limited to European Patent Convention Article 123 (2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is and will be used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A multi-axis input transducer apparatus comprising:
an at least quinary input element capable of receiving input with respect to at least five frames of reference, a reflective element that, during receipt of said input, reflects radiation from a source capable of emitting radiation eventually incident upon said reflective element;

at least one reflected radiation detector that detects radiation from said reflective element; and a comparatively non-reflective element upon which radiation from said source is eventually incident, wherein said comparatively non-reflective element forms at least one abrupt border with said reflective element, where there is an abrupt change from reflective to comparatively non-reflective.

2. The multi-axis input transducer apparatus as described in claim 1 wherein said at least quinary input element comprises an at least sextet input element capable of receiving input with respect to at least six frames of reference.

3. The multi-axis input transducer apparatus as described in claim 1 wherein said source of radiation comprises a source of electromagnetic radiation.

4. The multi-axis input transducer apparatus as described in claim 1 wherein said at least five frames of reference comprises at least three translational frames of reference.

5. The multi-axis input transducer apparatus as described in claim 1 wherein said at least five frames of reference comprises at least three rotational frames.

6. The multi-axis input transducer apparatus as described in claim 1 wherein said at least five frames of reference comprise three translational frames of reference and two rotational frames of reference.

7. The multi-axis input transducer apparatus as described in claim 1 wherein said at least one abrupt border comprises at least two abrupt borders.

8. The multi-axis input transducer apparatus as described in claim 7 wherein said at least two abrupt borders comprises at least two substantially orthogonal abrupt borders.

9. The multi-axis input transducer apparatus as described in claim 7 wherein said at least two abrupt borders zig zag.

10. The multi-axis input transducer apparatus as described in claim 1 wherein said reflective element is established extra-radically of said source.

11. The multi-axis input transducer apparatus as described in claim 1 wherein said at least quinary input element comprises a joystick.

12. The multi-axis input transducer apparatus as described in claim 1 wherein said reflective element comprises an annular reflective element.

13. A joystick comprising a radiation source that projects radiation eventually incident upon an internal reflector that itself reflects a varying reflected optical signal to a reflected radiation sensor in a manner which varies in at least four degrees of freedom in response to varying input from an operator, wherein said reflected radiation sensor senses at least a portion of said varying reflected optical signal wherein said radiation source and said reflector are movable with respect to each other in at least four degrees of freedom and wherein said reflector comprises multiple reflective facets.

14. A joystick as in claim 13 wherein said radiation source comprises a visible light radiation source.

15. The joystick of claim 13 wherein the varying reflected optical signal is detected as an image incident on an array of image sensing elements.

16. The joystick of claim 13 wherein said reflected radiation sensor comprises a photo detector and the radiation source comprises time sequenced light emitters.

17. A multi-axis input transducer apparatus comprising:
an at least quinary input element capable of receiving input with respect to at least five frames of reference; and an internal reflective element established:
(a) so that said input causes movement of said internal reflective element relative to a radiation source; and
(b) to receive input independent radiation from said radiation source, wherein said radiation source is capable of emitting radiation eventually incident upon said internal reflective element, and wherein said at least one reflected radiation detector is established to receive radiation reflected by said internal reflective element.

18. The multi-axis input transducer apparatus as described in claim 17 wherein said at least quinary input element comprises an at least sextet input element capable of receiving input with respect to at least six frames of reference.

19. The multi-axis input transducer apparatus as described in claim 17 wherein said source comprises a source of electromagnetic radiation.

20. The multi-axis input transducer apparatus as described in claim 17 wherein said at least five frames of reference comprises at least three translational frames of reference.

21. The multi-axis input transducer apparatus as described in claim 17 wherein said at least five frames of reference comprises at least three rotational frames.

22. The multi-axis input transducer apparatus as described in claim 17 wherein said at least five frames of reference comprise three translational frames of reference and two rotational frames of reference.

23. The multi-axis input transducer apparatus as described in claim 17 further comprising a comparatively non-reflective element upon which radiation from said source is eventually incident.

24. The multi-axis input transducer apparatus as described in claim 23 wherein said comparatively non-reflective element forms at least one abrupt border with said internal reflective element, where there is an abrupt change from reflective to comparatively non-reflective.

25. The multi-axis input transducer apparatus as described in claim 24 wherein said at least one abrupt border comprises at least two abrupt borders.

26. The multi-axis input transducer apparatus as described in claim 25 wherein said at least two abrupt borders comprises at least two substantially orthogonal abrupt borders.

27. The multi-axis input transducer apparatus as described in claim 25 wherein said at least two abrupt borders zig zag.

28. The multi-axis input transducer apparatus as described in claim 17 wherein said reflective element is established extra-radically of said source.

29. The multi-axis input transducer apparatus as described in claim 17 wherein said at least quinary input element comprises a joystick.

30. The multi-axis input transducer apparatus as described in claim 17 wherein said reflective element comprises an annular reflective element.

31. The multi-axis input transducer apparatus as described in claim 17 wherein said reflective element is further established so that said input causes movement of said internal reflective element relative to at least one reflected radiation detector.

32. A multi-axis input transducer apparatus comprising:
an at least quinary input element capable of receiving input with respect to at least five frames of reference; and an annular reflective element established to receive input independent radiation from said radiation source, wherein said radiation source is capable of emitting radiation eventually incident upon said annular reflective element, wherein said at least one reflected radiation detector is established to receive radiation reflected by said annular reflective element, and wherein said annular reflective element is established so as to surround said radiation source.

33. The multi-axis input transducer apparatus as described in claim 32 further comprising a comparatively non-reflective element upon which radiation from said source is eventually incident.

* * * * *